US012105880B2

(12) United States Patent
Huang et al.

(10) Patent No.: US 12,105,880 B2
(45) Date of Patent: Oct. 1, 2024

(54) VIBRATION METHOD AND APPARATUS, ELECTRONIC DEVICE, AND READABLE STORAGE MEDIUM

(71) Applicant: HONOR DEVICE CO., LTD., Shenzhen (CN)

(72) Inventors: Ting Huang, Shenzhen (CN); Chen Zhu, Shenzhen (CN); Yipin Wang, Shenzhen (CN); Shuo Chu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 150 days.

(21) Appl. No.: 17/787,544

(22) PCT Filed: Sep. 8, 2021

(86) PCT No.: PCT/CN2021/117278
§ 371 (c)(1),
(2) Date: Jun. 20, 2022

(87) PCT Pub. No.: WO2022/127211
PCT Pub. Date: Jun. 23, 2022

(65) Prior Publication Data
US 2023/0251714 A1 Aug. 10, 2023

(30) Foreign Application Priority Data
Dec. 15, 2020 (CN) .......................... 202011475685.7

(51) Int. Cl.
*G06F 3/01* (2006.01)
*G06F 3/0346* (2013.01)
(Continued)

(52) U.S. Cl.
CPC ............ *G06F 3/016* (2013.01); *G06F 3/0346* (2013.01); *H04M 1/72427* (2021.01); *H04M 1/72454* (2021.01); *H04M 19/047* (2013.01)

(58) Field of Classification Search
None
See application file for complete search history.

(56) References Cited

U.S. PATENT DOCUMENTS

| | | | |
|---|---|---|---|
| 10,819,256 B2 | 10/2020 | Wang et al. | |
| 2011/0157052 A1* | 6/2011 | Lee | G06F 1/1626 345/173 |

(Continued)

FOREIGN PATENT DOCUMENTS

| | | |
|---|---|---|
| CN | 103869949 A | 6/2014 |
| CN | 108153419 A | 6/2018 |

(Continued)

*Primary Examiner* — Thomas S McCormack
(74) *Attorney, Agent, or Firm* — WOMBLE BOND DICKINSON (US) LLP

(57) ABSTRACT

A vibration method and apparatus are provided. The method comprises: in response to a first operation, the electronic device including at least two motors enters a first application scene; when a screen direction of the electronic device is a first screen direction, the at least two motors vibrate in a first vibration mode; and in response to a second operation, the screen direction of the electronic device is switched from the first screen direction to a second screen direction, and the at least two motors vibrate in a second vibration mode, wherein the first vibration mode is different from the second vibration mode. A vibration mode of a motor may be changed to adapt to the screen direction of the electronic device, so as to achieve an effect of adapting to a vibration feeling of a user based on the screen direction and improve user experience.

20 Claims, 37 Drawing Sheets

(51) Int. Cl.
*H04M 1/72427* (2021.01)
*H04M 1/72454* (2021.01)
*H04M 19/04* (2006.01)

(56) References Cited

U.S. PATENT DOCUMENTS

2014/0135074 A1  5/2014  Manzen
2020/0045184 A1  2/2020  Shen et al.

FOREIGN PATENT DOCUMENTS

| CN | 110121008 A | 8/2019 |
| CN | 110465080 A | 11/2019 |
| CN | 111443815 A | 7/2020 |
| IN | 109120190 A | 1/2019 |
| WO | 2020037611 A1 | 2/2020 |
| WO | 2020224017 A1 | 11/2020 |

* cited by examiner

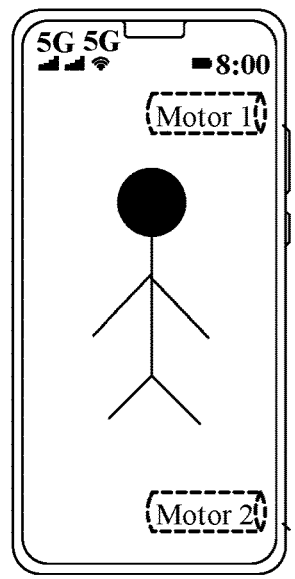
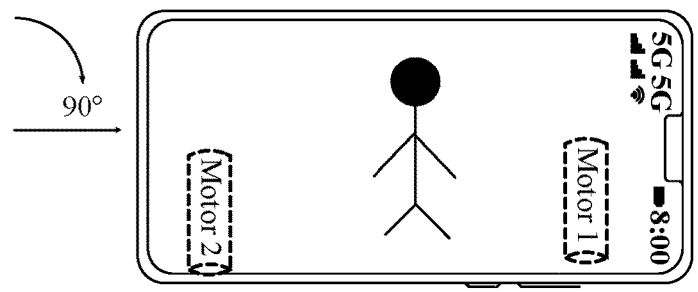
FIG. 5a
FIG. 5b
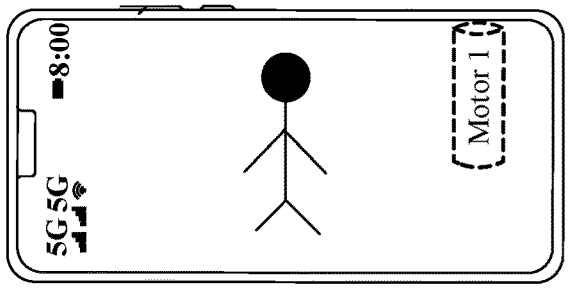
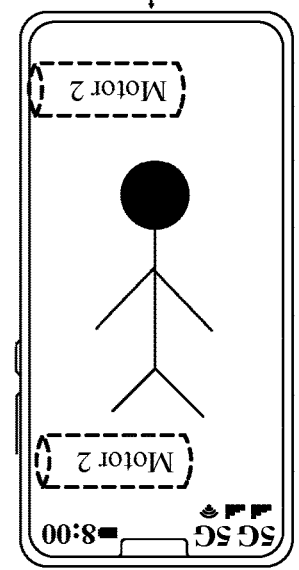
FIG. 5d
FIG. 5c

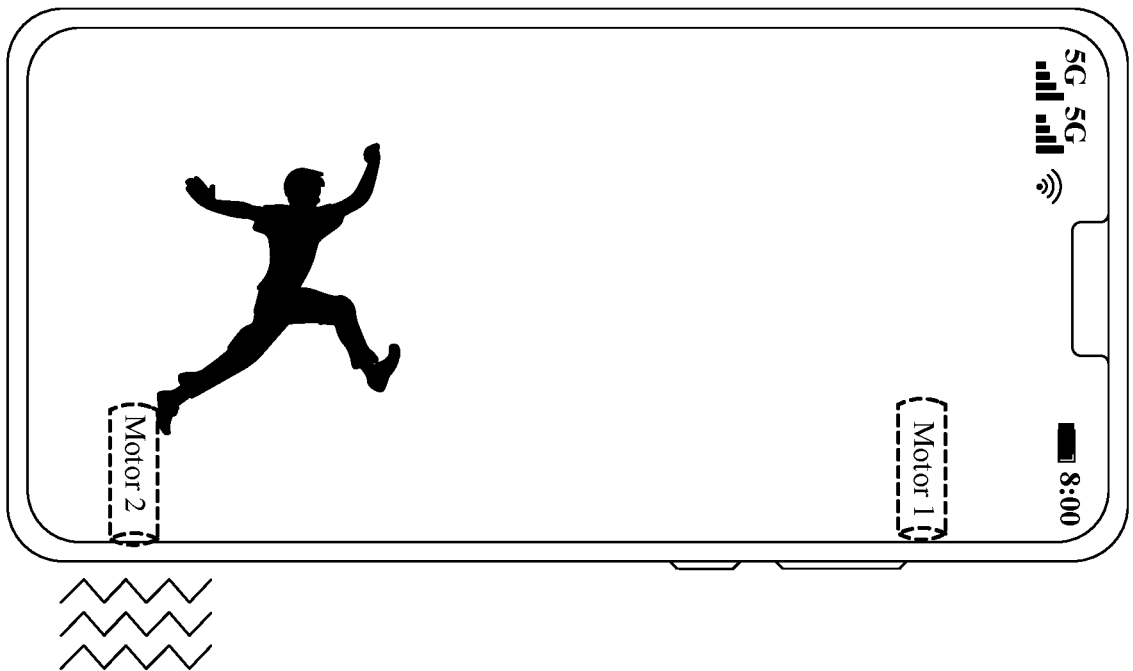
FIG. 8a
CONT.
FROM
FIG. 8a
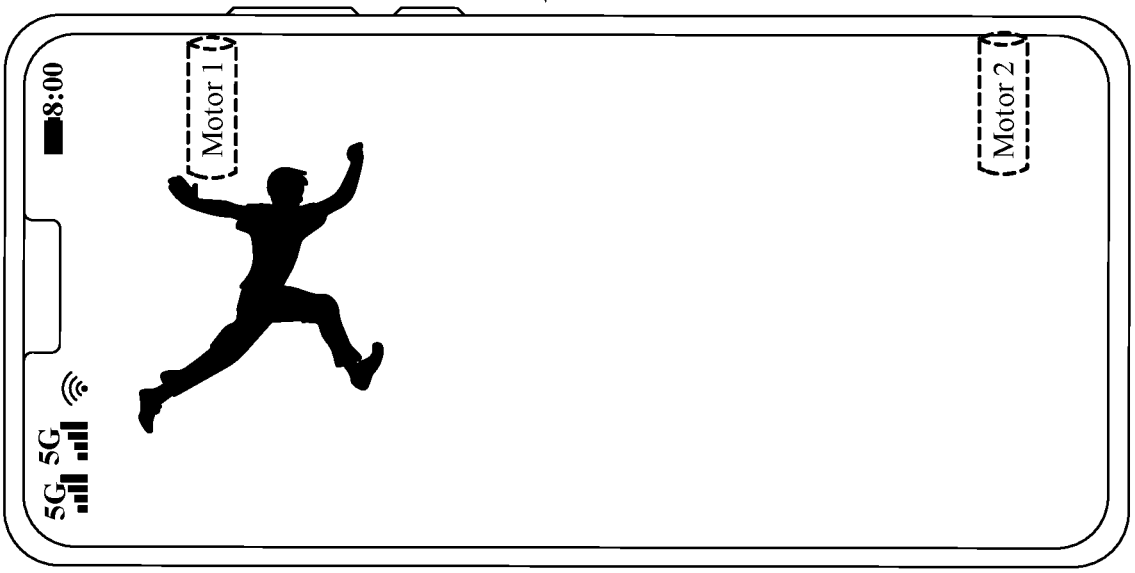
FIG. 8b

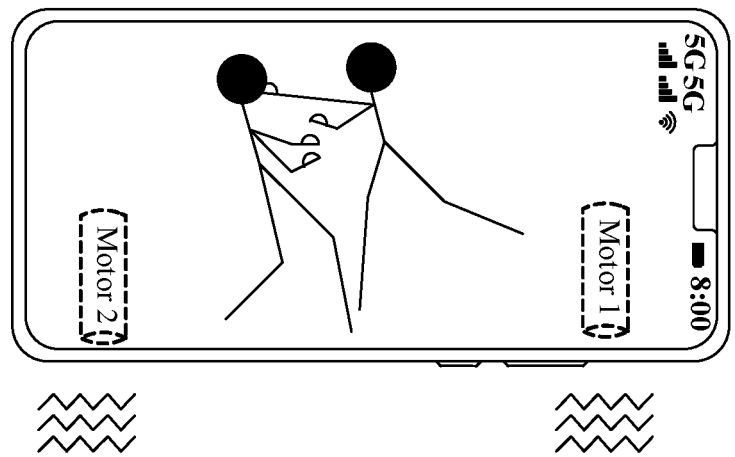
FIG. 9f
CONT.
FROM
FIG. 9d
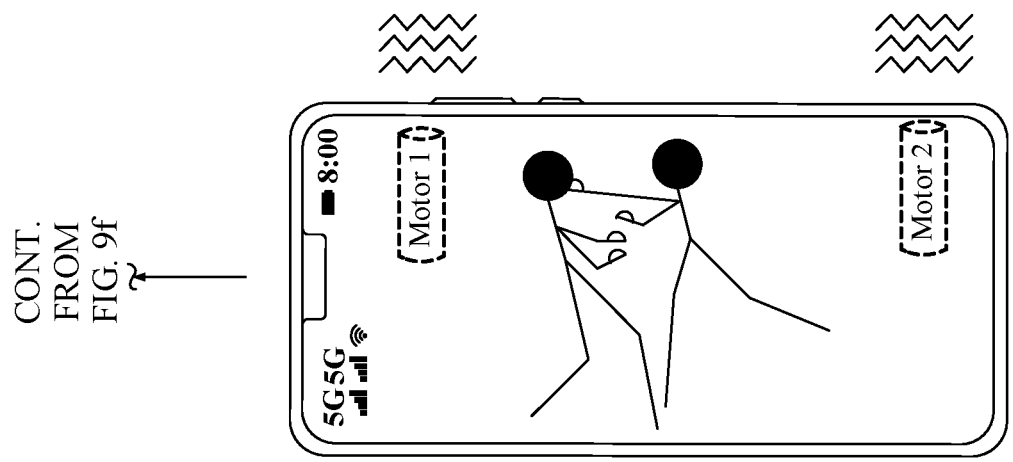
FIG. 9e

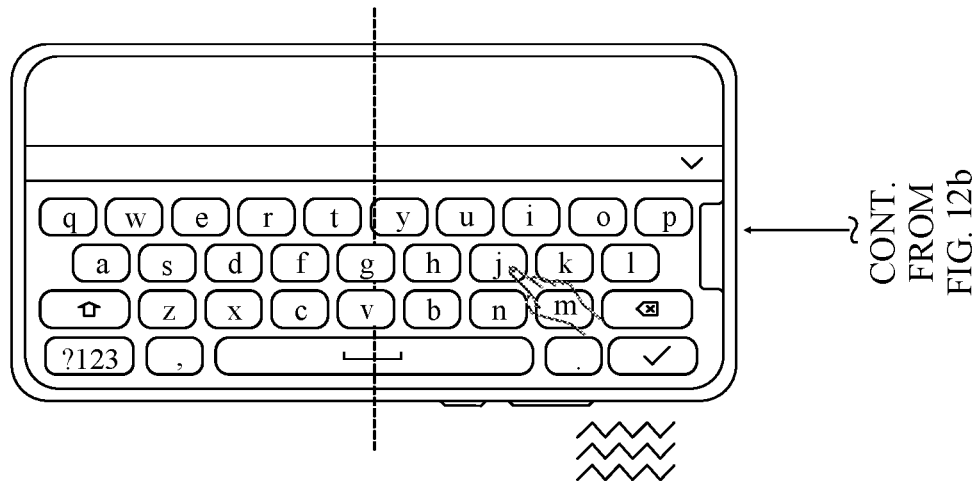
FIG. 12c
CONT.
FROM
FIG. 12c
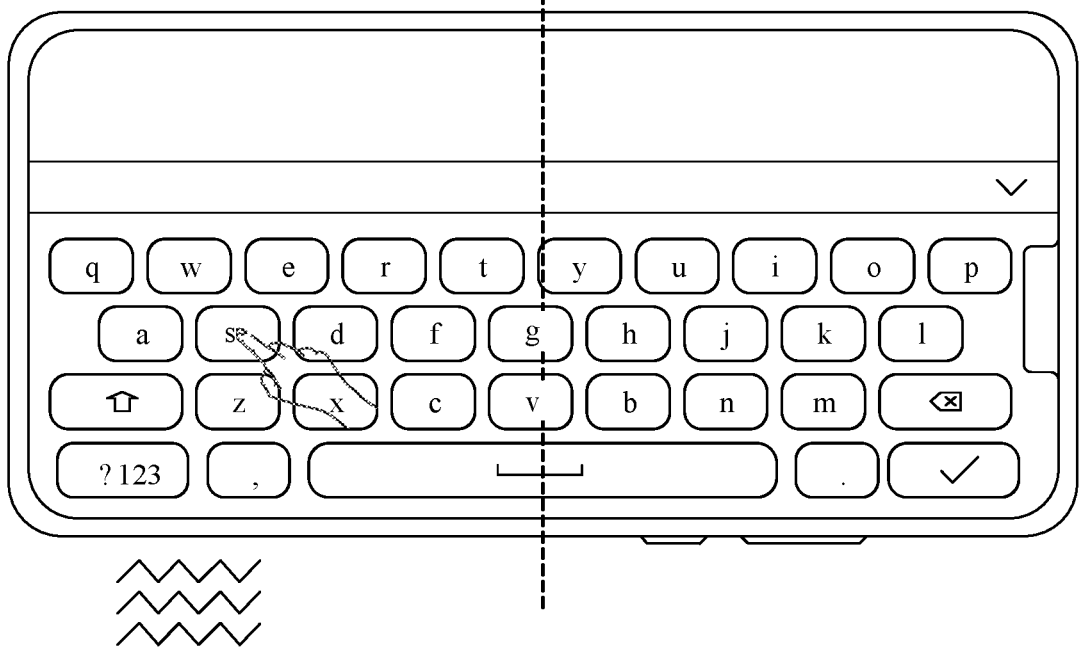
FIG. 12d

VIBRATION METHOD AND APPARATUS, ELECTRONIC DEVICE, AND READABLE STORAGE MEDIUM

CROSS-REFERENCE TO RELATED APPLICATIONS

This application is a National Stage of International Application No. PCT/CN2021/117278, filed on Sep. 8, 2021, which claims priority to Chinese Patent Application No. 202011475685.7, filed on Dec. 15, 2020. The disclosures of which are incorporated herein by reference in their entireties.

TECHNICAL FIELD

Embodiments of this application relate to vibration technologies, and in particular, to a vibration method and apparatus, an electronic device, and a readable storage medium.

BACKGROUND

An electronic device may vibrate when receiving information or a phone call, or may vibrate in response to a specific game scene. The reason why the electronic device vibrates is that the electronic device includes a motor, and vibration of the motor makes a user feel vibration of the electronic device.

Currently, a motor is disposed in the electronic device. The motor vibrates in a fixed vibration mode, so that a vibration effect of the electronic device that the user feels in any scene is the same, and user experience is poor.

SUMMARY

Embodiments of this application provide a vibration method and apparatus, an electronic device, and a readable storage medium, so that a vibration mode of a motor may be changed to adapt to a screen direction of the electronic device, thereby improving user experience.

According to a first aspect, an embodiment of this application provides a vibration method, where the vibration method is applied to an electronic device, and the electronic device includes at least two motors. The method may include: In response to a first operation, the electronic device enters a first application scene, and in response to that the electronic device enters the first application scene, and a screen direction of the electronic device is a first screen direction, the at least two motors vibrate in a first vibration mode; and in response to a second operation, the screen direction of the electronic device is switched from the first screen direction to a second screen direction, and the at least two motors vibrate in a second vibration mode, where the first vibration mode is different from the second vibration mode.

The first operation and the second operation may be an operation of a user or an operation of an element of the electronic device. The first application scene may include at least one of the following scenes: a scene of an interface displayed by the electronic device, a scene of vibration with music, a scene of playing audio, a scene of a user's operation on the interface of the electronic device, or an external environment in which the electronic device is located. That is, in this embodiment of this application, when the electronic device is in the first application scene, and the screen direction of the electronic device is the first screen direction, the at least two motors vibrate in the first vibration mode.

When the electronic device is in the first application scene, and the electronic device is switched from a first screen direction to a second screen direction, the at least two motors vibrate in the second vibration mode different from the first vibration mode.

In this embodiment of this application, the vibration mode of the motor may be changed to adapt to the screen direction of the electronic device, and user experience can be improved.

In a possible implementation, in response to the second operation, the screen direction of the electronic device is switched from the first screen direction to the second screen direction, the interface displayed by the electronic device rotates in the screen direction of the electronic device, and the at least two motors vibrate in the second vibration mode.

In this manner, not only the vibration mode of the motor may be changed to adapt to the screen direction of the electronic device, but also the interface displayed by the electronic device rotates in the screen direction of the electronic device, so as to adapt to a vibration feeling of the user based on the user's vision, thereby improving user experience.

In a possible implementation, in response to the second operation, the screen direction of the electronic device is switched from the first screen direction to the second screen direction, and a sound channel of audio played by the electronic device changes with the screen direction of the electronic device.

In this manner, not only the vibration mode of the motor may be changed to adapt to the screen direction of the electronic device, but also the audio played by the electronic device may change with the rotation of the screen direction of the electronic device, so as to adapt to the vibration feeling of the user based on the user's hearing, thereby improving user experience.

In a possible implementation, in response to the second operation, the screen direction of the electronic device is switched from the first screen direction to the second screen direction, the interface displayed by the electronic device rotates in the screen direction of the electronic device, and a sound channel of audio played by the electronic device changes with the screen direction of the electronic device.

In this manner, not only the vibration mode of the motor may be changed to adapt to the screen direction of the electronic device, but also the audio played by the electronic device and an interface of the electronic device may be changed with the rotation of the screen direction of the electronic device, so as to adapt to the vibration feeling of the user based on the user's hearing and vision, thereby improving user experience.

In a possible implementation, in response to the second operation, the screen direction of the electronic device is switched from the first screen direction to the second screen direction, the interface displayed by the electronic device does not rotate with the screen direction of the electronic device, and the at least two motors vibrate in the first vibration mode.

In this manner, the screen direction of the electronic device changes, but the interface of the electronic device does not rotate; and to adapt to the visual feeling of the user, the vibration mode of the motor does not change, and user experience can be improved.

In a possible implementation, the at least two motors include a first motor and a second motor, and that the at least two motors vibrate in a first vibration mode includes: The first motor vibrates in a first waveform, and the second motor vibrates in a second waveform; and that the at least two motors vibrate in a second vibration mode includes: The first motor vibrates in a third waveform, and the second motor vibrates in a fourth waveform. A difference between the first vibration mode and the second vibration mode may be as follows: At least one of the third waveform and the fourth waveform is different from the first waveform, and/or at least one of the third waveform and the fourth waveform is different from the second waveform.

The first parameter includes a first sub-parameter and a second sub-parameter, and the second parameter includes a third sub-parameter and a fourth sub-parameter. The electronic device may drive, by using the first sub-parameter, the first motor to vibrate in the first waveform, and the electronic device may drive, by using the second sub-parameter, the second motor to vibrate in the second waveform. The electronic device may drive, by using the third sub-parameter, the first motor to vibrate in the third waveform, and the electronic device may drive, by using the fourth sub-parameter, the second motor to vibrate in the fourth waveform.

In a possible implementation, when a scene of the interface of the electronic device is a same scene, the screen direction is switched, and the second vibration mode is different from the first vibration mode. In this embodiment of this application, the first waveform and the fourth waveform are the same, the second waveform and the third waveform are the same; and when the scene of the interface of the electronic device is the same, a same vibration feeling may be brought to the user.

In a possible implementation, the first waveform is used to indicate that vibration strength of the first motor becomes weaker, and the second waveform is used to indicate that the vibration strength of the second motor becomes stronger.

In this manner, when the scene of the interface of the electronic device is a same scene, the user may have the same vibration feeling: The vibration transits from the left side to the right side, that is, stereo vibration.

In a possible implementation, positions of the first motor and the second motor in the electronic device are different. The motors are disposed in different positions, and vibration between the motors is coupled, so that the user can feel clearer vibration.

The following describes a process in which the electronic device drives the at least two motors to vibrate.

In a possible implementation, the electronic device may generate a first target configuration file, where the first target configuration file is used to indicate the first vibration mode. The electronic device may generate the first parameter based on the first target configuration file, where the first parameter is used to drive the first motor to vibrate in the first waveform and the second motor to vibrate in the second waveform. Likewise, the electronic device generates a second target configuration file, where the second target configuration file is used to indicate the second vibration mode; and the electronic device generates a second parameter based on the second configuration file, where the second parameter is used to drive the first motor to vibrate in the third waveform and the second motor to vibrate in the fourth waveform.

In a possible implementation, when at least one of the first application scene and the first screen direction is different, the first target configuration file is different; and when at least one of the first application scene and the second screen direction is different, the second target configuration file is different.

Optionally, the electronic device may obtain first target configuration information based on the first application scene, the first screen direction, and a vibration mode mapping relationship, where the vibration mode mapping relationship is used to represent a mapping relationship between an application scene of the electronic device and first configuration information, and the first target configuration information is used to represent the first screen direction; and use a first configuration file that includes the first target configuration information as the first target configuration file.

Optionally, the electronic device may obtain second target configuration information, where the second target configuration information is used to represent the second screen direction; and use a first configuration file that includes the second target configuration information as the second target configuration file. The electronic device may obtain the second target configuration information based on the first application scene, the second screen direction, and the vibration mode mapping relationship; or the electronic device may modify the first target configuration information to the second target configuration information based on the second screen direction.

In a possible implementation, the electronic device may include a first layer, a second layer, a third layer, a fourth layer, and a fifth layer. The following uses an example in which the first layer is an application layer, the second layer is a KIT layer, the third layer is an application framework layer, the fourth layer is a hardware abstraction layer, and the fifth layer is a kernel layer to describe a process in which the electronic device drives at least two motors.

The following describes a process of generating the first target configuration file by the electronic device in the following two manners:

Manner 1: The application layer obtains the first target configuration information based on the first application scene, the first screen direction, and the vibration mode mapping relationship; the application layer sends the first target configuration information to the hardware abstraction layer by using the KIT layer and the application framework layer; and the hardware abstraction layer uses a first configuration file that includes the first target configuration information as the first target configuration file.

In a possible implementation, when the first application scene is different, an identifier of the target vibration mode is different, where the target vibration mode is the first vibration mode or the second vibration mode; and when the identifier of the target vibration mode is different, initial configuration information is different, where the initial configuration information is the first target configuration information to be determined.

Manner 2: The application layer obtains the identifier of the target vibration mode based on the first application scene and the vibration mode mapping relationship, where the vibration mode mapping relationship is further used to represent a mapping relationship between an application scene of the electronic device and an identifier of the vibration mode; the application layer sends the identifier of the target vibration mode to the KIT layer; the KIT layer obtains the initial configuration information based on the identifier of the target vibration mode and the vibration mode mapping relationship, where the initial configuration information is first configuration information mapped from the identifier of the target vibration mode in the vibration mode mapping relationship; the KIT layer sends the initial configuration information to the application framework layer; the application framework layer obtains the first target configuration information based on the first screen direction and the initial configuration information; the application framework layer sends the first target configuration information to the hardware abstraction layer; and the hardware abstraction layer uses a first configuration file that includes the first target configuration information as the first target configuration file.

A difference between the foregoing two manners is as follows: The application layer obtains the first target configuration information, or the application framework layer obtains the second target configuration information. In this embodiment of this application, for different applications, it is preconfigured that the application layer obtains the first target configuration information or that the application framework layer obtains the second target configuration information.

In a possible implementation, when the first target configuration file is different, the first parameter is different; and when the second target configuration file is different, the second parameter is different.

In a possible implementation, the hardware abstraction layer sends the first target configuration file to the kernel layer; the kernel layer generates the first parameter based on the first target configuration file; the hardware abstraction layer sends the second target configuration file to the kernel layer; and the kernel layer generates the second parameter based on the first target configuration file.

In a possible implementation, the first parameter includes a first sub-parameter and a second sub-parameter, and the second parameter includes a third sub-parameter and a fourth sub-parameter. After the generating the first parameter, the method further includes: driving, by the kernel layer and by using the first sub-parameter, the first motor to vibrate, and driving, by the kernel layer and by using the second sub-parameter, the second motor to vibrate; and after the generating the second parameter, the method further includes: driving, by the kernel layer and by using the third sub-parameter, the first motor to vibrate in the third waveform, and driving, by the kernel layer and by using the fourth sub-parameter, the second motor to vibrate in the fourth waveform.

According to a second aspect, an embodiment of this application provides a vibration apparatus, including: a first motor module, a second motor module, a motor interface, a motor library module, and a motor driver.

In response to a first operation, an electronic device enters a first application scene, and the electronic device includes at least two motors; in response to that the electronic device enters the first application scene, and a screen direction of the electronic device is a first screen direction, the at least two motors vibrate in a first vibration mode; and in response to a second operation, the screen direction of the electronic device is switched from the first screen direction to a second screen direction, and the at least two motors vibrate in a second vibration mode, where the first vibration mode is different from the second vibration mode.

In a possible implementation, an interface displayed by the electronic device rotates with a screen direction of the electronic device.

In a possible implementation, a sound channel of audio played by the electronic device changes with the screen direction of the electronic device.

In a possible implementation, in response to the second operation, the screen direction of the electronic device is switched from the first screen direction to the second screen direction, the interface displayed by the electronic device does not rotate with the screen direction of the electronic device, and the at least two motors vibrate in the first vibration mode.

In a possible implementation, the at least two motors include a first motor and a second motor. The first motor vibrates in the first waveform, and the second motor vibrates in the second waveform; and the first motor vibrates in the third waveform, and the second motor vibrates in the fourth waveform, where at least one of the third waveform and the fourth waveform is different from the first waveform, and/or at least one of the third waveform and the fourth waveform is different from the second waveform.

In a possible implementation, the first waveform and the fourth waveform are the same, and the second waveform and the third waveform are the same.

In a possible implementation, the first waveform is used to indicate that vibration strength of the first motor becomes weaker, and the second waveform is used to indicate that the vibration strength of the second motor becomes stronger.

In a possible implementation, positions of the first motor and the second motor in the electronic device are different.

In a possible implementation, the motor driver is used to generate the first parameter, where the first parameter is used to drive the first motor to vibrate in the first waveform and the second motor to vibrate in the second waveform; and the motor driver is further used to generate the second parameter, where the second parameter is used to drive the first motor to vibrate in the third waveform and the second motor to vibrate in the fourth waveform.

In a possible implementation, the motor library module is configured to generate the first target configuration file, where the first target configuration file is used to indicate the first vibration mode; and the motor library module is further configured to generate the second target configuration file, where the second target configuration file is used to indicate the second vibration mode.

In a possible implementation, when at least one of the first application scene and the first screen direction is different, the first target configuration file is different; and when at least one of the first application scene and the second screen direction is different, the second target configuration file is different.

In a possible implementation, the first motor module or both the first motor module and the second motor module is/are configured to obtain first target configuration information based on the first application scene, the first screen direction, and the vibration mode mapping relationship, where the vibration mode mapping relationship is used to represent a mapping relationship between an application scene of the electronic device and the first configuration information, and the first target configuration information is used to represent the first screen direction; and the motor library module is configured to use a first configuration file that includes the first target configuration information as the first target configuration file.

In a possible implementation, the first motor module and/or the second motor module obtain/obtains the second target configuration information, where the second target configuration information is used to represent the second screen direction; and the motor library module is configured to use a first configuration file that includes the second target configuration information as the second target configuration file.

In a possible implementation, the first motor module is configured to obtain the second target configuration information based on the first application scene, the second screen direction, and the vibration mode mapping relationship; and the second motor module is configured to modify the first target configuration information to the second target configuration information based on the second screen direction.

In a possible implementation, the first application scene includes at least one of the following scenes: a scene of an interface displayed by the electronic device, a scene of vibration with music, a scene of playing audio, a scene of a user's operation on the interface of the electronic device, or an external environment in which the electronic device is located.

In a possible implementation, the electronic device includes a first layer, a second layer, a third layer, and a fourth layer; the first motor module at the first layer is configured to obtain the first target configuration information based on the first application scene, the first screen direction, and the vibration mode mapping relationship; the first motor module at the first layer sends the first target configuration information to the motor library module at the fourth layer by using a motor interface at the second layer and the second motor module at the third layer; and the motor library module at the fourth layer uses a first configuration file that includes the first target configuration information as the first target configuration file.

In a possible implementation, when the first application scene is different, an identifier of the target vibration mode is different, where the target vibration mode is the first vibration mode or the second vibration mode; and when the identifier of the target vibration mode is different, initial configuration information is different, where the initial configuration information is the first target configuration information to be determined.

In a possible implementation, the first motor module at the first layer is configured to obtain the identifier of the target vibration mode based on the first application scene and the vibration mode mapping relationship, where the vibration mode mapping relationship is further used to represent a mapping relationship between an application scene of the electronic device and an identifier of the vibration mode; the first motor module at the first layer sends the identifier of the target vibration mode to a motor interface at the second layer; the motor interface at the second layer is configured to obtain the initial configuration information based on the identifier of the target vibration mode and the vibration mode mapping relationship, where the initial configuration information is first configuration information mapped from the identifier of the target vibration mode in the vibration mode mapping relationship; the motor interface at the second layer sends the initial configuration information to a second motor module at the third layer; the second motor module at the third layer is configured to obtain the first target configuration information based on the first screen direction and the initial configuration information; the second motor module at the third layer sends the first target configuration information to the motor library module at the fourth layer; and the motor library module at the fourth layer uses a first configuration file that includes the first target configuration information as the first target configuration file.

In a possible implementation, when the first target configuration file is different, the first parameter is different; and when the second target configuration file is different, the second parameter is different.

In a possible implementation, the motor library module at the fourth layer sends the first target configuration file to the motor driver at the fifth layer; the motor driver at the fifth layer generates the first parameter based on the first target configuration file; the motor library module at the fourth layer sends the second target configuration file to the motor driver at the fifth layer; and the motor driver at the fifth layer generates the second parameter based on the first target configuration file.

In a possible implementation, the first parameter includes a first sub-parameter and a second sub-parameter, and the second parameter includes a third sub-parameter and a fourth sub-parameter; the motor at the fifth layer drives, by using the first sub-parameter, the first motor to vibrate in the first waveform, and the motor at the fifth layer drives, by using the first sub-parameter, the second motor to vibrate in the first waveform; and the motor at the fifth layer drives, by using the third sub-parameter, the first motor to vibrate in the third waveform, and the motor at the fifth layer drives, by using the fourth sub-parameter, the second motor to vibrate in the fourth waveform.

According to a third aspect, an embodiment of this application provides an electronic device, where the electronic device includes at least two motors.

In response to a first operation, the electronic device enters a first application scene, and the electronic device includes at least two motors; in response to that the electronic device enters the first application scene, and a screen direction of the electronic device is a first screen direction, the at least two motors vibrate in a first vibration mode; and in response to a second operation, the screen direction of the electronic device is switched from the first screen direction to a second screen direction, and the at least two motors vibrate in a second vibration mode, where the first vibration mode is different from the second vibration mode.

It should be understood that the at least two motors are configured to perform the foregoing vibration action according to any one of the first aspect or the possible implementations of the first aspect, and the electronic device is configured to perform the foregoing method except the vibration according to any one of the first aspect or the possible implementations of the first aspect.

According to a fourth aspect, an embodiment of this application provides an electronic device, where the electronic device includes a processor, a memory, and at least two motors.

The at least two motors are configured to generate vibration according to any one of the first aspect or the possible implementations of the first aspect, so that the electronic device vibrates. The memory is configured to store computer executable program code, where the program code includes an instruction; and when the processor executes the instruction, the instruction enables the electronic device to perform the method except the vibration according to any one of the first aspect or the possible implementations of the first aspect.

According to a fifth aspect, an embodiment of this application provides a vibration apparatus, including a unit, a module, or a circuit that is configured to perform the method according to any one of the first aspect or the possible implementations of the first aspect. The vibration apparatus may be an electronic device, or may be a module applied to the electronic device, for example, a chip applied to the electronic device.

According to a sixth aspect, an embodiment of this application provides a computer program product including an instruction, where when the computer program product runs on a computer, the computer is enabled to perform the method according to any one of the first aspect or the possible implementations of the first aspect.

According to a seventh aspect, an embodiment of this application provides a computer readable storage medium, where the computer readable storage medium stores an instruction, and when the instruction is run on a computer, the computer is enabled to perform the method according to any one of the first aspect or the possible implementations of the first aspect.

For beneficial effects of the second aspect to the possible implementations of the seventh aspect, refer to the beneficial effects of the first aspect and the possible implementations of the first aspect. Details are not described herein again.

This application provides a vibration method and apparatus, an electronic device, and a readable storage medium. The method includes: In response to a first operation, the electronic device enters a first application scene, where the electronic device includes at least two motors; in response to that the electronic device enters the first application scene, and a screen direction of the electronic device is a first screen direction, the at least two motors vibrate in a first vibration mode; and in response to a second operation, the screen direction of the electronic device is switched from the first screen direction to a second screen direction, and the at least two motors vibrate in a second vibration mode, where the first vibration mode is different from the second vibration mode. In this embodiment of this application, a vibration mode of a motor may be changed to adapt to the screen direction of the electronic device, so as to achieve an effect of adapting to a vibration feeling of a user based on the screen direction, thereby improving user experience.

BRIEF DESCRIPTION OF DRAWINGS

FIG. 5*a*-FIG. 5*d* are a schematic diagram of a screen direction;

FIG. 8*a*-FIG. 8*b* are a schematic diagram of vibration according to an embodiment of this application;

FIG. 12*a*-FIG. 12*e* are another schematic diagram of vibration according to an embodiment of this application;

DESCRIPTION OF EMBODIMENTS

Figure 1:
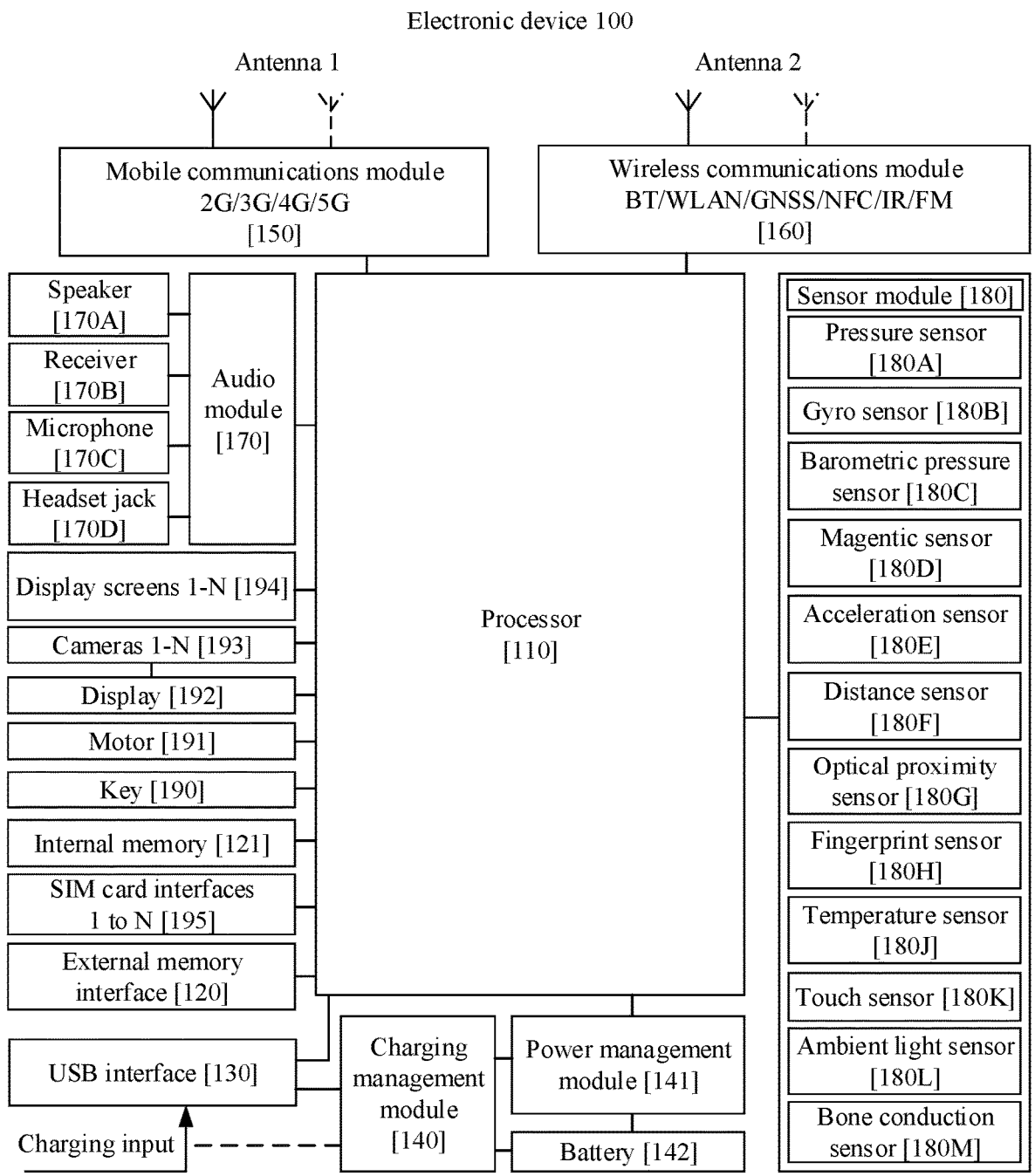
FIG. 1 is a schematic structural diagram of an electronic device to which an embodiment of this application is applicable.

FIG. 1 is a schematic structural diagram of an electronic device to which an embodiment of this application is applicable. As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor 180, a button 190, a motor 191, an indicator 192, a camera 193, a display screen 194, a subscriber identity module (subscriber identity module, SIM) card interface 195, and the like. It may be understood that the structure illustrated in this embodiment does not constitute a specific limitation on the electronic device 100. In some other embodiments of this application, the electronic device 100 may include more or fewer components than those shown in the figure, combine some components, split some components, or have different component arrangements. The illustrated components may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a display processing unit (display processing unit, DPU), and/or a neural-network processing unit (neural-network processing unit, NPU). Different processing units may be independent devices, or may be integrated into one or more processors. In some embodiments, the electronic device 100 may also include one or more processors 110. The processor may be a nerve center and a command center of the electronic device 100. The processor may generate an operation control signal based on an instruction operation code and a time sequence signal, so as to control instruction retrieval and instruction execution. A memory may be further disposed in the processor 110 to store an instruction and data. In some embodiments, the memory in the processor 110 is a cache memory. The memory can store an instruction or data that the processor 110 has used or used cyclically. If the processor 110 needs to use the instruction or data again, the instruction or data can be directly invoked from the memory. Repeated access is avoided, and a waiting time of the processor 110 is reduced, thereby improving efficiency of the electronic device 100.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/ transmitter (universal asynchronous receiver/transmitter, UART) interface, a mobile industry processor interface (mobile industry processor interface, MIPI) interface, a general-purpose input/output (general-purpose input/output, GPIO) interface, a subscriber identity module (subscriber identity module, SIM) interface, a universal serial bus (universal serial bus, USB) interface, and/or the like. The USB interface 130 is an interface that complies with USB standard specifications, and may be specifically a Mini USB interface, a Micro USB interface, a USB Type C interface, or the like. The USB interface 130 may be configured to connect to the charger to charge the electronic device 100, or may be configured to transmit data between the electronic device 100 and peripheral devices. The USB interface 130 may alternatively be configured to connect a headset and play audio by using the headset.

It can be understood that the interface connection relationship between the modules illustrated in the embodiments of this application is an example for description, and does not constitute a limitation on the structure of the electronic device 100. In some other embodiments of this application, the electronic device 100 may alternatively use an interface connection mode that is different from those in the foregoing embodiments, or use a combination of a plurality of interface connection modes.

The charging management module 140 is configured to receive a charging input from the charger. The charger may be a wireless charger, or may be a wired charger. In some embodiments of wired charging, the charging management module 140 can receive a charging input of the wired charger through the USB interface 130. In some embodiments of wireless charging, the charging management module 140 can receive a wireless charging input by using a wireless charging coil of the electronic device 100. In addition to charging the battery 142, the charging management module 140 may further supply power to the electronic device 100 by using the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, the display screen 194, the camera 193, the wireless communications module 160, and the like. The power management module 141 may be further configured to monitor parameters such as a battery capacity, the quantity of battery cycles, and a battery health status (leakage or impedance). In some other embodiments, the power management module 141 may alternatively be disposed in the processor 110. In some other embodiments, the power management module 141 and the charging management module 140 may alternatively be disposed in the same device.

The wireless communication function of the electronic device 100 can be implemented by the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna in the electronic device 100 may be configured to cover one or more communication frequency bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communications module 150 can provide a wireless communication solution including 2G/3G/4G/5G and the like applied to the electronic device 100. The mobile communications module 150 may include at least one filter, a switch, a power amplifier, a low noise amplifier, and the like. The mobile communications module 150 can receive an electromagnetic wave through the antenna 1, perform processing such as filtering and amplifying on the received electromagnetic wave, and transmit the processed electromagnetic wave to the modem processor for demodulation. The mobile communications module 150 can further amplify a signal that is modulated by the modem processor, and the signal is converted into an electromagnetic wave and radiated by the antenna 1. In some embodiments, at least some functional modules of the mobile communications module 150 may be disposed in the processor 110. In some embodiments, at least some functional modules of the mobile communications module 150 and at least some modules of the processor 110 may be disposed in the same device.

The modem processor may include a modulator and a demodulator. The modulator is configured to modulate a to-be-sent low frequency baseband signal into a medium-high frequency signal. The demodulator is configured to demodulate a received electromagnetic wave signal into a low frequency baseband signal. Then the demodulator transmits the demodulated low frequency baseband signal to a baseband processor for processing. After the low frequency baseband signal is processed by the baseband processor, the processed low frequency baseband signal is transmitted to an application processor. The application processor outputs a sound signal by using an audio device (not limited to the speaker 170A, the receiver 170B, and the like), or displays an image or video by using the display screen 194. In some embodiments, the modem processor may be an independent device. In some other embodiments, the modem processor may be independent of the processor 110 and be disposed in the same device as the mobile communications module 150 or other functional modules.

The wireless communications module 160 may provide a wireless communication solution that is applied to the electronic device 100, including wireless local area network (wireless local area network, WLAN), Bluetooth, global navigation satellite system (global navigation satellite system, GNSS), frequency modulation (frequency modulation, FM), NFC, infrared (infrared, IR), and the like. The wireless communications module 160 may be one or more devices integrating at least one communication processing module. The wireless communications module 160 receives an electromagnetic wave through the antenna 2, performs processing of frequency modulation and filtering on the electromagnetic wave signal, and sends the processed signal to the processor 110. The wireless communications module 160 can further receive a to-be-sent signal from the processor 110, and perform frequency modulation and amplification on the signal. The signal is converted into an electromagnetic wave and radiated by the antenna 2.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include GSM, GPRS, CDMA, WCDMA, TD-SCDMA, LTE, GNSS, WLAN, NFC, FM, and/or an IR technology. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device 100 may implement a display function by using the GPU, the display screen 194, the application processor, and the like. The application processor may include an NPU and a DPU. The GPU is an image processing microprocessor, which is connected to the display screen 194 and the application processor. The GPU is configured to perform mathematical and geometric calculations to render graphics. The processor 110 may include one or more GPUs that execute instructions to generate or change display information. The NPU is a neural-network (neural-network, NN) computing processor. By referring to a structure of a biological neural network, such as a transfer mode between human brain neurons, the NPU quickly processes input information, and can further perform continuous self-learning. The NPU can implement applications such as intelligent cognition of the electronic device 100, for example, image recognition, face recognition, voice recognition, and text understanding. The DPU is also referred to as a display sub-system (Display Sub-System, DSS). The DPU is configured to adjust a color of the display screen 194. The DPU may adjust the color of the display screen by using a three-dimensional look up table (3D look up table, 3D LUT). The DPU may further perform processing such as zooming, noise reduction, contrast enhancement, backlight brightness management, HDR processing, and Gamma adjustment on a display parameter.

The display screen 194 is configured to display an image, a video, and the like. The display screen 194 includes a display panel. The display panel may be a liquid crystal display (liquid crystal display, LCD), an organic light emitting diode (organic light-emitting diode, OLED), an active matrix organic light emitting diode (active-matrix organic light emitting diode, AMOLED), a flex light emitting diode (flex light-emitting diode, FLED), a Miniled, a MicroLed, a Micro-oLed, quantum dot light emitting diodes (quantum dot light emitting diodes, QLED), or the like. In some embodiments, the electronic device 100 may include 1 or N display screens 194, and N is a positive integer greater than 1.

The electronic device 100 can implement a photographing function by using an ISP, one or more cameras 193, a video codec, a GPU, one or more display screens 194, an application processor, and the like.

The external memory interface 120 may be configured to connect to an external storage card such as a Micro SD card, to expand a storage capacity of the electronic device 100. The external storage card communicates with the processor 110 through the external memory interface 120 to implement a data storage function. For example, music, video, and other files are stored in the external storage card.

The internal memory 121 may be configured to store one or more computer programs, where the one or more computer programs include instructions. The processor 110 executes various function applications and data processing of the electronic device 100 by running an instruction stored in the memory 121. The internal memory 121 may include a program storage area and a data storage area. The storage program area may store an operating system. The storage program area may further store one or more applications (such as a gallery or a contact). The data storage area may store data (such as a photo or a contact) created during use of the electronic device 100. In addition, the internal memory 121 may include a high-speed random access memory, and may further include a non-volatile memory, such as at least one magnetic disk storage device, a flash memory device, or a universal flash storage (universal flash storage, UFS). In some embodiments, the processor 110 may run the instruction stored in the internal memory 121, and/or the instruction stored in the memory disposed in the processor 110, to enable the electronic device 100 to execute various function applications and data processing of the electronic device 100.

The internal memory 121 is configured to store a vibration mode mapping relationship, a first configuration file, and a parameter mapping relationship between a vibration mode and a vibration waveform in the embodiments of this application. The vibration mode mapping relationship may include the following first mapping table, second mapping table, and third mapping table. The vibration mode mapping relationship is used to represent a mapping relationship between an application scene of the electronic device and configuration information. The configuration information may be information such as a character string. The first configuration file is used to indicate the vibration mode, so as to enable the electronic device 100 to obtain parameters of the vibration waveform based on the first configuration file. The vibration mode is used to indicate a manner of motor vibration in the electronic device 100, and the parameters of the vibration waveform are used to drive the motor vibration, and a waveform generated by the motor vibration is the vibration waveform. The parameters of the vibration waveform may include but are not limited to: vibration strength, a vibration start time, vibration duration, and a vibration type. The vibration type may be rotor vibration and/or linear vibration.

In an embodiment, the internal memory 121 may pre-store the vibration mode mapping relationship, the first configuration file, and the parameter mapping relationship between a vibration mode and a vibration waveform. In an embodiment, the user may customize the vibration mode mapping relationship, the first configuration file, and the parameter mapping relationship between a vibration mode and a vibration waveform. When the user performs customization, the internal memory 121 may pre-store the application scene, the vibration mode, the vibration mode, and the parameters of the vibration waveform of the electronic device 100 for selection by the user. The electronic device 100 may generate the vibration mode mapping relationship and the parameter mapping relationship between a vibration mode and a vibration waveform based on a selection of a user, and store the mapping relationships in the internal memory 121. It should be understood that in the following embodiment, the parameters of the vibration waveform are represented by using a first parameter, a second parameter, or another parameter.

The electronic device 100 can implement the audio functions (such as music playing and sound recording) by using the audio module 170, the speaker 170A, the receiver 170B, the microphone 170C, the headset jack 170D, the application processor, and the like. The audio module 170 is configured to convert digital audio information into an analog audio signal for output, and is further configured to convert an analog audio input into a digital audio signal. The audio module 170 may be further configured to encode and decode audio signals. In some embodiments, the audio module 170 may be arranged in the processor 110, or some of the functional modules of the audio module 170 may be arranged in the processor 110. The speaker 170A is configured to convert an audio electrical signal into a sound signal. The electronic device 100 can listen to music by using the speaker 170A, or listen to a hands-free call. The receiver 170B is configured to convert an audio electrical signal into a sound signal. When the electronic device 100 receives a call or voice message, the receiver 170B can be placed close to an ear to receive the voice. The microphone 170C, also referred to as the "loudspeaker", is configured to convert a sound signal into an electrical signal. When making a call or sending a voice message, the user can make the mouth approach the microphone 170C and emit a sound, so as to input a sound signal into the microphone 170C. The electronic device 100 may be provided with at least one microphone 170C. In some other embodiments, the electronic device 100 may be provided with two microphones 170C, which can implement noise reduction function in addition to collecting sound signals. In some other embodiments, the electronic device 100 may alternatively be provided with three, four, or more microphones 170C to implement sound signal collection, noise reduction, sound source recognition, directional recording, and the like functions. The headset jack 170D is configured to connect a wired headset. The headset jack 170D may be a USB interface 130, may be a 3.5 mm open electronic device platform (open mobile terminal platform, OMTP) standard interface, or may be a cellular telecommunications industry association of the USA (cellular telecommunications industry association of the USA, CTIA) standard interface.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal and can convert the pressure signal into an electrical signal. In some embodiments, the pressure sensor 180A may be disposed on the display screen 194. There are many types of pressure sensors 180A, such as a resistive pressure sensor, an inductive pressure sensor, and a capacitive pressure sensor. The capacitive pressure sensor may include at least two parallel plates with conductive material. When a force is applied to the pressure sensor 180A, capacitance between electrodes changes. The electronic device 100 determines strength of the pressure based on the change in capacitance. When a touch operation is applied to the display screen 194, the electronic device 100 detects strength of the touch operation based on the pressure sensor 180A. The electronic device 100 can further calculate a touch position based on the detection signal of the pressure sensor 180A. In some embodiments, touch operations that are applied to the same touch position but have different touch operation strength may be corresponding to different operation instructions. For example, when a touch operation whose touch operation strength is less than a first pressure threshold is applied to a short message application icon, an instruction for viewing a short message is executed. When a touch operation whose touch operation strength is greater than or equal to the first pressure threshold is applied to the short message application icon, an instruction for creating a short message is executed.

The gyro sensor 180B may be configured to determine a movement posture of the electronic device 100. In some embodiments, the gyro sensor 180B may be configured to determine angular velocities of the electronic device 100 around three axes (that is, x, y, and z axes). The gyro sensor 180B can be used for image stabilization. For example, when a shutter is pressed, the gyro sensor 180B detects a vibration angle of the electronic device 100, calculates, based on the angle, a distance that a lens module needs to compensate, so that the lens counteracts the vibration of the electronic device 100 through reverse movement to implement image stabilization. The gyro sensor 180B can further be used for navigation and somatosensory game scenes.

The acceleration sensor 180E can detect magnitudes of acceleration of the electronic device 100 in various directions (generally three axes). When the electronic device 100 is still, a value and a direction of gravity may be detected. The acceleration sensor 180E may be further configured to identify the posture of the electronic device, and be used in applications such as switching between a landscape screen and a portrait screen, and a pedometer.

The distance sensor 180F is configured to measure a distance. The electronic device 100 can measure the distance by using infrared or laser. In some embodiments, in a photographing scene, the electronic device 100 may use the distance sensor 180F to measure a distance to implement quick focusing.

The key 190 includes a power-on key, a volume key, or the like. The key 190 may be a mechanical key, or may be a touch key. The electronic device 100 can receive a key input, and generate a key signal input related to user setting and function control of the electronic device 100.

The motor 191 may be a rotor motor and/or a linear motor, and the linear motor is an X-axis linear motor or a Z-axis linear motor. The electronic device may include at least one motor 191. Motor movement, such as motor rotation or linear movement, can generate vibration, which in turn causes the electronic device to vibrate. When the electronic device 100 includes at least two motors, the at least two motors may be of a same type. For example, the motors may be both rotor motors, X-axis linear motors, or Z-axis linear motors. Alternatively, the at least two motors may be of different types, or at least some of the motors may be of different types, or at least some of the motors may be of a same type.

The SIM card interface 195 is configured to connect an SIM card. An SIM card can be inserted into the SIM card interface 195 or pulled out from the SIM card interface 195 to implement contact with or separation from the electronic device 100. The electronic device 100 can support 1 or N SIM card interfaces, where N is a positive integer greater than 1. The SIM card interface 195 can support a Nano SIM card, a Micro SIM card, an SIM card, and the like. A plurality of cards may be inserted into a same SIM card interface 195 at a time. The plurality of cards may be of a same type or different types. The SIM card interface 195 may also be compatible with different types of SIM cards. The SIM card interface 195 may also be compatible with an external storage card. The electronic device 100 interacts with the network by using the SIM card to implement functions such as call and data communication. In some embodiments, the electronic device 100 uses an eSIM, that is, an embedded SIM card, and the eSIM card may be embedded in the electronic device 100.

Figure 2:
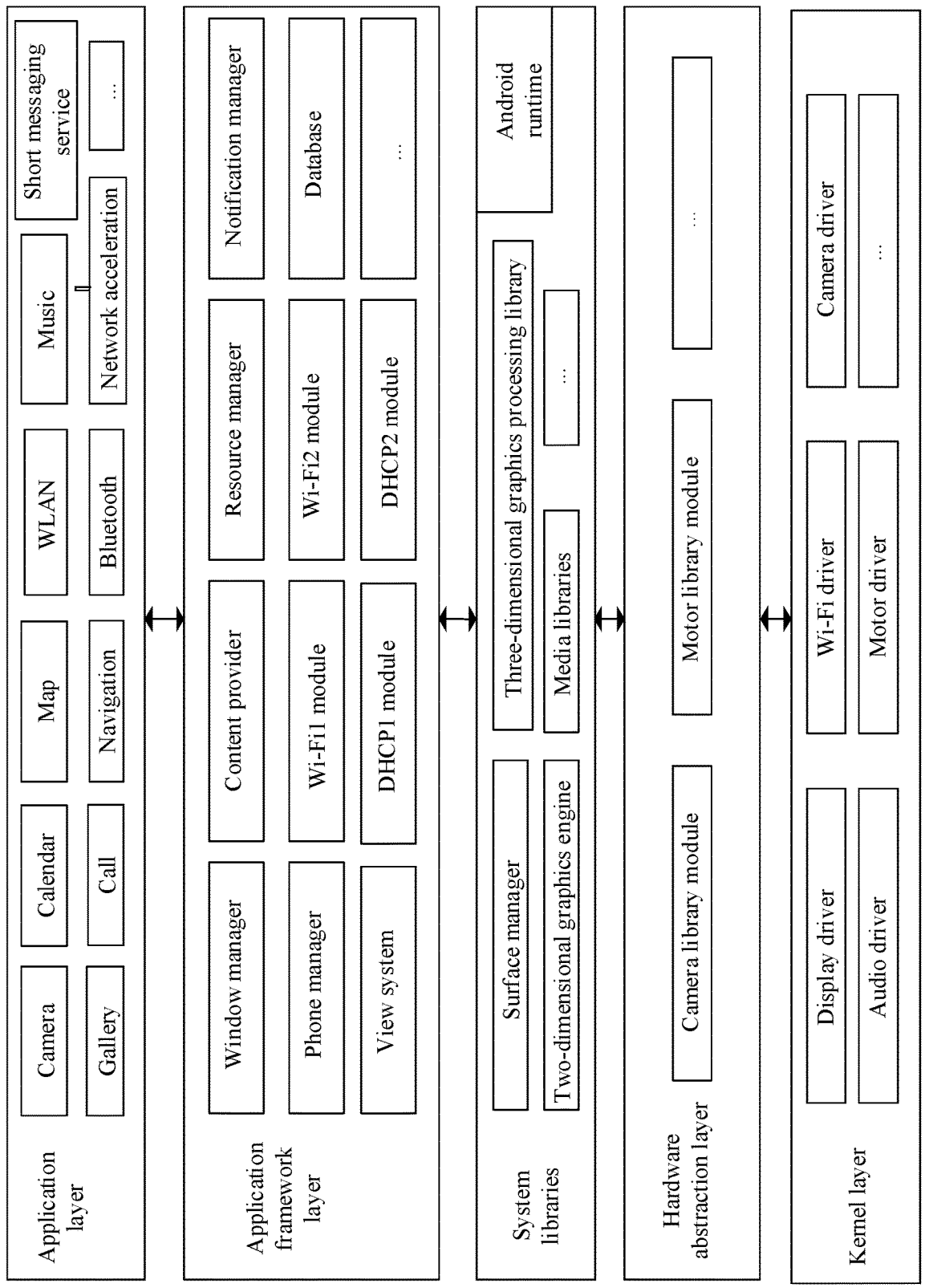
FIG. 2 is a block diagram of a software architecture of an electronic device to which an embodiment of this application is applicable.

A software system of the electronic device 100 may use a layered architecture, an event-driven architecture, a micro-core architecture, a micro-service architecture, or a cloud architecture. In this embodiment of this application, an android system with a hierarchical architecture is used as an example to describe a software architecture of the electronic device 100. FIG. 2 is a block diagram of a software architecture of an electronic device to which an embodiment of this application is applicable. The layered architecture divides a software system of the electronic device 100 into several layers, and each layer has a clear role and division of labor. The layers communicate with each other through software interfaces. In some embodiments, the Android system may be divided into five layers: an application layer (applications), an application framework (application framework), Android runtime (Android runtime), a system library, a hardware abstraction layer (hardware abstraction layer, HAL), and a kernel layer (kernel).

The application layer may include a series of application packages, and the application layer runs the applications by invoking an application programming interfaces (application programming interfaces, APIs) provided by the application framework layer. As shown in FIG. 2, the application packages may include applications such as camera, gallery, calendar, call, map, navigation, WLAN, Bluetooth, music, video, and short messaging service.

The application framework layer provides APIs and a programming framework for the applications at the application layer. The application framework layer includes some predefined functions. As shown in FIG. 2, the application framework layer may include a window manager, a content provider, a view system, a phone manager, a resource manager, and a notification manager.

The window manager is configured to manage window programs. The window manager can obtain the size of the display screen, determine whether there is a status bar, lock the screen, take a screenshot, and the like. The content provider is configured to store and obtain data, and enables these data to be accessible to an application. The data may include videos, images, audio, calls made and received, browsing history and bookmarks, phone books, and the like. The view system includes visual controls, such as a control for displaying text and a control for displaying pictures. The view system may be configured to build an application. A display interface may include one or more views. For example, a display interface that includes a short messaging service notification icon may include a view for displaying text and a view for displaying pictures. The phone manager is configured to provide communication functions of an electronic device 100, such as call state management (including connecting, hanging up, or the like). The resource manager provides resources for applications, such as localized strings, icons, images, layout files, and video files. The notification manager enables an application to display notification information in the status bar, which can be used to convey a notification-type message, and can automatically disappear after a short stay without user interaction. For example, the notification manager is used for notifying download completion or as a message reminder. The notification manager may alternatively be a notification that appears in the status bar at the top of the system in the form of a chart or scroll bar text, such as a notification for an application running in the background, or a notification that appear on the screen in the form of a dialog window. For example, a text message is displayed in the status bar, a prompt tone is made, the electronic device 100 is vibrating, or an indicator light is flashing.

The Android runtime includes a core library and a virtual machine. When running, Android is responsible for scheduling and management of the Android system. The core library includes two parts: one part is function functions that the java language needs to invoke, and the other part is the core library of Android. The application layer and the application framework layer run in a virtual machine. The virtual machine executes java files at the application layer and the application framework layer as binary files. The virtual machine is configured to implement functions such as object lifecycle management, stack management, thread management, security and exception management, and recycling of waste. A system library may include a plurality of functional modules, such as a surface manager (surface manager), media libraries (Media Libraries), three-dimensional graphics processing library (for example, OpenGL ES), and a 2D graphics engine (for example, SGL).

The surface manager is configured to manage a display subsystem, and provide fusion of 2D and 3D layers for a plurality of applications. The media libraries support a plurality of common audio and video formats for playback and recording, as well as static image files. The media library may support a plurality of audio and video coding formats, such as MPEG4, H.264, MP3, AAC, AMR, JPG, and PNG. The three-dimensional graphics processing library is configured to achieve three-dimensional graphics drawing, image rendering, compositing, and layer processing. The 2D graphics engine is a graphics engine for 2D graphics.

The hardware abstraction layer may include a plurality of library modules, and the library module may be a camera library module, a motor library module, or the like. The Android system may load a corresponding library module for the device hardware, so that the application framework layer can access the device hardware. The device hardware may include, for example, a motor and a camera in the electronic device.

The kernel layer is a layer between hardware and software. The kernel layer is used to drive hardware, so that the hardware works. The kernel layer includes at least a display driver, a camera driver, an audio driver, a sensor driver, a motor driver, and the like. This is not limited in this embodiment of this application. For example, in this embodiment of this application, the kernel layer uses the motor driver to drive a motor (hardware) in the electronic device 100 to move, so as to generate vibration.

Figure 3:
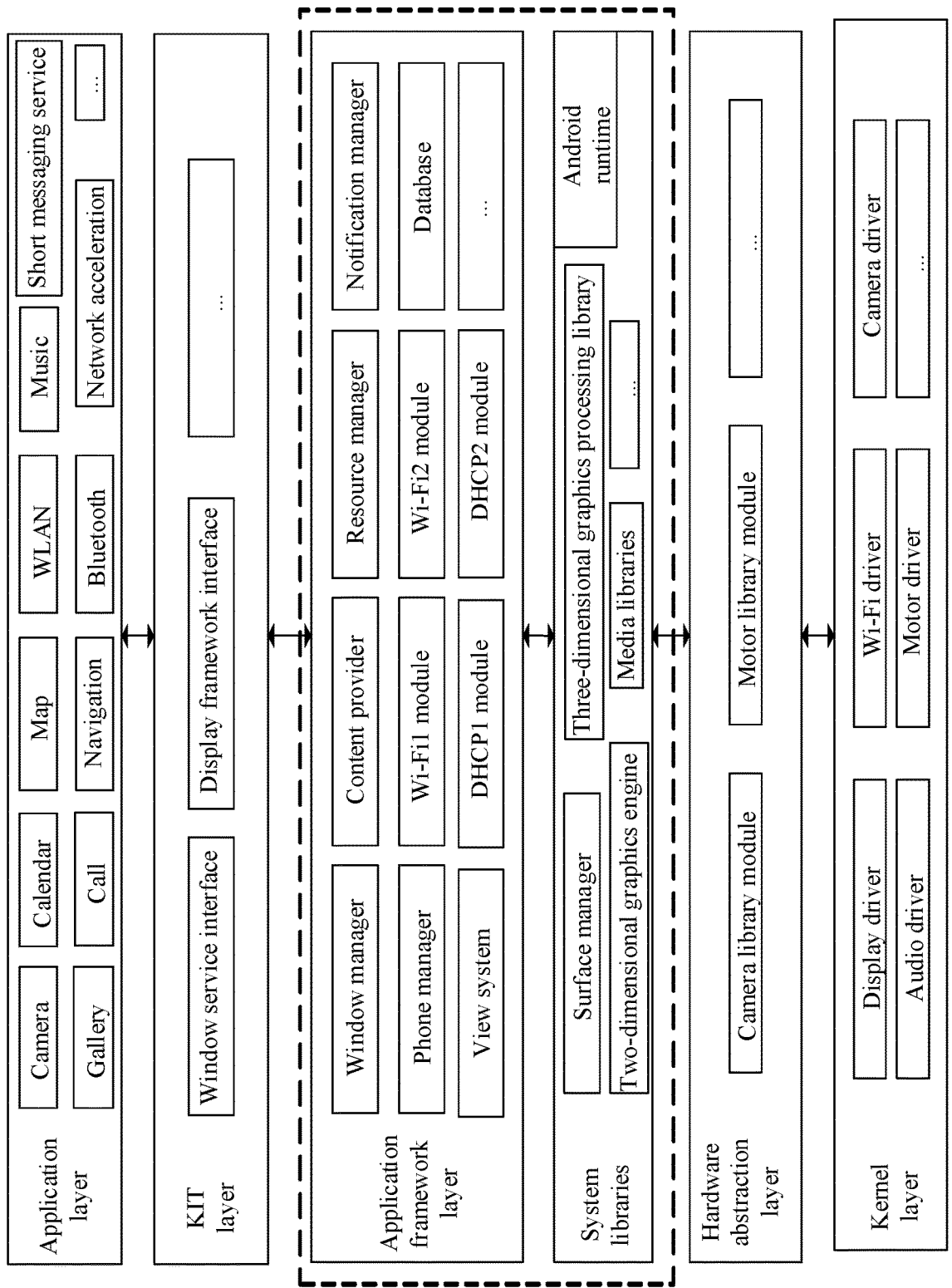
FIG. 3 is a block diagram of another software architecture of an electronic device to which an embodiment of this application is applicable.

In an embodiment, FIG. 3 is a block diagram of another software architecture of an electronic device to which this embodiment of this application is applicable. In FIG. 3, the application framework layer, the Android runtime, and the system library shown in FIG. 2 are used as a layer, (in the following embodiment, an example in which this layer is an application framework layer is used for description), and a communications interface between the application layer and the application framework layer is used as a separate tool kit (KIT) layer for description. The KIT layer may include a window service interface, a display frame interface, and the like.

In an embodiment, the software architecture of the electronic device may include a first layer, a second layer, a third layer, a fourth layer, and a fifth layer. In the following embodiment, an example in which the first layer is an application layer, the second layer is a KIT layer, the third layer is an application framework layer, the fourth layer is a hardware abstraction layer, and the fifth layer is a kernel layer is used for description. It should be understood that in some embodiments, a layer that implements a same function may have another name, or a layer that can implement functions of a plurality of layers is used as one layer, or a layer that can implement functions of a plurality of layers is divided into a plurality of layers.

Figure 4:
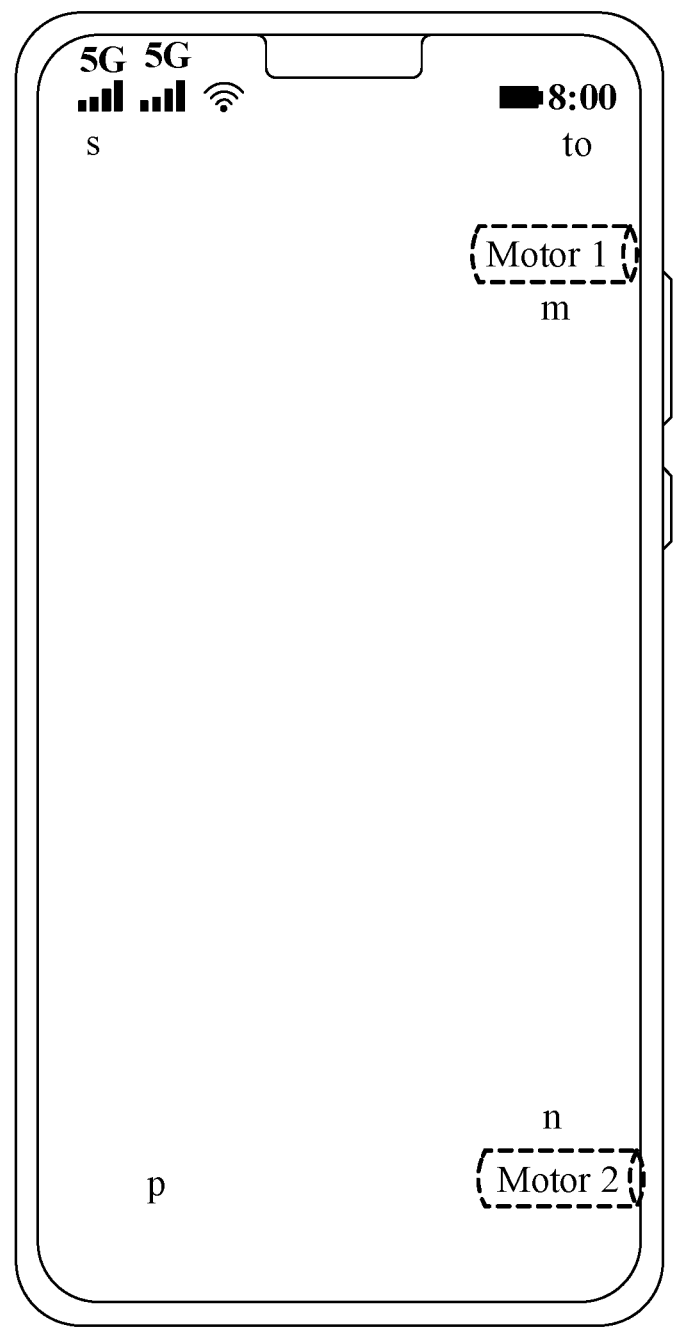
FIG. 4 is a schematic diagram of an arrangement of motors according to an embodiment of this application.

FIG. 4 is a schematic diagram of an arrangement of motors according to an embodiment of this application. In FIG. 4, that the electronic device 100 includes two motors is used as an example for description. In this embodiment of this application, the electronic device 100 may further include more or fewer motors. FIG. 4 does not constitute a limitation on a quantity and the arrangement of the motors in the electronic device 100. As shown in FIG. 4, a motor 1 and a motor 2 are disposed in the electronic device 100, and the motor 1 and the motor 2 may be respectively disposed at two ends of the electronic device 100. For example, the motor 1 may be disposed in a position m of the electronic device 100, and the motor 2 may be disposed in a position n of the electronic device 100. It should be understood that the motor 1 and the motor 2 are disposed inside the electronic device 100. To represent a position of the motor in the figure, a dashed line is used on a surface of the electronic device 100. FIG. 4 shows an example arrangement of the motors. In this embodiment of this application, the motor 1 and the motor 2 may be disposed diagonally (for example, a position o and a position p), or arranged at a same end of the electronic device 100 (for example, a position s and a position t). The following embodiment describes, with reference to the software architecture shown in FIG. 3 and the motor arrangement manner shown in FIG. 4, the vibration method of the electronic device provided in this embodiment of this application.

Definitions of Terms in this Embodiment of this Application:

Screen direction: In this embodiment of this application, the screen direction may include a horizontal screen and a vertical screen. The vertical screen may include a first direction and a third direction, and the horizontal screen may include a second direction and a fourth direction. In this embodiment of this application, the vertical screen when the electronic device is facing forward may be used as the first direction, as shown in FIG. 5b. A clockwise rotation of 90° in the first direction is the second direction, a clockwise rotation of 90° in the second direction is the third direction, and a clockwise rotation of 90° in the third direction is the fourth direction. The first direction, the second direction, the third direction, and the fourth direction may be respectively shown in FIG. 5a, FIG. 5b, FIG. 5c, and FIG. 5d. It should be understood that in FIG. 5a-FIG. 5d, an example in which the electronic device is a mobile phone is used as an example for description.

Figure 6:
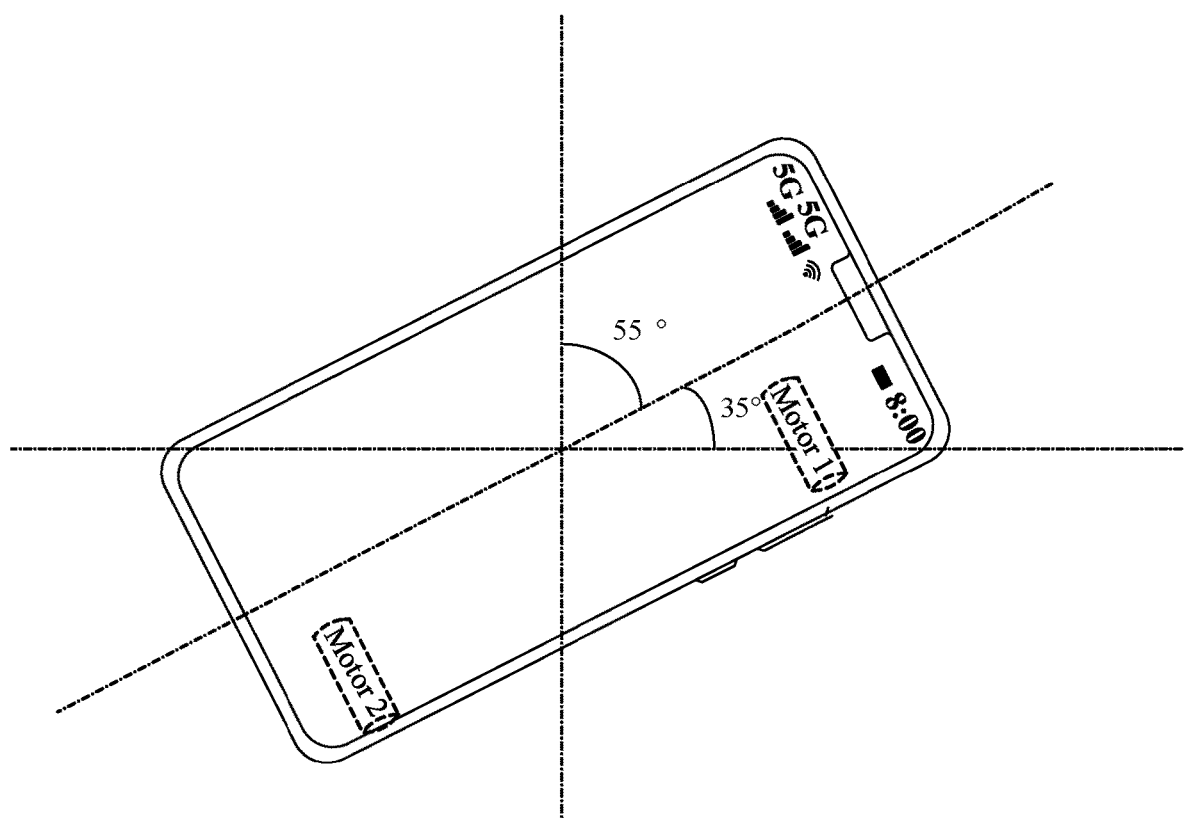
FIG. 6 is a schematic diagram of determining a screen direction.

It should be understood that if the electronic device is located between two screen directions, in this embodiment of this application, included angles between a vertical center line of the electronic device and vertical center lines of the electronic device when the electronic device is in the two screen directions may be obtained, and the screen direction with a relatively small included angle is used as the screen direction of the electronic device. For example, as shown in FIG. 6, the electronic device is located between the first direction and the second direction. In this embodiment of this application, a first included angle or/and a second included angle may be obtained, where the first included angle is the included angle between the vertical center line of the electronic device and the vertical center line of the electronic device in a first direction, for example, 55°, and the second included angle is the included angle between the vertical center line of the electronic device and the vertical center line of the electronic device in a second direction, for example, 35°, and the second direction with a relatively small included angle is used as the screen direction of the electronic device. It should be understood that the vertical center line of the electronic device may be shown by the dash dotted line shown in FIG. 6.

Master motor: a predefined motor. For example, in this embodiment of this application, the motor 2 in FIG. 4 may be predefined as the master motor.

Left motor and right motor: predefined motors. For example, in this embodiment of this application, the motor 2 in FIG. 4 may be predefined as the left motor and the motor 1 as the right motor. It should be understood that in the following embodiment, an example in which the first motor is the left motor, and the second motor is the right motor is used for description. The first motor and the second motor are disposed in different positions in the electronic device, as shown in FIG. 4.

An embodiment of this application provides a vibration method, so as to determine, based on an application scene of an electronic device, whether to use a single motor or a plurality of motors to implement different types of vibration, which brings a more diversified and stereo sense of vibration to the user and improve the user experience.

Figure 7A:
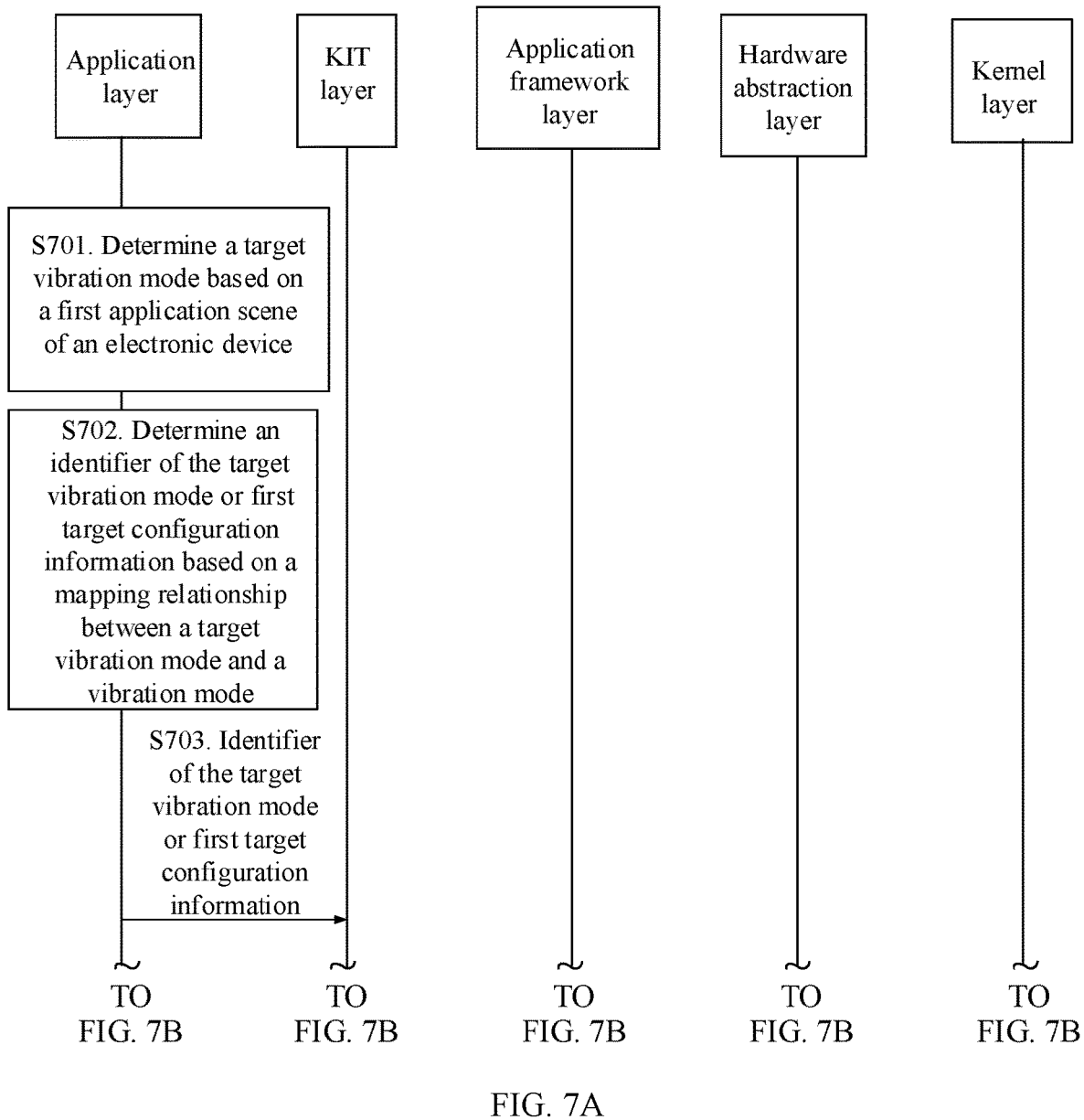
FIG. 7A-FIG. 7B are a schematic flowchart of an embodiment of a vibration method according to an embodiment of this application.
Figure 7B:
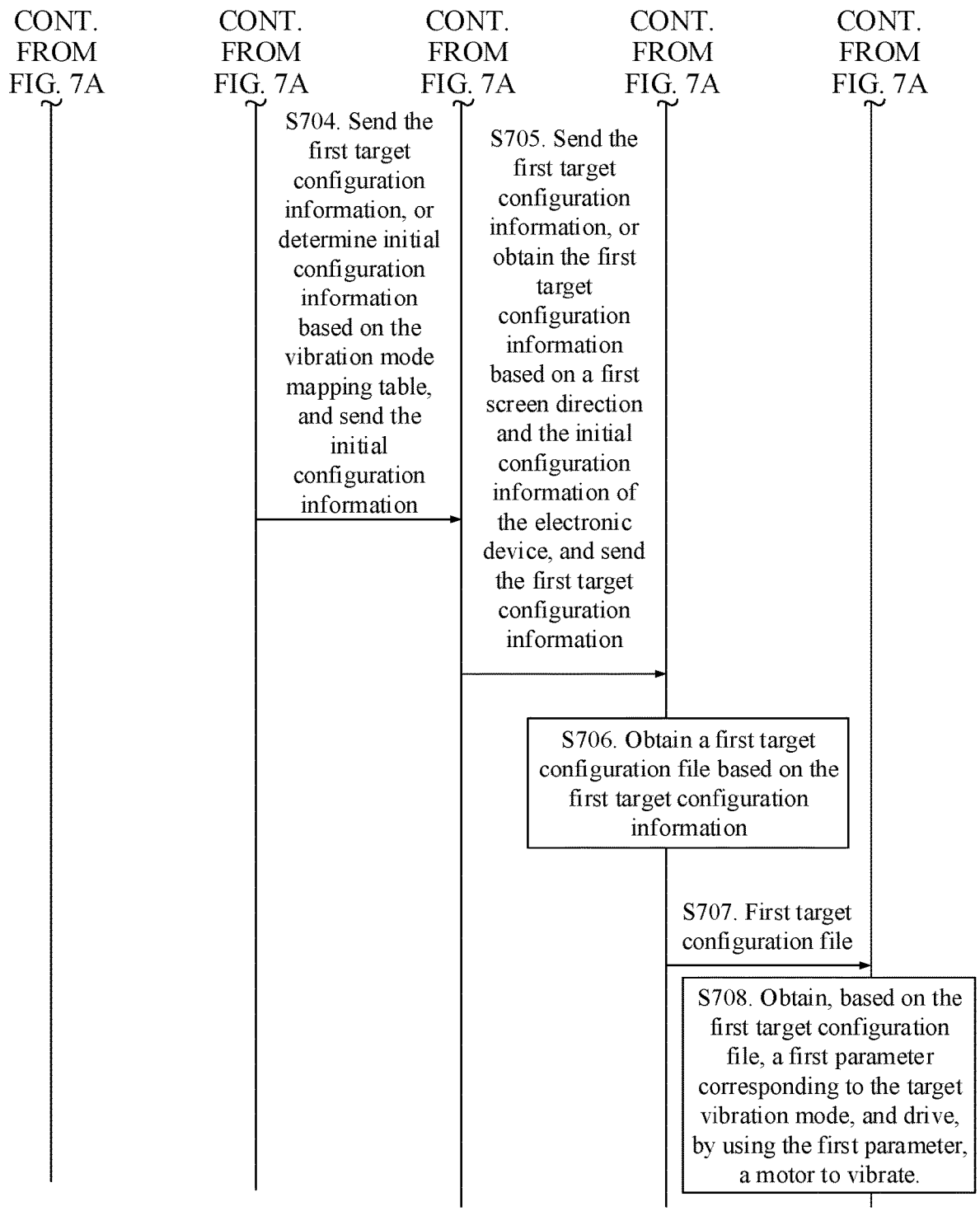

The vibration method provided in this application is described below with reference to specific embodiments. The following embodiments may be combined with each other, and a same or similar concept or process is not described again. FIG. 7A-FIG. 7B are a schematic flowchart of an embodiment of a vibration method according to an embodiment of this application. As shown in FIG. 7A-FIG. 7B, the vibration method according to this embodiment of this application may include the following steps.

S701. An application layer determines a target vibration mode based on a first application scene of an electronic device.

When the user uses an application with vibration feedback on the electronic device, or when the electronic device receives a call or a short message, the electronic device may perform vibration feedback. An application with vibration feedback may be but is not limited to an audio/video playback application, an input method application, a game application, and a clock application. The first application scene of the electronic device may be an application running on the current electronic device, a scene in which the electronic device receives a call, or a scene in which the electronic device receives a short message. To facilitate distinguishing between a current application scene of the electronic device and another application scene, in this embodiment of this application, the first application scene is used as the current application scene of the electronic device. It should be understood that when the first application scene of the electronic device is different, a target vibration mode of the electronic device is different. Alternatively, in an embodiment, at least some different first application scenes are corresponding to different target vibration modes, or some different first application scenes may be corresponding to a same target vibration mode. When the vibration mode is different, at least one of the following vibration parameters of the motor in the electronic device is different: the quantity of vibrating motors, vibration strength, start vibration time, vibration duration, and a vibration type. The vibration type may be but is not limited to rotor vibration and/or linear vibration.

In an embodiment, the electronic device may enter the first application scene in response to a first operation. The first operation may be but is not limited to an operation of a user or an operation of an element inside the electronic device. An operation of the user may be but is not limited to: triggering, by the user, an interface of the electronic device, voicing, carrying, by the user, the electronic device from an external environment to another external environment, and the like. An operation of an element inside the electronic device may be but is not limited to an operation of delivering an instruction by a processor in the electronic device, an operation of detecting a change in a screen direction by the application layer, and the like.

In an embodiment, S701 may be replaced with: A first motor module at an application layer determines a target vibration mode based on an application scene of an electronic device. The first motor module may be a module that is at an application layer and that is configured to perform an action related to motor vibration. The following uses the application layer to represent the first motor module at the application layer for description.

In a possible implementation, the first application scene of the electronic device may be a scene of an interface displayed by the electronic device. The application layer may determine the target vibration mode based on the scene of the interface. Optionally, the scene of the interface is different, and the target vibration mode is different. For example, when the application is a game-type application, the scene of the interface may be a scene in which a game is enabled, a scene in which a character is upgraded, or a scene in which stage clearance rewarding is performed. Specifically, the scene of the interface of the game-type application may be shown in Table 1. Optionally, the application layer may include a stack used to store information about an interface, and a top of the stack includes information about a current interface displayed by the electronic device. The information about the current interface may include but is not limited to a scene of the current interface, a control on the current interface, or a coordinate position of a control on the current interface. The control on the current interface may include a shooting control, a direction control, and the like, and is used to control an action of a role in a game. The coordinate position of the control refers to a coordinate position of the control on the interface of the electronic device. In this manner, the application layer may query the top of the stack to obtain the information about the current interface, so as to obtain the scene of the interface displayed by the electronic device.

In this embodiment of this application, the application layer may store a first mapping table. The first mapping table is used to represent a mapping relationship between a scene of an interface, an identifier of a vibration mode, and first configuration information, as shown in Table 1. The identifier of the vibration mode may be a number, a character, or the like, and the identifier of the vibration mode is used to distinguish between different vibration modes. This embodiment of this application imposes no limitation on the identifier of the vibration mode. A code including a number and a letter is used as an example in Table 1 for description. The first configuration information is used to enable the KIT layer and the application framework layer to determine the target vibration mode. Optionally, the first configuration information may be information such as a string. In an embodiment, the first mapping table may further include a description of a vibration mode corresponding to a scene of an interface. The description of the vibration mode is used to indicate the vibration mode, so as to distinguish between vibration modes corresponding to scenes of different interfaces. In an embodiment, the identifier of a vibration mode may also be replaced with the identifier of a scene of an interface, and the identifier of the scene of the interface is used to distinguish between different scenes of the interface.

It should be understood that the application layer may further store the first mapping table in a database format or an extensible markup language (extensible markup language, XML) format. Table 1 shows an example format of the first mapping table. The application layer may determine the target vibration mode based on the scene of the interface and the first mapping table. In an embodiment, the electronic device may represent the target vibration mode by using an identifier of the vibration mode (the identifier of the scene of the interface), a description of the vibration mode, or the first configuration information.

TABLE 1

| Identifier of a vibration mode | Scene of an interface | Description of the vibration mode | First configuration information |
| --- | --- | --- | --- |
| 1A | Vibration when a countdown timer is enabled before each round of a battle is entered, reminding the player that the game is about to start | Dual-motor vibration 1 | haptic.game_qmqz.start_dual |
| 2A | Stage clearance vibration | Dual-motor vibration 2 | haptic.game_qmqz.pass_dual |
| 3A | Vibration when the score/ranking is high, similar to MVP rewarding. | Dual-motor vibration 3 | haptic.game_qmqz.mvp_dual |
| 4A | Vibration when purchasing/assembling special equipment/skins | Dual-motor vibration 4 | haptic.game_qmqz.cheer_dual |
| 5A | Vibration when shooting | Dual-motor vibration 5 | haptic.game_qmqz.shoot1_dual |
| 6A | Vibration when under attack | Dual-motor vibration 6 | haptic.game_qmqz.Shoot2_dual |
| 7A | Vibration when blood volume is less than 10% | Dual-motor vibration 7 | haptic.game_qz.Shoot_dual |
| 8A | Vibration caused by footsteps, indicating that a person is coming from the left side | Single-motor vibration 8 | haptic.game_qz.left_l |
| 9A | Vibration caused by footsteps, indicating that a person is coming from the right side | Single-motor vibration 9 | haptic.game_qz.right_r |
| 10A | Vibration caused by music on the main interface | Vibration with music | haptic.game_qz.music_dual |
| 11A | Vibration when a game is enabled | Vibration transits from the left side to the right side | haptic.game_qz.open_ltor; haptic.game_qz.open_rtol |
| 12A | Vibration when a character is upgraded | Dual-motor vibration (short vibration) | haptic.game_qz.promote_dual |
| 13A | Vibration when a message is received from a friend | Dual-motor vibration (intermittent vibration) | haptic.game_qz.news_dual |
| 14A | Vibration when recharging succeeds | Dual-motor vibration 10 | haptic.game_qz.first_dual |
| 15A | Vibration when equipment reinforcement succeeds | Vibration from center to both sides | haptic.game_qz.stren_rtol haptic.game_qz.stren_ltor |

For example, as shown in Table 1, when the scene of the interface displayed by the electronic device is a character upgrade scene, the application layer may determine, based on the character upgrade scene and the first mapping table, that a target vibration mode corresponding to the character upgrade scene is "dual-motor vibration (short vibration)".

As shown in Table 1, the description of the vibration mode is "dual-motor vibration". There may be different dual-motor vibration modes. In Table 1, "dual-motor vibration 1" and "dual-motor vibration 2" are used to distinguish between different dual-motor vibration modes. A suffix "dual" of the string in the first configuration information indicates dual-motor vibration. A suffix "rtol" means that the vibration transits from the right motor to the left motor, and "ltor" means that the vibration transits from the left motor to the right motor. A suffix "left_l" or "Onlyl" indicates that only the left motor vibrates. A suffix "right_r" or "Onlyr" indicates that only the right motor vibrates. It should be noted that the target vibration mode in this embodiment of this application may be vibration of a motor of a target type, and the motor of the target type may be, for example, an X-axis linear motor, a Z-axis linear motor, or a rotor motor. For example, "X" in the first configuration information "haptic.game_qz.stren_X" may indicate that the target vibration mode is X-axis linear motor vibration, "Z" in the first configuration information "haptic.game_qz.stren_Z" may indicate that the target vibration mode is Z-axis linear motor vibration, and "0" in the first configuration information "haptic.game_qz.stren_O" may indicate that the target vibration mode is rotor motor vibration, which are not shown in Table 1. In the following embodiment, Table 1 is used as an example for description.

In an embodiment, the first configuration information in Table 1 may not include a suffix. In an embodiment, the first configuration information may not include the suffix "rtol", "ltor", "left 1", "Onlyl", "right_r", or "Onlyr". Further, the application layer or the application framework layer adds a suffix to the first configuration information based on the screen direction of the electronic device. For details, refer to the following related descriptions of the application layer and the application framework layer. In an embodiment, the first configuration information may not include the suffix "dual", but the hardware abstraction layer adds a suffix to the first configuration information. For details, refer to the following related descriptions of the hardware abstraction layer.

In a possible implementation, the application scene of the electronic device may be vibration with music. When the electronic device plays different audio, the target vibration mode is different. For an audio playback application, the application framework layer may obtain a to-be-played audio file, and the audio file may be a wave sound (way) file. The way file may include a sound channel of audio. The sound channel may be a left channel, a right channel, dual-channel, or multi-channel. The foregoing application layer may invoke the API of the KIT layer to obtain the sound channel of the audio from the application framework layer, and then determine the target vibration mode based on the sound channel of the audio. For example, if the sound channel of the audio is the left channel, the application layer may determine that the target vibration mode is left-motor vibration. If the sound channel of the audio is the right channel, the application layer may determine that the target vibration mode is right-motor vibration. If the sound channel of the audio is dual-channel, the application layer may determine that the target vibration mode is left-motor vibration and right-motor vibration. In an implementation, the electronic device may include at least three motors. If the sound channel of the audio is multi-channel, the application layer may determine that the target vibration mode is that at least three motor vibrate.

It should be understood that the "vibration with music" scene shown in the Table 1 may be classified as "an application scene of the electronic device is vibration with music", or may be classified as "an application scene of the electronic device is a scene of the interface". However, regardless of the classification, the motor may vibrate with the sound channel of the audio.

In a possible implementation, the application scene of the electronic device may be an audio playback scene. Optionally, different audio may be corresponding to different target vibration modes. The application layer may obtain an identifier of the audio played by the electronic device, and then determine the target vibration mode based on the identifier of the audio. The audio identifier may be but is not limited to a name of the audio, a number of the audio, and the like.

In a possible implementation, the application scene of the electronic device may be a screen direction of the electronic device. Optionally, when the screen direction of the electronic device is different, the target vibration mode is different. The application layer may obtain the screen direction, and then determine the target vibration mode based on the screen direction. Optionally, the application layer may invoke an API that is at the KIT layer and that is used to detect a screen direction, to obtain the screen direction of the electronic device. The API used to detect the screen direction may be a window service (window service) interface or a display FWK (display FWK) interface. Optionally, the application layer invokes an API that is at the KIT layer and that is used to obtain data of a sensor, to obtain data from the sensor. The sensor is, for example, a gyro sensor and/or an acceleration sensor. The application layer may obtain the screen direction of the electronic device based on the data of the sensor. For example, when the data range of the data of the sensor is different, the screen direction of the electronic device is different.

In this embodiment of this application, the application layer may store a second mapping table. The second mapping table is used to represent a mapping relationship between a screen direction, an identifier of the vibration mode, and the first configuration information, as shown in Table 2. The application layer may determine the target vibration mode based on the screen direction and the second mapping table. For example, when the electronic device is a vertical screen, the application layer determines, based on the vertical screen and the second mapping table, that the target vibration mode is master-motor vibration. When the electronic device is a horizontal screen, the target vibration mode may be dual-motor vibration, for example, both the motor 1 and the motor 2 vibrate. In a possible embodiment, the second mapping table may include a description of the vibration mode corresponding to the identifier of the vibration mode.

TABLE 2

| Identifier of a vibration mode | Screen direction | Description of the vibration mode | First configuration information |
| --- | --- | --- | --- |
| 1B | Vertical screen | Master motor vibration | haptic.shurufa3 |
| 2B | Horizontal screen | Dual-motor vibration | haptic.shurufa4 |

In a possible implementation, the application scene of the electronic device may be an operation performed by the user on the interface of the electronic device. The application layer may determine the target vibration mode based on information about the operation performed by the user on the interface of the electronic device. Optionally, when the operation information is different, the target vibration mode is different. The operation information may include an operation position and/or an operation action of the user, the operation position may be a coordinate position where the user performs the operation on the interface, and the operation action may include but is not limited to tapping, double tapping, and sliding. It should be understood that when the user performs an operation on the interface of the electronic device, the application layer may receive touch information from a touch panel (touch panel), where the touch information may be referred to as TP information, and the TP information may include information about the operation performed by the user on the interface of the electronic device, so that the application layer may obtain the operation performed by the user on the interface of the electronic device.

Optionally, the application layer may determine the target vibration mode based on the operation position of the user. Optionally, when the operation position of the user is different, the target vibration mode is different. For example, as shown in FIG. 4, if the operation position of the user is close to the right motor (motor 1), it may be determined that the target vibration mode is right-motor vibration. If the operation position of the user is close to the left motor (motor 2), it may be determined that the target vibration mode is left-motor vibration. It should be understood that in this embodiment of this application, the screen of the electronic device may be pre-divided into an area close to the left motor and an area close to the right motor. When the operation position of the user is in the area close to the left motor, it may be determined that the operation position of the user is close to the left motor. When the operation position of the user is in the area close to the right motor, it may be determined that the operation position of the user is close to the right motor. It should be understood that, when the electronic device includes a plurality of motors, the screen of the electronic device may be pre-divided into a plurality of areas based on positions of the motors, so as to determine a motor close to the operation position of the user.

Optionally, the application layer may determine the target vibration mode based on an operation action of the user. Optionally, when the operation action of the user is different, the target vibration mode is different. For example, if the operation action of the user is tapping, the target vibration mode may be master-motor vibration; or if the operation action of the user is sliding, the target vibration mode may be dual-motor vibration.

Optionally, the application layer may determine the target vibration mode based on the operation position and the operation action of the user. When the operation position and/or the operation action of the user are/is different, the target vibration mode is different. For example, as shown in FIG. 4, based on an operation position and an operation action of the user, if it is determined that the user slides from bottom to top, the application layer may determine that the target vibration mode is that vibration transits from the motor 1 to the motor 2. For example, vibration strength of the motor 2 becomes weak, and vibration strength of the motor 1 becomes strong, which brings a vibration feeling from bottom to top to the user.

In this manner, the application layer may store a third mapping table. The third mapping table is used to represent a mapping relationship between information about an operation performed by the user on the interface of the electronic device, an identifier of the vibration mode, and the first configuration information, as shown in Table 3. The application layer may determine the target vibration mode based on the information about an operation performed by the user on the interface of the electronic device and the third mapping table. In an embodiment, the third mapping table may include a description of the vibration mode corresponding to the identifier of the vibration mode.

TABLE 3

| Identifier of a vibration mode | Operation position and/or operation action | Description of the vibration mode | First configuration information |
|---|---|---|---|
| 2C | The operation position is close to the left motor. | Single-motor vibration (left-motor vibration) | haptic.shurufa |
| 3C | Slide from bottom to top | Dual-motor vibration (transiting from the lower side to the upper side) | haptic.clock1 |

In a possible implementation, the application scene of the electronic device may be an external environment in which the electronic device is located. Optionally, when the external environment in which the electronic device is located is different, the target vibration mode is different.

Optionally, the application layer may determine, based on time, whether the external environment in which the electronic device is located is night or daytime. If it is a night (for example, 24:00 to 6:00), the target vibration mode may be single-motor vibration.

Optionally, the application layer may determine, based on schedule information, ticket information, and payment information that are in the electronic device, that the external environment in which the electronic device is located is a movie watching environment, a shopping environment, a bus ride environment, or the like. For the movie watching environment, for example, when the electronic device receives a call, the target vibration mode may be single-motor vibration. For the movie watching environment, for example, when the electronic device receives a call, the target vibration mode may be dual-motor vibration. A vibration sense of a single motor is weaker than a vibration sense of dual motors, so that a user can be prompted based on the external environment in which the electronic device is located in a vibration manner that fits the environment, thereby improving user experience.

Optionally, the application layer may detect the quantity of decibels of noise in the external environment in which the electronic device is located. If the quantity of decibels of the noise is greater than a preset quantity of decibels, the target vibration mode may be dual-motor vibration. If the quantity of decibels of the noise is less than or equal to the preset quantity of decibels, the target vibration mode may be single-motor vibration.

It should be understood that "single-motor vibration" and "dual-motor vibration" in the foregoing target vibration modes are used as examples for description. In this embodiment of this application, another vibration manner may also be used.

In summary, for different applications, the first mapping table, the second mapping table, and/or the third mapping table may be preset, and the application layer may determine the target vibration mode based on the application scene of the electronic device. In an embodiment, for an audio/video playback application and a game application, the first mapping table may be pre-stored at an application layer. For an input method application, the second mapping table and/or the third mapping table may be pre-stored at the application layer. For a clock application, the third mapping table may be pre-stored at the application layer. The first mapping table, the second mapping table, and the third mapping table each may be referred to as a vibration mode mapping relationship, and the vibration mode mapping relationship is used to represent a mapping relationship between an application scene of an electronic device, an identifier of a vibration mode, and the first configuration information. In an embodiment, the vibration mode mapping relationship further includes a description of a vibration mode corresponding to an identifier of the vibration mode.

In an embodiment, the application layer may obtain the quantity of motors in the electronic device. The application layer may obtain the quantity of motors when an application is started. Alternatively, the application layer may obtain the quantity of motors when the application is started for the first time after being installed, and store the quantity of motors, so that the application layer does not need to repeatedly obtain the quantity of motors when the application is subsequently started. Alternatively, the application layer may obtain the quantity of motors when determining the target vibration mode. Optionally, in this embodiment of this application, the KIT layer may include an API for querying the quantity of motors, and the application layer may invoke the API to query and obtain the quantity of motors. For example, a function corresponding to the API is vibratorEx.getHwParameter("vibratorNumOnChip"), and the application layer may obtain the quantity of motors based on the function. Information in the quotation marks represents the quantity of motors. For example, " " indicates that the electronic device supports one motor, "sub:1" indicates that the electronic device supports two motors, and "sub2:2" indicates that the electronic device supports three motors. " " indicates a null field in the quotation marks. " " is used to be compatible with a software version without this function.

In an embodiment, the application layer may query whether the electronic device supports a linear motor, so as to obtain a vibration capability of the motor. When obtaining the quantity of motors, the application layer may query whether the electronic device supports a linear motor. Optionally, in this embodiment of this application, the KIT layer may include an API used to query whether the electronic device supports the linear motor, and the application layer may invoke the API to query whether the electronic device supports the linear motor. For example, a function corresponding to the API is "getHwParameter(vibrator Ex.HW_VIBRATOR_GRADE_VALUE)", and the application layer may invoke the API to query whether the electronic device supports the linear motor. When VALUE is NULL, it indicates that the electronic device does not support the linear motor; or when VALUE has a specific value, it indicates that the electronic device supports the linear motor.

S702. The application layer determines the identifier of the target vibration mode or the first target configuration information based on the mapping relationship between a target vibration mode and a vibration mode.

It should be understood that when the target vibration mode is different, the identifier of the target vibration mode is different, and the first target configuration information is also different.

In a possible implementation, after determining the target vibration mode, the application layer may determine the identifier of the target vibration mode based on the "mapping relationship between a vibration mode and an identifier of the vibration mode" in the vibration mode mapping relationship. The identifier of the target vibration mode is an identifier of a vibration mode to which the target vibration mode is mapped in a vibration mode mapping relationship.

For example, if the target vibration mode is the stage clearance rewarding vibration, the identifier of the target vibration mode corresponding to the target vibration mode is "2A".

In an embodiment, after determining the target vibration mode, the application layer may determine the first target configuration information based on the "mapping relationship between a vibration mode and the first configuration information" in the vibration mode mapping relationship. The first target configuration information may be the first configuration information mapped from the target vibration mode mapping in the vibration mode mapping relationship. The first target configuration information may be a target string. For example, if the identifier of the target vibration mode is "2A", the first target configuration information is "haptic.game_qmqz.pass_dual".

In an embodiment, the vibration with the suffix "rtol", "ltor", "left_l", "Onlyl", "right_r" or "Onlyr" is directional and may also be referred to as stereo vibration. The application layer may determine the initial configuration information based on the mapping relationship between a target vibration mode and a vibration mode, and then determine the first target configuration information based on the first screen direction and the initial configuration information of the electronic device. It should be understood that when at least one of the first screen direction and the initial configuration information is different, the first target configuration information is different. The initial configuration information may be referred to as the first target configuration information to be determined. The first screen direction is a current screen direction of the electronic device. That the vibration is directional may be understood as that the vibration is transmitted from one part of the electronic device to another.

For example, if the target vibration mode is "stage clearance rewarding vibration", the first configuration information mapped from the target vibration mode may be initial configuration information "haptic.game_qmqz.pass_dual", and vibration corresponding to the suffix "dual" in the initial configuration information is not directional. Therefore, the application layer may use the initial configuration information as the first target configuration information.

For a scene of a stereo vibration interface, the vibration is directional. For example, if a scene of the interface is "vibration when a game is enabled", two strings "haptic.game_qz.open_ltor" and "haptic.game_qz.open_rtol" may be configured. In this scene, the application layer may obtain the first screen direction of the electronic device, and then determine the first target configuration information based on the first screen direction and the initial configuration information. For example, if the first screen direction is the second direction, "the left side to the right side" of the electronic device is predefined "the left motor to the right motor", that is, "ltor". If the first screen direction is a fourth direction, "the left side to the right side" of the electronic device is predefined "the right motor to the left motor", that is, "rtol". If the application layer determines that the first screen direction of the electronic device is the second direction, it may be determined, based on the initial configuration information, that the first target configuration information may be "haptic.game_qz.open_ltor".

In an embodiment, if the first configuration information in Table 1 does not include the suffix "rtol" or "ltor", for example, the initial configuration information of the target vibration mode mapping is "haptic.game_qz.open", the application layer may add a suffix to the initial configuration information based on the first screen direction, so as to obtain the first target configuration information. If the first screen direction is the second direction, the application layer may determine that the suffix is "ltor", and may detect that the first target configuration information is "haptic.game_qz.open_ltor".

It should be understood that the first target configuration information is used to represent the first screen direction. For example, if the first target configuration information is "haptic.game_qz.open_ltor", it may represent that "the left side to the right side" of the electronic device is "the left motor to the right motor", so as to represent that the first screen direction may be the second direction.

In an embodiment, when the first application scene of the electronic device is a scene of the interface, S702 may be replaced with: The application layer determines the identifier of the scene of the interface or the first target configuration information based on the mapping relationship between a scene of the interface and a vibration mode. In this embodiment, the "identifier of a target vibration mode" in S703-S708 may be replaced with "identifier of a scene of an interface".

S703. The application layer sends the identifier of the target vibration mode or the first target configuration information to the KIT layer.

After obtaining the identifier of the target vibration mode, the application layer may send the identifier of the target vibration mode to the KIT layer. Alternatively, after obtaining the first target configuration information, the application layer may send the first target configuration information to the KIT layer. In a possible implementation, the application layer may be predefined in this embodiment of this application to obtain the identifier of the target vibration mode or the first target configuration information. For example, for the first application, the identifier of the target vibration mode corresponding to the first application may be predefined. Therefore, when the first application runs, the application layer may determine the identifier of the target vibration mode based on the mapping relationship between a target vibration mode and a vibration mode, and send the identifier of the target vibration mode to the KIT layer.

In an embodiment, S703 may be replaced with: The first motor module at the application layer sends the identifier of the target vibration mode or the first target configuration information to a motor interface at the KIT layer. In the following embodiment, the KIT layer is used to represent the motor interface at the KIT layer.

S704. If the KIT layer receives the first target configuration information from the application layer, the KIT layer sends the first target configuration information to the application framework layer; or if the KIT layer receives the identifier of the target vibration mode from the application layer, the KIT layer determines the initial configuration information based on the vibration mode mapping relationship, and sends the initial configuration information to the application framework layer.

In a possible implementation, the KIT layer may not store the vibration mode mapping relationship. The KIT layer receives the first target configuration information from the application layer, and may send the first target configuration information to the application framework layer.

In a possible implementation, the KIT layer stores the vibration mode mapping relationship. After receiving the identifier of the target vibration mode from the application layer, the KIT layer may determine, based on the mapping relationship between an identifier of the target vibration mode and the first configuration information in the vibration mode mapping relationship, the initial configuration information mapped from the identifier of the target vibration mode, and send the initial configuration information to the application framework layer. The initial configuration information may be the first configuration information mapped from the identifier of the target vibration mode in the vibration mode mapping relationship. It should be understood that when the identifier of the target vibration mode is different, the initial configuration information is different.

For example, if the identifier of the target vibration mode is "2A", the initial configuration information may be "haptic.game_qmqz.pass_dual" corresponding to "2A" in the vibration mode mapping relationship. If the identifier of the target vibration mode is "11A", the initial configuration information may be "haptic.game_qz.open_ltor" and "haptic.game_qz.open_rtol".

In this embodiment of this application, S704 may be replaced with: If the KIT layer receives the first target configuration information from the application layer, the KIT layer sends the first target configuration information to a second motor module at the application framework layer; or if the KIT layer receives the identifier of the target vibration mode from the application layer, the KIT layer determines the initial configuration information based on the vibration mode mapping relationship, and sends the initial configuration information to the second motor module at the application framework layer. It should be understood that the second motor module may be a module that is at an application framework layer and that is configured to perform an action related to motor vibration. In the following embodiment, an example in which the application framework layer represents the second motor module at the application framework layer is used for description.

S705. If the application framework layer receives the first target configuration information from the KIT layer, the application framework layer sends the first target configuration information to the hardware abstraction layer; or if the application framework layer receives the initial configuration information from the KIT layer, the application framework layer obtains the first target configuration information based on the first screen direction and the initial configuration information of the electronic device, and sends the first target configuration information to the hardware abstraction layer.

If the application framework layer receives the first target configuration information from the KIT layer, the application framework layer sends the first target configuration information to the hardware abstraction layer. If the application framework layer receives the initial configuration information from the KIT layer, the application framework layer may obtain the first target configuration information based on the first screen direction of the electronic device and the initial configuration information, and send the first target configuration information to the hardware abstraction layer. When at least one of the first screen direction and the initial configuration information is different, the first target configuration information is different. It should be noted that for a process in which the application framework layer obtains the first target configuration information based on the first screen direction and the initial configuration information, reference may be made to the descriptions about the process in which the application framework layer obtains the first target configuration information in S702. In an embodiment, the application framework layer may invoke a window service or a display framework interface to obtain the first screen direction of the electronic device. In an embodiment, the application framework layer may invoke an API at the KIT layer to obtain data from a sensor. The application framework layer may obtain the screen direction of the electronic device based on the data of the sensor.

In an embodiment, S705 may be replaced with: If the application framework layer receives the first target configuration information from the KIT layer, the application framework layer sends the first target configuration information to a motor library module at the hardware abstraction layer; or if the application framework layer receives the initial configuration information from the KIT layer, the application framework layer obtains the first target configuration information based on the first screen direction and the initial configuration information of the electronic device, and sends the first target configuration information to the motor library module at the hardware abstraction layer. In the following embodiment, the hardware abstraction layer is used to represent the motor library module at the hardware abstraction layer.

S706. The hardware abstraction layer obtains a first target configuration file based on the first target configuration information, where the first target configuration file is used to represent the target vibration mode.

In this embodiment of this application, the hardware abstraction layer may pre-store a plurality of first configuration files, where the first configuration file is used to represent the vibration mode, the first configuration file is used to enable the kernel layer to determine the vibration mode, and the first configuration file may be an XML file. When the first target configuration information is different, the first target configuration file is different. The first target configuration file is used to represent the target vibration mode, and the first configuration file is used to enable the kernel layer to determine the target vibration mode, so as to generate a parameter corresponding to the target vibration mode.

In a possible implementation, after receiving the first target configuration information, the hardware abstraction layer may perform a string search in the first configuration file, and use the first configuration file that includes the first target configuration information as the first target configuration file. For example, if a scene of the interface is "vibration when a game is enabled", for example, the first target configuration information is "haptic.game_qz.open_ltor", the first target configuration file corresponding to the first target configuration information is as follows:

<HAPTIC_EFFCT ID="302">

<NAME>haptic.game_qz.open_ltor_dualL</NAME>

<VALUE>0,30<VALUE>   (1)

and,

<HAPTIC_EFFCT ID="302">

<NAME>haptic.game_qz.open_ltor_dualR<NAME>

<VALUE>0,30<VALUE>   (2)

For example, the first lines "<HAPTIC_EFFCT ID="302">" in the target configuration files (1) and (2) each represent an identifier of the respective first configuration file, such as a number. In the ID "302", "30" is used to represent a vibration mode of motor vibration, for example, vibration mode 30. "2" is used to represent that vibration strength of the vibration is level 2. It should be understood that in this embodiment of this application, a mapping relationship between a vibration mode of a motor vibration and a number (as shown in Table 4) and a mapping relationship between a level and vibration strength may be preconfigured. In an embodiment, the first target configuration file may include information such as amplitude, time, and strength of motor vibration. It should be understood that, as shown in FIG. 4, when the vibration mode of the motor is different, the number of the vibration mode is different.

The second lines in (1) and (2), for example, "<NAME>haptic.game_qz._open_ltor_dualL<NAME>" and "<<NAME>haptic.game_qz.open_ltor_dualR<NAME>", each include the first target configuration information "haptic.game_qz.open_ltor" and respectively include the motor vibration manner "dualL" and the motor vibration manner "dualR". "DualL" represents the vibration manner of the left motor in the dual motors, and "dualR" represents the vibration manner of the right motor in the dual motors.

"0" in the third lines "<VALUE>0, 30<VALUE>" in (1) and (2) may represent the start time of the vibration, and "30" represents vibration mode 30. The foregoing (1) and (2) represent that both the left motor and the right motor vibrate at 0 s in vibration mode 30. As described above, (1) is the first target configuration file used to enable the left motor to vibrate, and (2) is the first target configuration file used to enable the right motor to vibrate. In an embodiment, when receiving the first target configuration information, the hardware abstraction layer may query a string in the first configuration file, and synchronously obtain the first target configuration file (1) corresponding to the left motor and the first target configuration file (2) corresponding to the right motor.

TABLE 4

| Identifier of a vibration mode | Description of the vibration mode |
| --- | --- |
| 1 | The dual motors vibrate together for 3 ms. |
| 2 | Dual-motor vibration, and the vibration transits from the left side to the right side. |
| 3 | Dual-motor vibration, and the vibration transits from the left side to the right side. |
| 4 | Dual-motor vibration, and the vibration transits from the right side to the left side. |
| 5 | The left motor vibrates with special effect 30 at 66 ms, and the right motor vibrates with special effect 30 at 82 ms. |
| 6 | The right motor vibrates with special effect 30 at 0 ms, and the left motor vibrates with special effect 30 at 30 ms. |
| 7 | The master motor vibrates for 3 ms. |

S707. The hardware abstraction layer sends the first target configuration file to the kernel layer.

In an embodiment, S707 may be replaced with: The motor library module at the hardware abstraction layer sends the first target configuration file to a motor driver at the kernel layer. The following uses the kernel layer to represent the motor driver at the kernel layer for description.

S708. The kernel layer obtains, based on the first target configuration file, the first parameter corresponding to the target vibration mode, and drives, by using the first parameter, the motor to vibrate.

When the first target configuration file is different, the target vibration mode is different, and the first parameter is different. The first parameter is used to drive the motor to vibrate in the target vibration mode. When receiving the first target configuration file from the hardware abstraction layer, the kernel layer may parse the first target configuration file to obtain the target vibration mode. For example, the kernel layer parses the foregoing first target configuration files (1) and (2), to detect that the target vibration mode is vibration mode 30. In a possible implementation, a fourth mapping table may be stored at the kernel layer, and the fourth mapping table is used to represent a mapping relationship between a vibration mode and a parameter. Optionally, the fourth mapping table may include a mapping relationship between an identifier of the vibration mode and a parameter. The kernel layer may obtain, based on the first target configuration file and the fourth mapping table, a parameter corresponding to the target vibration mode, that is, the first parameter. For example, the kernel layer may obtain, based on vibration mode 30 and the fourth mapping table, the first parameter corresponding to vibration mode 30. It should be understood that because vibration mode 30 is that the left motor and the right motor vibrate, the inner kernel layer may simultaneously obtain a parameter used to enable the left motor to vibrate and a parameter used to enable the right motor to vibrate.

In an embodiment, the kernel layer may store a preset array and a sampling frequency. The kernel layer may sample the preset array based on the sampling frequency to obtain an array corresponding to the target vibration mode, that is, the first parameter. The kernel layer drives, by using the first parameter, the motor to vibrate. It should be understood that for another principle of driving, by the kernel layer, the motor to vibrate, reference may be made to related descriptions in the prior art.

In this embodiment of this application, a single motor or a plurality of motors are used to implement different types of vibration based on different application scenes of the electronic device, which brings a more diversified and stereo sense of vibration to the user and improve the user experience.

In an embodiment, because the motor vibration is directional, in this embodiment of this application, when the screen direction changes, configuration information and a configuration file of the motor vibration may be re-obtained based on the first application scene of the electronic device, so as to change the vibration direction of the motor to adapt to the screen direction of the electronic device.

In a possible implementation, the application layer may detect the screen direction of the electronic device. If the electronic device is in the first application scene, and the application layer detects that the screen direction changes, the electronic device may perform S701-S708. The application layer re-determines and delivers the first target configuration information, so that the hardware abstraction layer may obtain, based on the first target configuration information, the first target configuration file that is adapted to the screen direction, so that the kernel layer accurately drives, by using a correct first parameter, the motor to vibrate.

In a possible implementation, the application framework layer may detect the screen direction. If the electronic device is in the first application scene, and the application layer detects that the screen direction changes, the application framework layer may modify the first target configuration information based on the screen direction. Then the hardware abstraction layer may obtain, based on the modified first target configuration information, the first target configuration file that is adapted to the screen direction, so that the kernel layer accurately drives by using the correct first parameter, the motor to vibrate.

For example, when the screen direction is the second direction, and the scene of the interface is "vibration caused by footsteps, indicating that a person is coming from the left side", and the target vibration mode is left-motor vibration, the <NAME> line in the first target configuration file may be "haptic.game_qz.left_l_OnlyL", which indicates that only the motor 2 vibrates, as shown in FIG. 8a. When the screen direction is switched from the second direction to the fourth direction, the scene of the interface does not change. However, because the position of the motor changes relative to the scene of the interface, the left side of the electronic device in the fourth direction is the motor 1, and the motor 1 is a predefined right motor, the <NAME> line in the first target configuration file may be changed to "haptic.game_qz.right_r_OnlyR", which indicates that only the motor 1 vibrates, as shown in FIG. 8b. In this example, when the screen direction of the electronic device changes, and the scene of the interface is still "vibration caused by footsteps, indicating that a person is coming from the left side", the user still feels that the left motor of the electronic device is vibrating, which fits the feeling of the user.

In this embodiment of this application, the first application scene of the electronic device may be adapted based on the change of the screen direction, so that the motor vibration can better fit the feeling of the user. It should be understood that in the figures of this embodiment of this application, a plurality of wave lines are used to represent vibration of the motor, and a length of the wave line represents strength of the vibration of the motor. A longer wave line represents stronger vibration strength of the motor, and a shorter wave line represents weaker vibration strength of the motor. In a direction from a wave line near the electronic device to a wave line away from the electronic device, a change of the length of the wave line may represent a change of the vibration strength of the motor.

It should be understood that the vibration mode when the screen direction changes as shown in FIG. 8a-FIG. 8b is also applicable to the following scenes of the interface: for example, a bomb on the left side of the interface explodes, the left face of a character on the interface is hit, the left side of the character is injured, and the like.

In this embodiment of this application, if the screen direction changes, the application layer may re-determine and deliver the first target configuration information, or the application framework layer modifies the first target configuration information based on the screen direction, so that the hardware abstraction layer obtains the first target configuration file that is adapted to the screen direction, so that the kernel layer accurately drives the motor to vibrate with a correct first parameter, and adapts to the first application scene of the electronic device, thereby improving user experience.

The following describes the vibration method in the embodiments of this application with reference to a specific first application scene of the electronic device. It should be understood that the vibration mode of the electronic device in the first application scene is used as an example for description.

Scenario 1: A scene of the interface is the first application scene of the electronic device. In this embodiment of this application, an example in which the scene of the interface is "scene in which a game is enabled", the target vibration mode corresponding to "scene in which a game is enabled" is "vibration transits from the left side to the right side", and the screen direction is switched from the second direction to the fourth direction is used for description.

The vibration method according to this embodiment of this application may include:

S901. An application layer determines a target vibration mode based on the scene in which a game is enabled.

When a game scene of the interface is different, the target vibration mode may be different. In an embodiment, at least some game scenes of different interfaces are corresponding to different target vibration modes, or some game scenes of different interfaces may be corresponding to a same target vibration mode.

S902. The application layer determines an identifier of the target vibration mode or the first target configuration information based on a mapping relationship between a target vibration mode and a vibration mode, and sends the identifier of the target vibration mode or the first target configuration information to a KIT layer.

The application layer may determine, based on the mapping relationship between a target vibration mode and a vibration mode, that the identifier of the target vibration mode is "11A". If the first screen direction is the second direction, the application layer determines, based on the first screen direction, that the first target configuration information is "haptic.game_qz.open_ltor".

In an embodiment, S901 and S902 may be replaced with: An application layer determines an identifier of a scene of the interface or first target configuration information based on the scene in which a game is enabled, and sends the identifier of the scene of the interface or the first target configuration information to a KIT layer. In this embodiment, "identifier of the target vibration mode" in S903-S912 and S907A may be replaced with "identifier of the scene of the interface".

S903. If the KIT layer receives the first target configuration information from the application layer, the KIT layer sends the first target configuration information to the application framework layer; or if the KIT layer receives the identifier of the target vibration mode from the application layer, the KIT layer determines the initial configuration information based on the vibration mode mapping relationship, and sends the initial configuration information to the application framework layer.

If the KIT layer receives the first target configuration information "haptic.game_qz.open_ltor" from the application layer, the KIT layer sends the first target configuration information "haptic.game_qz.open_ltor" to the application framework layer. If the KIT layer receives the identifier "11A" of the target vibration mode from the application layer, the KIT layer determines the initial configuration information "haptic.game_qz.open_ltor" and "haptic.game_qz.open_rtol", or "haptic.game_qz.open" based on the vibration mode mapping relationship, and sends the initial configuration information to the application framework layer. The following uses "haptic.game_qz.open" as an example for description.

S904. If the application framework layer receives the first target configuration information from the KIT layer, the application framework layer sends the first target configuration information to the hardware abstraction layer; or if the application framework layer receives the initial configuration information from the KIT layer, the application framework layer obtains the first target configuration information based on the first screen direction and the initial configuration information of the electronic device, and sends the first target configuration information to the hardware abstraction layer.

If the application framework layer receives the first target configuration information "haptic.game_qz.open_ltor" from the KIT layer, the application framework layer sends the first target configuration information "haptic.game_qz.open_ltor" to the hardware abstraction layer. If the application framework layer receives the initial configuration information "haptic.game_qz.open" from the KIT layer, the application framework layer obtains the first target configuration information "haptic.game_qz.open_ltor" based on the second direction and the initial configuration information "haptic.game_qz.open", and sends the first target configuration information "haptic.game_qz.open_ltor" to the hardware abstraction layer.

S905. The hardware abstraction layer obtains the first target configuration file based on the first target configuration information, and sends the first target configuration file to the kernel layer.

In the first configuration file, the hardware abstraction layer may determine, based on the first target configuration information, a first target configuration file that includes the first target configuration information "haptic.game_qz.open_ltor". The first target configuration file is used to represent the first vibration mode, and the first configuration file is used to enable the kernel layer to determine the first vibration mode, so as to generate a first parameter corresponding to the first vibration mode. The first target configuration files may be (3) and (4) shown below.

<HAPTIC_EFFCT ID="21">

<NAME>haptic.game_qz.open_ltor_dualL</NAME>

<VALUE>0,2<VALUE>  (3)

<HAPTIC_EFFCT ID="21">

<NAME>haptic.game_qz.open_ltor_dualR<NAME>

<VALUE>0,2<VALUE>  (4)

(3) and (4) represent that the target vibration mode is dual-motor vibration, and the vibration transits from the left side to the right side. The vibration strength of the motor on the left side of the electronic device becomes weaker, and the vibration strength of the motor on the right side becomes stronger, making the user feel that the vibration is transiting from left side to the right side. When the first screen direction is the second direction, that the vibration transits from the left side to the right side indicates that "the vibration strength of the motor 2 becomes weaker, and the vibration strength of the motor 1 becomes stronger." In this embodiment of this application, when receiving the first configuration information, the hardware abstraction layer may query a string to synchronously obtain the first target configuration file of the left motor (the first motor) and the first target configuration file of the right motor (the second motor).

S906. The kernel layer generates, based on the first target configuration file, a first parameter corresponding to the target vibration mode, and drives, by using the first parameter, the motor to vibrate.

It should be understood that, to distinguish from the target vibration mode indicated by a second target configuration file described below, an example in which the target vibration mode indicated by the first target configuration file is the first vibration mode, and the target vibration mode indicated by the second target configuration file is the second vibration mode is used for description.

The kernel layer obtains, based on the first vibration mode and a fourth mapping table, the first parameter corresponding to the first vibration mode. When the first configuration file is different, the first vibration mode is different. The kernel layer may drive, by using the first parameter, the motor to vibrate in the first vibration mode. When the first parameter is different, the first vibration mode is different.

The first parameter is used to drive the first motor to vibrate in the first waveform and the second motor to vibrate in the second waveform. In an embodiment, the kernel layer may obtain the first parameter based on the foregoing first target configuration files (3) and (4), and the first parameter may include a first sub-parameter and a second sub-parameter. The kernel layer drives, by using the first sub-parameter, the first motor to vibrate in the first waveform, and the kernel layer drives, by using the second sub-parameter, the second motor to vibrate in the second waveform. That is, the kernel layer may synchronously obtain, based on the first target parameter, the first sub-parameter used to enable the first motor to vibrate, and the second sub-parameter used to enable the second motor to vibrate.

Figure 9A:
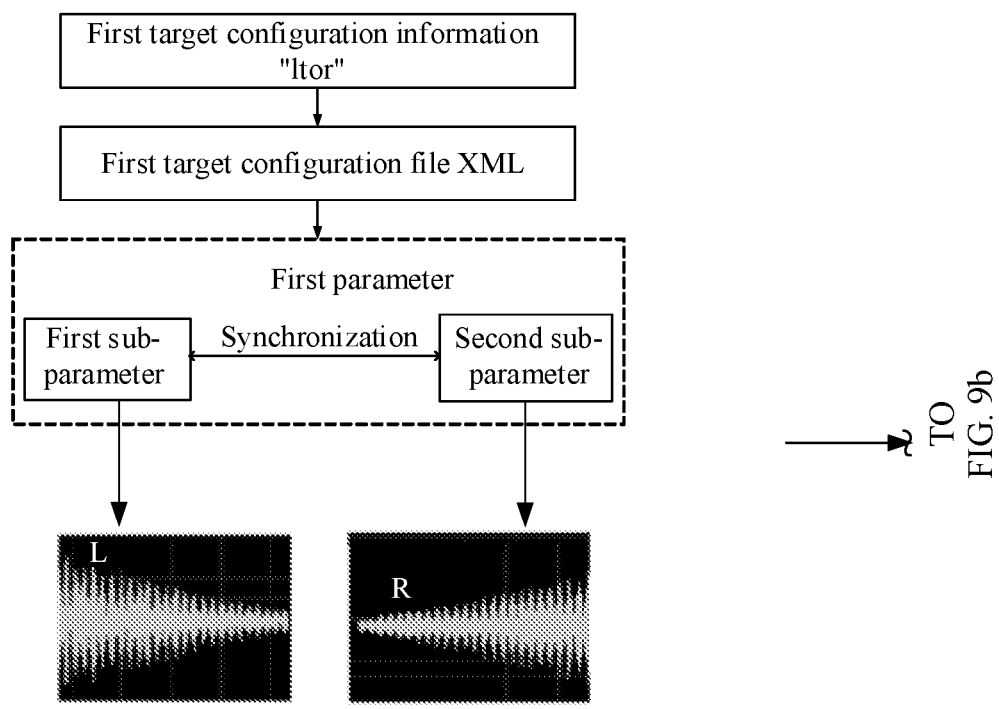
FIG. 9 is another schematic diagram of vibration according to an embodiment of this application.

For example, the first waveform may be a waveform L shown in FIG. 9a, and the second waveform may be a waveform R shown in FIG. 9a. The first waveform is used to represent that the vibration strength of the first motor becomes weaker, and the second waveform is used to represent that the vibration strength of the second motor becomes stronger. It should be understood that L in FIG. 9a and R in FIG. 9b respectively represent the left side and the right side of an actual direction of the electronic device. That the first motor vibrates in the first waveform may be understood as: The first motor vibrates, and a waveform of the vibration is the first waveform. That the second motor vibrates in the second waveform may be understood as: The second motor vibrates, and a waveform of the vibration is the second waveform. In FIG. 9, a indicates that "vibration transits from the left side to the right side": The vibration strength of the left motor becomes weaker, and the vibration strength of the right motor becomes stronger. That is, the vibration strength of the first motor becomes weaker, and the vibration strength of the second motor becomes stronger.

Figure 9B:
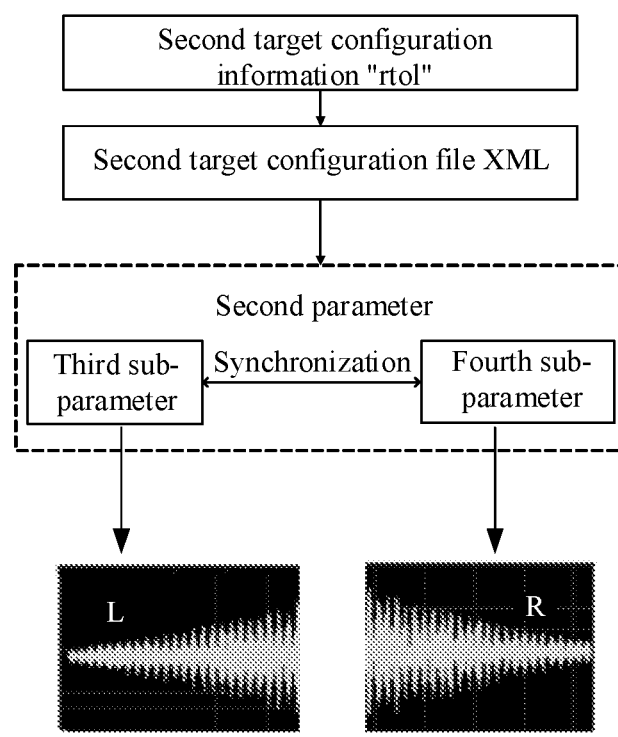
Figure 9C:
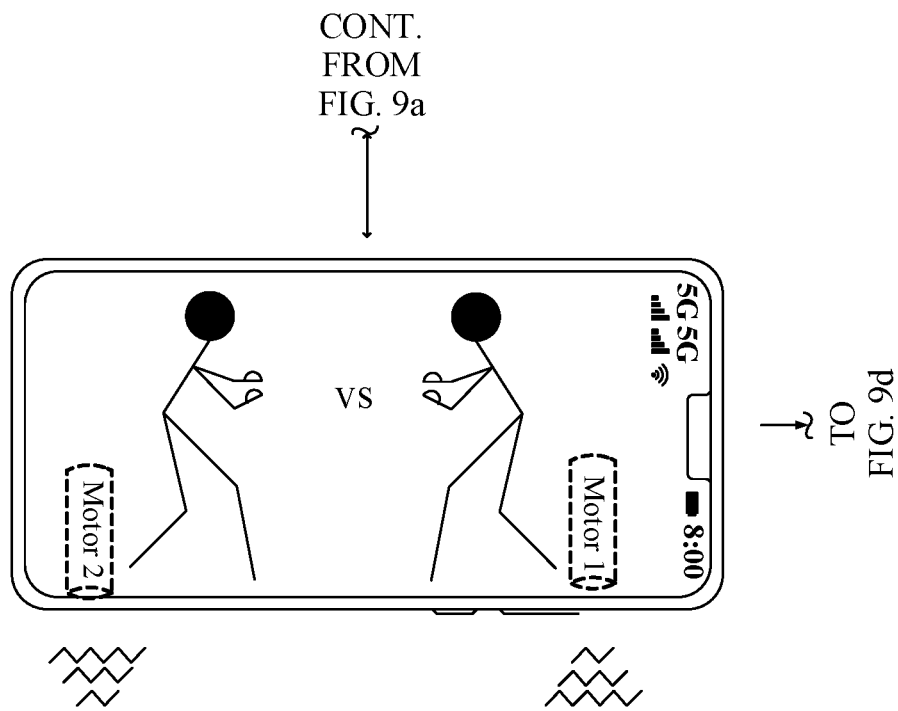
Figure 9D:
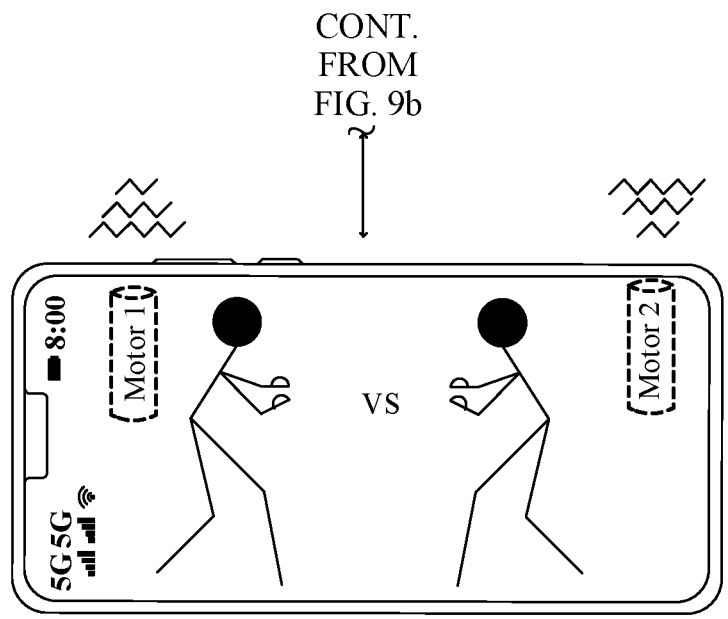

For example, a schematic diagram of vibration corresponding to a waveform graph shown in FIG. 9a is shown in FIG. 9c. When the screen direction is the second direction, and the scene of the interface is a scene in which a game (boxing game) is enabled, the vibration strength of the motor 2 becomes weaker, and the vibration strength of the motor 1 becomes stronger, which makes the user feel that the vibration transits from the left side to the right side, that is, stereo vibration. It should be understood that the vibration mode of the motor shown in FIG. 9c is the first vibration mode, and the first vibration mode is that vibration strength of the motor 2 becomes weaker, and the vibration strength of the motor 1 becomes stronger.

S907. If the application layer detects that the screen direction is switched from the first screen direction to the second screen direction, the application layer determines the target vibration mode based on a scene in which a game is enabled.

In an embodiment, the screen direction of the electronic device is switched from the first screen direction to the second screen direction in response to a second operation. Optionally, the second operation may be an operation performed by the user. For example, the operation performed by the user is that the user rotates the electronic device. In this embodiment of this application, an example in which the first screen direction is the second direction and the second screen direction is the fourth direction is used for description.

S908. The application layer determines, based on the mapping relationship between a target vibration mode and a vibration mode, that the identifier of the target vibration mode is "11A", and sends "11A" to the KIT layer. Alternatively, the application layer determines, based on the mapping relationship between a target vibration mode and a vibration mode, that the second target configuration information is "haptic.game_qz.open_rtol", and sends the second target configuration information "haptic.game_qz.open_rtol" to the KIT layer.

Because the screen direction is switched from the second direction to the fourth direction, a predefined left motor and a predefined right motor also change relative to the left side and the right side of the electronic screen. In the fourth direction, "vibration transits from the left side to the right side" is that vibration transits from the motor 1 to the motor 2. Because the motor 2 is a predefined left motor, and the motor 1 is a predefined right motor, and correspondingly, the vibration transits from the right motor to the left motor. The application layer may regenerate the second target configuration information "haptic.game_qz.open_rtol", and send the second target configuration information "haptic.game_qz.open_rtol" to the KIT layer.

When "haptic.game_qz.open_rtol" represents that the target vibration mode is in the fourth direction, the vibration of the motor transits from the left side to the right side, and the user still feels the vibration from the left side to the right side. In this way, the vibration of the motor may be adaptively adjusted based on a rotation of the screen, so that when the screen rotates, it can be adapted to a feeling of the user.

S909. If the KIT layer receives the second target configuration information "haptic.game_qz.open_rtol" from the application layer, the KIT layer sends the second target configuration information "haptic.game_qz.open_rtol" to the application framework layer; or if the KIT layer receives the identifier "11A" of the target vibration mode from the application layer, the KIT layer determines the initial configuration information "haptic.game_qz.open" based on the vibration mode mapping relationship, and sends the initial configuration information "haptic.game_qz.open" to the application framework layer.

S910. If the application framework layer receives the second target configuration information "haptic.game_qz.open_rtol" from the KIT layer, the application framework layer sends the second target configuration information "haptic.game_qz.open_rtol" to the hardware abstraction layer; or if the application framework layer receives the initial configuration information "haptic.game_qz.open" from the KIT layer, the application framework layer obtains the second target configuration information "haptic.game_qz.open_rtol" based on the second screen direction and the initial configuration information "haptic.game_qz.open", and sends the second target configuration information "haptic.game_qz.open_rtol" to the hardware abstraction layer.

S911. The hardware abstraction layer obtains the second target configuration file based on the second target configuration information, and sends the second target configuration file to the kernel layer.

As with S905, in the first configuration file, the hardware abstraction layer may determine, based on the first target configuration information, a second target configuration file that includes the first target configuration information "haptic.game_qz.open_rtol". In an embodiment, when at least one of the first application scene and the second screen direction is different, the second target configuration information is different, and the second target configuration file is different. The second target configuration file is used to represent the second vibration mode, and the first configuration file is used to enable the kernel layer to determine the second vibration mode, so as to generate the second parameter corresponding to the second vibration mode. The second target configuration files may be (5) and (6) shown below.

```
<HAPTIC_EFFCT ID="21">

<NAME>haptic.game_qz.open_rtol_dualL</NAME>

<VALUE>0,2<VALUE>                                    (5)

<HAPTIC_EFFCT ID="21">

<NAME>haptic.game_qz.open_rtol_dualR</NAME>

<VALUE>0,2<VALUE>                                    (6)
```

In this way, the vibration of the motor may be adaptively adjusted based on a rotation of the screen, so that when the screen rotates, it can be adapted to a feeling of the user. Because (5) and (6) are respectively the second target configuration file corresponding to the left motor and the second target configuration file corresponding to the right motor, in this embodiment of this application, the hardware abstraction layer may synchronously obtain the second target configuration file of the left motor and the second target configuration file of the right motor based on the second target configuration information.

S912. The kernel layer generates, based on the second target configuration file, a second parameter corresponding to the target vibration mode, and drives, by using the second parameter, the motor to vibrate.

The kernel layer obtains, based on the second vibration mode indicated by the second target configuration file and the fourth mapping table, the second parameter corresponding to the second vibration mode. When the second configuration file is different, the second vibration mode is different. The kernel layer may drive, by using the second parameter, the motor to vibrate in the second vibration mode. When the second parameter is different, the second vibration mode is different. The second vibration mode may be the same as or different from the first vibration mode.

In FIG. 9, an example in which the second vibration mode may be different from the first vibration mode is used for description. That the second vibration mode may be different from the first vibration mode may be that at least one of the third waveform and the fourth waveform is different from the first waveform, and/or at least one of the third waveform and the fourth waveform is different from the second waveform.

The second parameter is used to drive the first motor to vibrate in the third waveform and the second motor to vibrate in the fourth waveform. In an embodiment, the kernel layer may generate the second parameter based on the foregoing second target configuration files (5) and (6), and the second parameter may include a third sub-parameter and a fourth sub-parameter. The kernel layer drives, by using the third sub-parameter, the first motor to vibrate in the third waveform, and the kernel layer drives, by using the fourth sub-parameter, the second motor to vibrate in the fourth waveform. That is, the kernel layer may synchronously obtain, based on the second target parameter, the third sub-parameter used to enable the first motor to vibrate, and the fourth sub-parameter used to enable the second motor to vibrate.

For example, the third waveform may be a waveform R shown in FIG. 9b, and the fourth waveform may be a waveform L shown in FIG. 9b. The third waveform is used to represent that the vibration strength of the first motor becomes stronger, and the fourth waveform is used to represent that the vibration strength of the second motor becomes weaker. That the first motor vibrates in the third waveform may be understood as: The first motor vibrates, and a waveform of the vibration is the third waveform. That the second motor vibrates in the fourth waveform may be understood as: The second motor vibrates, and a waveform of the vibration is the fourth waveform.

In FIG. 9, b indicates that "vibration transits from the left side to the right side": The vibration strength of the right motor becomes weaker, and the vibration strength of the left motor becomes stronger. That is, the vibration strength of the second motor becomes weaker, and the vibration strength of the first motor becomes stronger. For example, a schematic diagram of vibration corresponding to a waveform graph shown in FIG. 9b is shown in FIG. 9d. When the screen direction is switched from the second direction to the fourth direction, and the scene of the interface is a scene in which a game is enabled, the vibration strength of the motor 1 becomes weaker, and the vibration strength of the motor 2 becomes stronger, which may also make the user feel that the vibration transits from the left side to the right side, that is, stereo vibration. It should be understood that the vibration mode of the motor shown in FIG. 9d is the second vibration mode, and the second vibration mode is that vibration strength of the motor 1 becomes weaker, and the vibration strength of the motor 2 becomes stronger. The second vibration mode of the motor in FIG. 9d is different from the first vibration mode of the motor in FIG. 9c. In this embodiment, the interface displayed by the electronic device may be adjusted based on a change of the screen direction. As shown in FIG. 9c and FIG. 9d, when the screen direction of the electronic device is switched from the second direction to the fourth direction, the interface displayed by the electronic device may be adjusted to adapt to the screen direction, so that the user can observe the front of the interface. In this embodiment of this application, a method for adjusting the interface displayed by the electronic device along the screen direction of the electronic device is not described.

When the scene of the interface of the electronic device is a same scene, and the screen direction is switched, the second vibration mode is different from the first vibration mode. To ensure that the interface of the electronic device is the same and that the user has the same vibration feeling, in this embodiment of this application, the first waveform may be the same as the fourth waveform, and the second waveform may be the same as the third waveform. As shown in FIG. 9a and FIG. 9b, the first waveform of the first motor is the same as the fourth waveform of the second motor, the third waveform of the first motor is the same as the second waveform of the second motor. Therefore, in the "scene in which a game is enabled", the user can feel that "vibration transits from the left side to the right side".

In a possible implementation, because the application framework layer may also detect the screen direction of the electronic device, the foregoing S907-S910 may be replaced with S907A. It should be understood that after S907A, the foregoing S911 and S912 may be performed.

S907A. If the application framework layer detects that the screen direction is switched from the first screen direction to the second screen direction, the application framework layer modifies the first target configuration information to the second target configuration information based on the second screen direction, and sends the second target configuration information to the hardware abstraction layer.

When the second screen direction is different, the second target configuration information is different. For example, in the first screen direction (the second direction), the first target configuration information is haptic.game_qz.open_1-tor, but in the current second screen direction (the fourth direction), the left motor and the right motor change by 180 degrees respectively relative to the left side and the right side of the electronic device. For example, "ltor" (from the left motor to the right motor) in the second direction becomes "rtol" (from the left motor to the right motor) in the fourth direction. Therefore, the application framework layer may modify the first target configuration information to the second target configuration information "haptic.game_qz.open_rtol" based on the second screen direction.

Figure 10A:
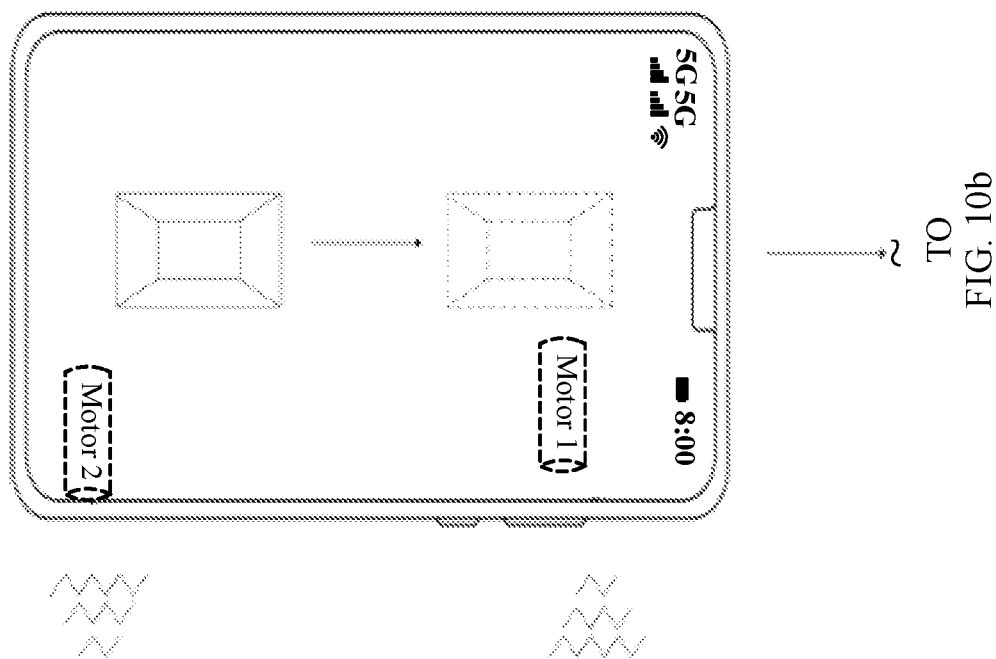
FIG. 10*a*-FIG. 10*b* are another schematic diagram of vibration according to an embodiment of this application.
Figure 10B:
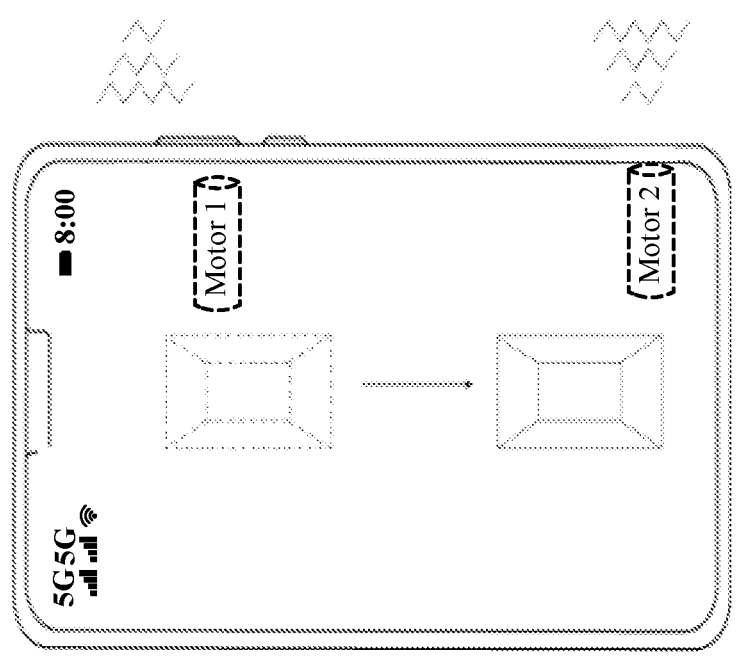

Likewise, as shown in FIG. 10a, when the screen direction of the electronic device is the second direction, the scene of the interface is that the vehicle moves from the left to the right, and the target vibration mode corresponding to the scene of the interface is "vibration transits from the left side to the right side". Therefore, in FIG. 10a, vibration strength of the motor 2 becomes weaker, and vibration strength of the motor 1 becomes stronger. The first target configuration information may be "haptic.game_qz.car_ltor". When the screen direction of the electronic device is switched to the fourth direction, see FIG. 10b. In FIG. 10b, vibration strength of the motor 1 becomes weaker, and vibration strength of the motor 2 becomes stronger, and the second target configuration information may be modified to "haptic.game_qz.car_rtol". Such vibration may combine a user's vision with a touch to bring a stereo vibration effect to the user, so that the user has immersive experience.

It should be understood that in scenario 1, that the motor vibrates from the left side to the right side is used as an example to describe that the motor vibrates in different vibration modes before and after the screen rotates. Similar to this scene, that the motor vibrates in different vibration modes before and after the screen rotates may be understood as that the vibration manners of the two motors are different. For example, the vibration manners may include: The left motor vibrates (as shown in FIG. 8a-FIG. 8b); the right motor vibrates; the left motor and the right motor alternately vibrate; the motor vibration transits from the right side to the left side; dual motors vibrate, but the left motor and the right motor have different vibration strength or vibration types.

In an embodiment, in response to the first operation, the scene of the interface changes from the "scene in which a game is enabled" to the "scene when under attack" and the first operation may be an instruction that is delivered by a processor inside an electronic device to display the "scene when under attack". When the application layer detects that the scene of the interface changes from the "scene in which a game is enabled" shown in FIG. 9d to the "scene when under attack" shown in FIG. 9e, the application layer may determine, based on the "scene when under attack", that the target vibration mode is dual-motor vibration, which is specifically that the dual motors simultaneously vibrate with same vibration strength. Because the target vibration mode is not directional, the application layer may use the first configuration information corresponding to the identifier of the target vibration mode in the vibration mode mapping relationship as the first target configuration information. In a possible implementation, if the first configuration information in the vibration mode mapping relationship does not include a suffix, the application framework layer may obtain the first target configuration information based on the foregoing related description in FIG. 7A-FIG. 7B.

The application layer determines, based on the mapping relationship between a target vibration mode and a vibration mode, the identifier "6A" of the target vibration mode or the first target configuration information "haptic.game_qmqz.Shoot2_dual", and sends the identifier "6A" of the target vibration mode or the first target configuration information "haptic.game_qmqz.Shoot2_dual" to the KIT layer. If the KIT layer receives the first target configuration information "haptic.game_qmqz.Shoot2_dual" from the application layer, the KIT layer sends the first target configuration information "haptic.game_qmqz.Shoot2_dual" to the application framework layer. If the KIT layer receives the identifier "6A" of the target vibration mode from the application layer, the KIT layer determines the first target configuration information "haptic.game_qmqz.Shoot2_dual" based on the vibration mode mapping relationship, and sends the initial configuration information "haptic.game_qmqz.Shoot2_dual" to the application framework layer. The application framework layer may determine, based on the first screen direction and the initial configuration information "haptic.game_qmqz.Shoot2_dual", that the initial configuration information is the first target configuration information, and send the first target configuration information "haptic.game_qmqz.Shoot2_dual" to the kernel layer. The kernel layer may use a first configuration file that includes the first target configuration information as the first target configuration file.

For operations performed by the application layer, the KIT layer, the application framework layer, the hardware abstraction layer, and the kernel layer in this embodiment, refer to related descriptions in the foregoing embodiments.

The first target configuration files corresponding to the "scene when under attack" may be (7) and (8) shown below.

<HAPTIC_EFFCT ID="12">

<NAME>haptic.game_qmqz.Shoot2_dualL</NAME>

<VALUE>0,1<VALUE>  (7)

<HAPTIC_EFFCT ID="12">

<NAME>haptic.game_qmqz.Shoot2_dualR</NAME>

<VALUE>0,1<VALUE>  (8)

It should be understood that the first target configuration file in the "scene when under attack" is used to indicate the first vibration mode, and the identifier of the first vibration mode is "1". The first vibration mode is that the left motor and the right motor vibrate in vibration mode 1 at 0 s. Special effect 1 indicates that the motor 1 and the motor 2 vibrate simultaneously for 3 ms. It may be figured out that in the first vibration mode, the first waveform in which the first motor vibrates is the same as the second waveform in which the second motor vibrates.

For example, as shown in FIG. 9e, the motor 1 and the motor 2 vibrate simultaneously for 3 ms. If the screen direction of the electronic device is switched from the fourth direction to the second direction in a process in which the dual motors vibrate, because the dual motors in the target vibration mode vibrate simultaneously, the vibration is not directional, that is, there is no difference between left-motor vibration and right-motor vibration. The second target configuration information corresponding to the second direction may also be "haptic.game_qmqz.Shoot2_dual". Therefore, as shown in FIG. 9f, the motors vibrate in the second vibration mode. The second vibration mode is that the motor 1 and the motor 2 may vibrate simultaneously at 0 s for 3 ms. The second vibration mode is the same as the first vibration mode. It may be figured out that in the second vibration mode, the third waveform in which the first motor vibrates is the same as the fourth waveform in which the second motor vibrates, and the first waveform and the third waveform are the same. It should be understood that in FIG. 9e and FIG. 9f, the vibration strength of the motor 1 and the vibration strength of the motor 2 are the same. In the figure, wave lines of a same length are used to represent that the vibration strength of the motor 1 and the vibration strength of the motor 2 are the same.

Figure 11A:
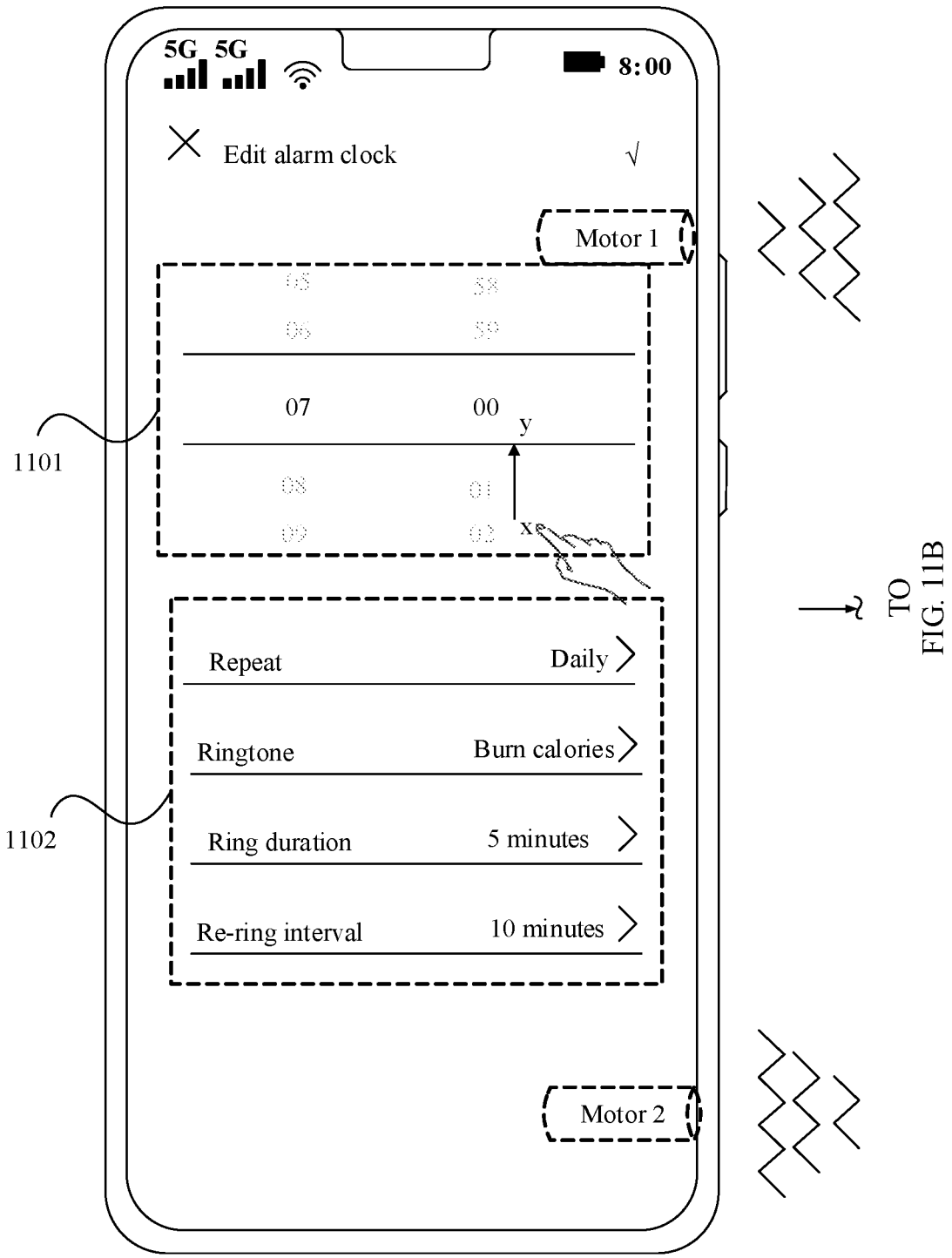
FIG. 11*a*-FIG. 11*b* are another schematic diagram of vibration according to an embodiment of this application.

Scenario 2: The first application scene of the electronic device is that the user performs an operation on the interface of the electronic device. In this embodiment of this application, an example in which an application is a clock application is first used for description. FIG. 11a shows an alarm clock editing interface, and the editing interface includes a roller selection area 1101 for selecting a time and a selection area 1102 for selecting an alarm clock type. The user may slide up or down in the roller selection area 1101 to select a time. The selection area 1102 for selecting an alarm clock type may include the "Repeat" setting option of the alarm clock, the ring tone option of the alarm clock, the ring duration option of the alarm clock, and the re-ring interval option of the alarm clock. In this embodiment of this application, that the user selects the time of an alarm clock is used as an example for description.

When the user slides up in the roller selection area 1101 for selecting a time, the vibration type may be dual-motor vibration (vibration transits from the lower side to the upper side). When the user slides down in the roller selection area 1101 for selecting a time, the vibration type is dual-motor vibration (vibration transits from the upper side to the lower side). The following describes scenario 2 with reference to the foregoing vibration method. The vibration method may include:

S1301. The application layer determines a target vibration mode based on operation information of the user.

The operation information of the user may include an operation position and/or an operation action of the user. For example, if the operation action of the user is sliding, and the operation position of the user a position x to a position y in FIG. 11a, it may be determined that the operation of the user is sliding from bottom to top. The application layer determines, based on the operation information of the user and the mapping relationship of the vibration mode, that the target vibration mode is dual-motor vibration (vibration transits from the lower side to the upper side), that is, vibration transits from the left motor to the right motor.

S1302. The application layer determines, based on the mapping relationship between a target vibration mode and a vibration mode, that the identifier of the target vibration mode or the first target configuration information, and sends the identifier of the target vibration mode or the first target configuration information to the KIT layer.

The application layer may determine, based on the mapping relationship between a target vibration mode and a vibration mode, that the identifier of the target vibration mode is "3C". It should be understood that a motor at a lower end of the electronic device is a predefined left motor, and an upper motor is a predefined right motor. If the first screen direction is the first direction, the first screen direction may be represented by "ltor" from bottom to up (that is, from the left motor to the right motor). Correspondingly, when the screen direction is the third direction, "from bottom to up" is from the right motor to the left motor, and the screen direction may be represented by "rtol". In this embodiment of this application, the application layer determines, based on the first screen direction, that the first target configuration information is "haptic.clock1_ltor".

S1303. If the KIT layer receives the first target configuration information "haptic.clock1_ltor" from the application layer, the KIT layer sends the first target configuration information "haptic.clock1_ltor" to the application framework layer; or if the KIT layer receives the identifier "3C" of the target vibration mode from the application layer, the KIT layer determines the initial configuration information "haptic.clock1" based on the vibration mode mapping relationship, and sends the initial configuration information "haptic.clock1" to the application framework layer.

S1304. If the application framework layer receives the first target configuration information "haptic.clock1_ltor" from the KIT layer, the application framework layer sends the first target configuration information "haptic.clock1_ltor" to the hardware abstraction layer; or if the application framework layer receives the initial configuration information "haptic.clock1" from the KIT layer, the application framework layer obtains the first target configuration information "haptic.clock1_ltor" based on the first screen direction and the initial configuration information "haptic.clock1" of the electronic device, and sends the first target configuration information "haptic.clock1_ltor" to the hardware abstraction layer.

S1305. The hardware abstraction layer obtains the first target configuration file based on the first target configuration information, and sends the first target configuration file to the kernel layer.

The hardware abstraction layer may determine, in the first configuration file and based on the first target configuration information, a to-be-determined first target configuration file that includes the first target configuration information. The first target configuration files may be (9) and (10) shown below.

<HAPTIC_EFFCT ID="33">

<NAME>haptic.clock1_ltor_dualL<NAME>

<VALUE>0, 3<VALUE> (9)

<HAPTIC_EFFCT ID="33">

<NAME>haptic.clock1_ltor_dualR<NAME>

<VALUE>0, 3<VALUE> (10)

If the first screen direction is the first direction, the lower end of the electronic device is the motor 2, that is, the left motor, and the upper end of the electronic device is the motor 1, that is, the right motor. Based on the foregoing first target configuration file, it may be determined that the vibration transits from the left motor of the electronic device to the right motor, that is, the vibration is transits from the lower side to the upper side.

S1306. The kernel layer generates, based on the first target configuration file, a first parameter corresponding to the target vibration mode, and drives, by using the first parameter, the motor to vibrate.

For example, in FIG. 11a, when the user slides up in the roller selection area 1101 for selecting a time, the target vibration mode is a first vibration mode, and the first vibration mode is as follows: Vibration of the left motor becomes weaker, and vibration of the right motor becomes stronger.

Figure 11B:
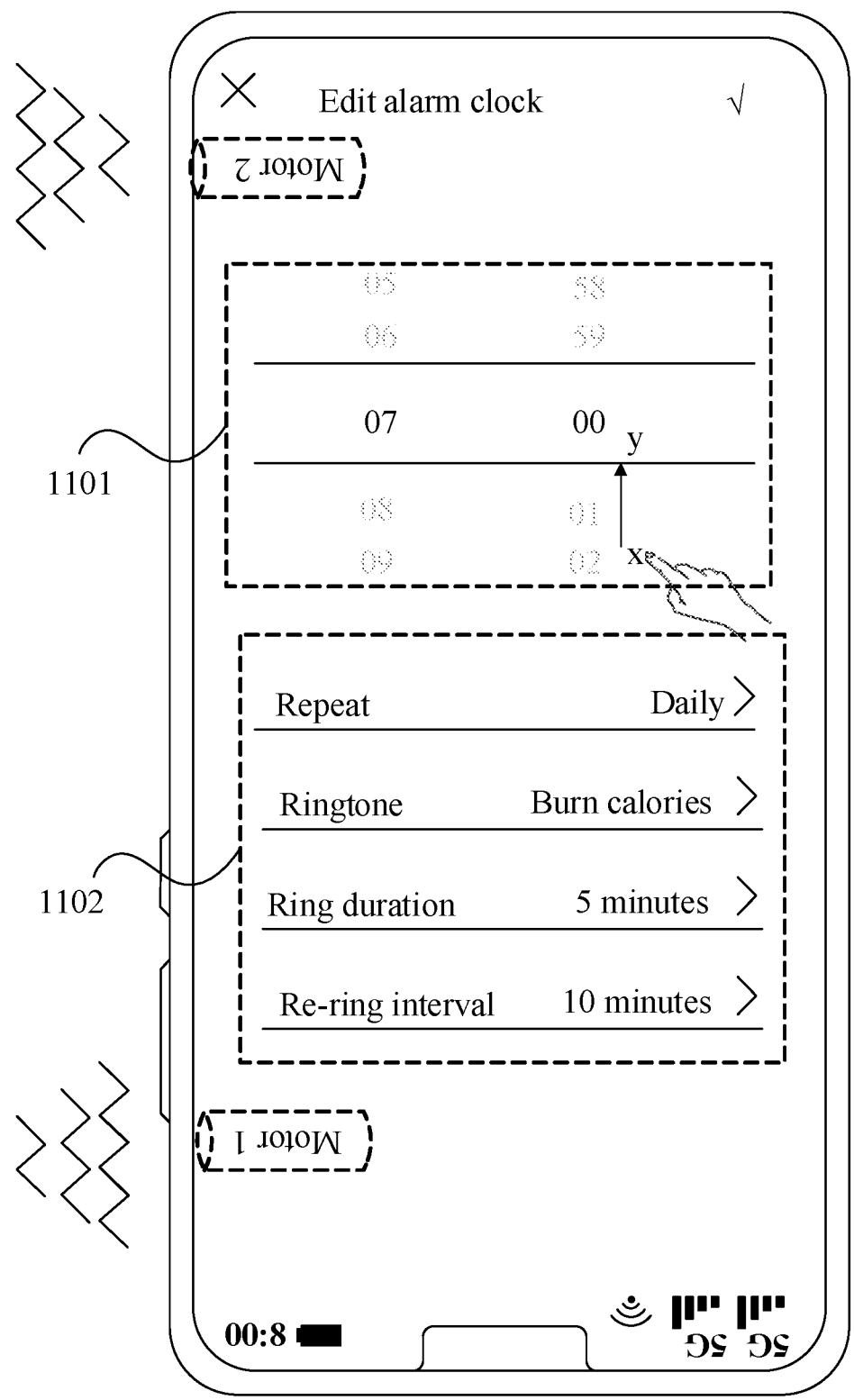

In an embodiment, if the screen direction in FIG. 11a is switched from the first direction to the third direction, when the user slides up in the roller selection area 1101 for selecting a time, the second target configuration information may be "haptic.clock1 rtol", and the corresponding second vibration mode is shown in FIG. 11b. The second vibration mode is as follows: Vibration of the right motor becomes weaker, and vibration of the left motor becomes stronger.

In this embodiment of this application, that an application is the input method application is used as an example for describing a vibration method. The vibration method may include:

S1401. The application layer determines a target vibration mode based on operation information of the user.

The operation information of the user may be an operation position of the user. For example, when the user taps a control on a keypad of an input method, the application layer may determine, based on an operation position of the user, that a motor near the operation position of the user vibrates. In this embodiment of this application, the screen of the electronic device is pre-divided into an area close to the motor 2 and an area close to the motor 1. As shown in FIG. 12a-FIG. 12e, a dashed line in a divides the screen into two areas, where an area to which the motor 2 belongs is the area close to the motor 2, and an area to which the motor 1 belongs is the area close to the motor 1.

Figure 12A:
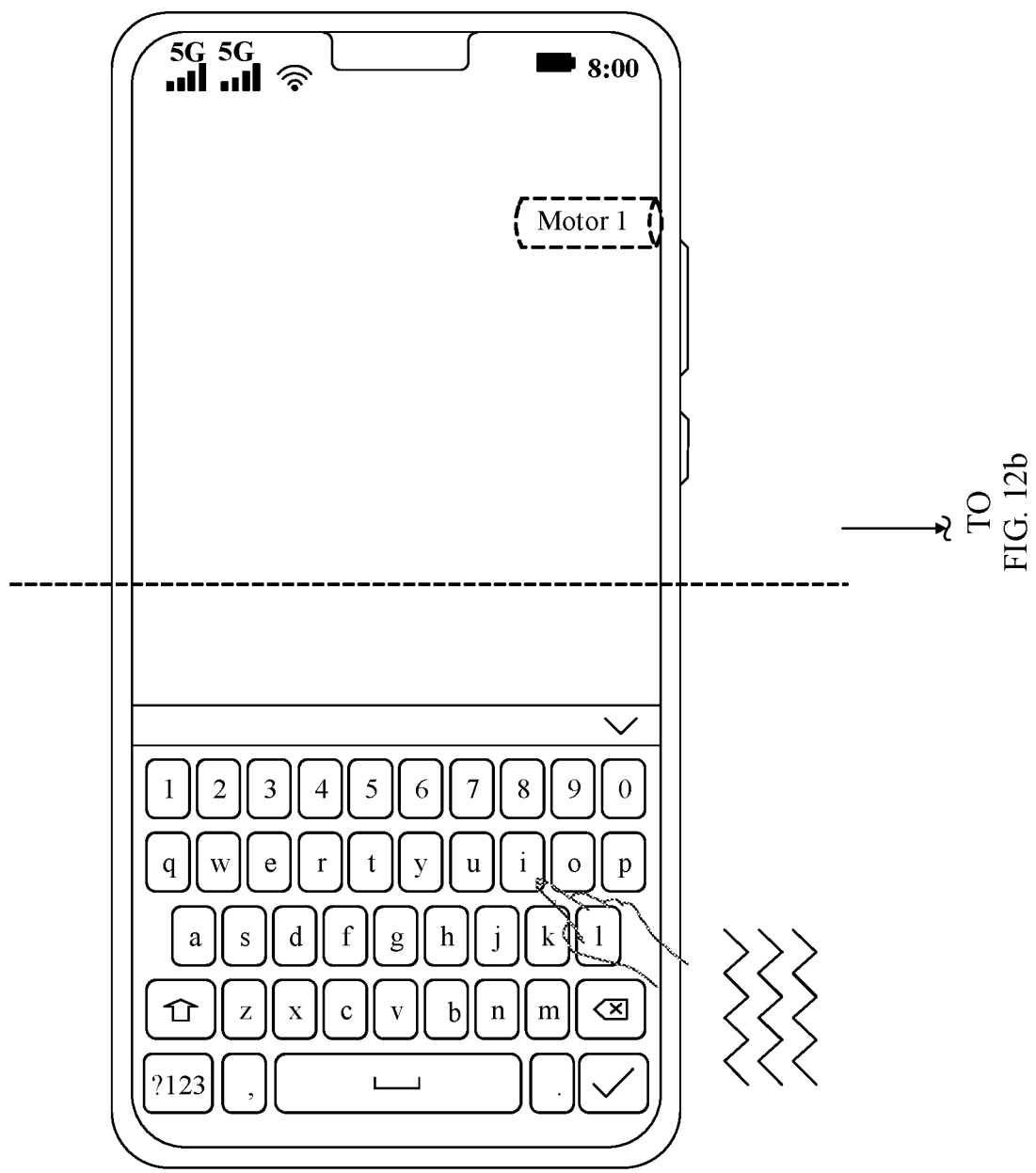

As shown in FIG. 12a, the first screen direction of the electronic device is the first direction, and a keypad is located below the interface of the electronic device. When the user searches for information by using an input method, all positions of controls tapped by the user on the keypad of the input method fall into the area close to the motor 2. That is, the operation position of the user on the keypad is close to the motor 2, and the application layer may determine that the target vibration mode is that the motor 2 (left motor) vibrates.

S1402. The application layer determines, based on the mapping relationship between a target vibration mode and a vibration mode, the identifier "2C" of the target vibration mode or the first target configuration information "haptic.shurufa_ltor", and sends the identifier "2C" of the target vibration mode or the first target configuration information "haptic.shurufa_ltor" to the KIT layer.

In an embodiment, when the screen direction of the electronic device is the first direction or the third direction, the first target configuration information may not carry the suffix "ltor" or "rtol".

S1403. If the KIT layer receives the first target configuration information "haptic.shurufa_ltor" from the application layer, the KIT layer sends the first target configuration information "haptic.shurufa_ltor" to the application framework layer; or if the KIT layer receives the identifier "2C" of the target vibration mode from the application layer, the KIT layer determines the initial target configuration information "haptic.shurufa" based on the vibration mode mapping relationship, and sends the initial target configuration information "haptic.shurufa" to the application framework layer.

S1404. If the application framework layer receives the first target configuration information "haptic.shurufa_ltor" from the KIT layer, the application framework layer sends the first target configuration information "haptic.shurufa_ltor" to the hardware abstraction layer; or if the application framework layer receives the initial configuration information "haptic.shurufa" from the KIT layer, the application framework layer obtains the first target configuration information "haptic.shurufa_ltor" based on the first screen direction and the initial configuration information of the electronic device, and sends the first target configuration information to the hardware abstraction layer.

S1405. The hardware abstraction layer obtains the first target configuration file based on the first target configuration information, and sends the first target configuration file to the kernel layer.

The first target configuration information is "haptic.shurufa_ltor", and the hardware abstraction layer may determine, in the first configuration file and based on the first target configuration information, a first target configuration file that includes the first target configuration information "haptic.shurufa_ltor", as shown below.

<HAPTIC_EFFCT ID="45">
<NAME>haptic.shurufa_ltor_OnlyL</NAME>
<VALUE>0,4<VALUE>

The first target configuration file represents that the left motor vibrates at 0 s in vibration mode 4 with level 5 vibration strength.

S1405. The kernel layer generates, based on the first target configuration file, a first parameter corresponding to the target vibration mode, and drives, by using the first parameter, the motor to vibrate.

For example, as shown in FIG. 12a, the screen direction is the first direction, and all positions of controls tapped by the user on the keypad of the input method are close to the motor 2. Therefore, when the user taps a control on the keypad of the input method, the target vibration mode is the first vibration mode, and the first vibration mode is that the motor 2 vibrates.

Figure 12B:
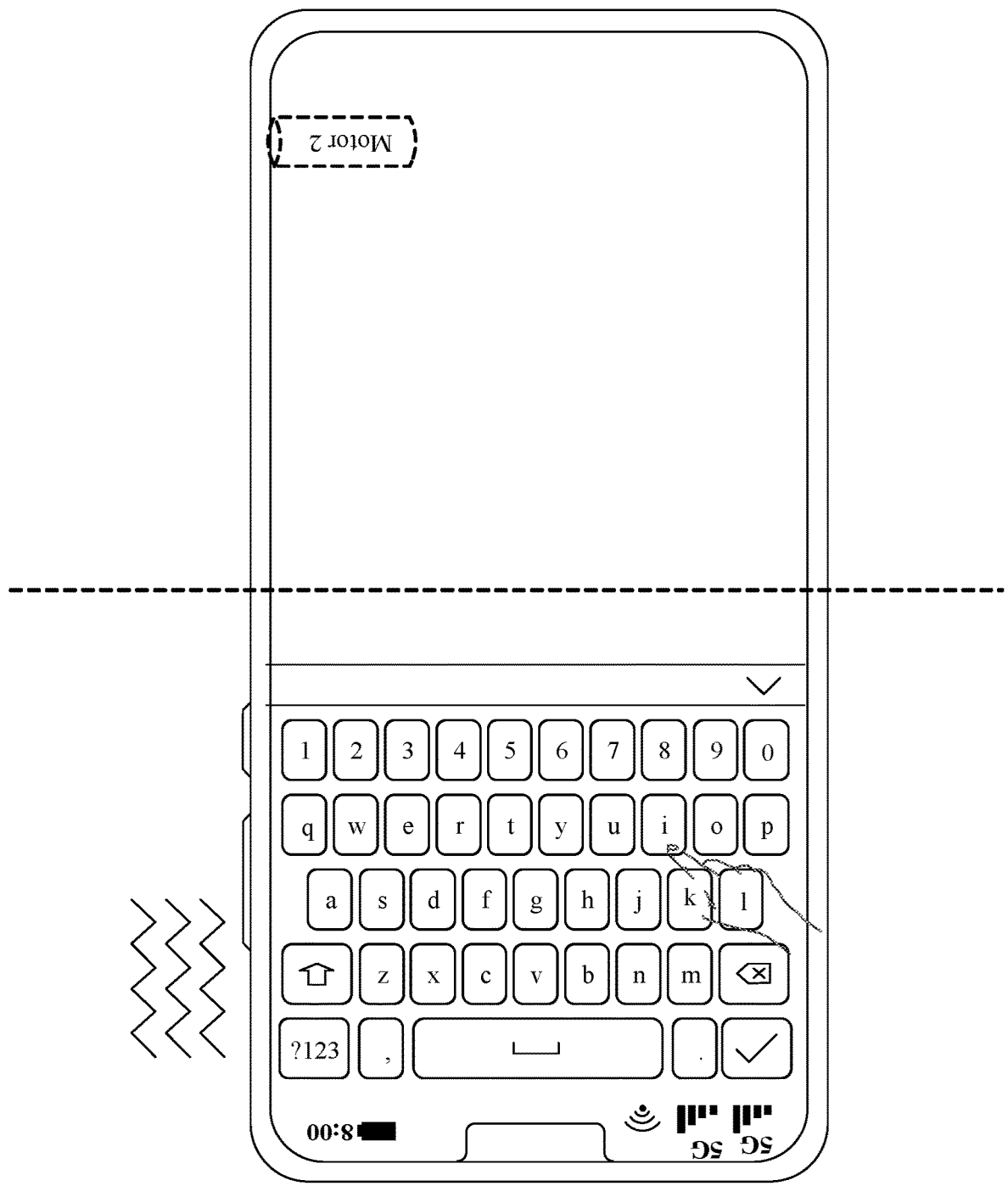

In an embodiment, if the screen direction in FIG. 12a is switched from the first direction to the third direction, as shown in FIG. 12b, all positions of controls tapped by the user on the keypad of the input method are close to the motor 1, the user application framework layer may obtain the second target configuration information "haptic.shurufa_rtol", and the <NAME> line in the second target configuration file is "haptic.shurufa_rtol_OnlyR", which represents that the first vibration mode is that the motor 1 vibrates.

Figure 12E:
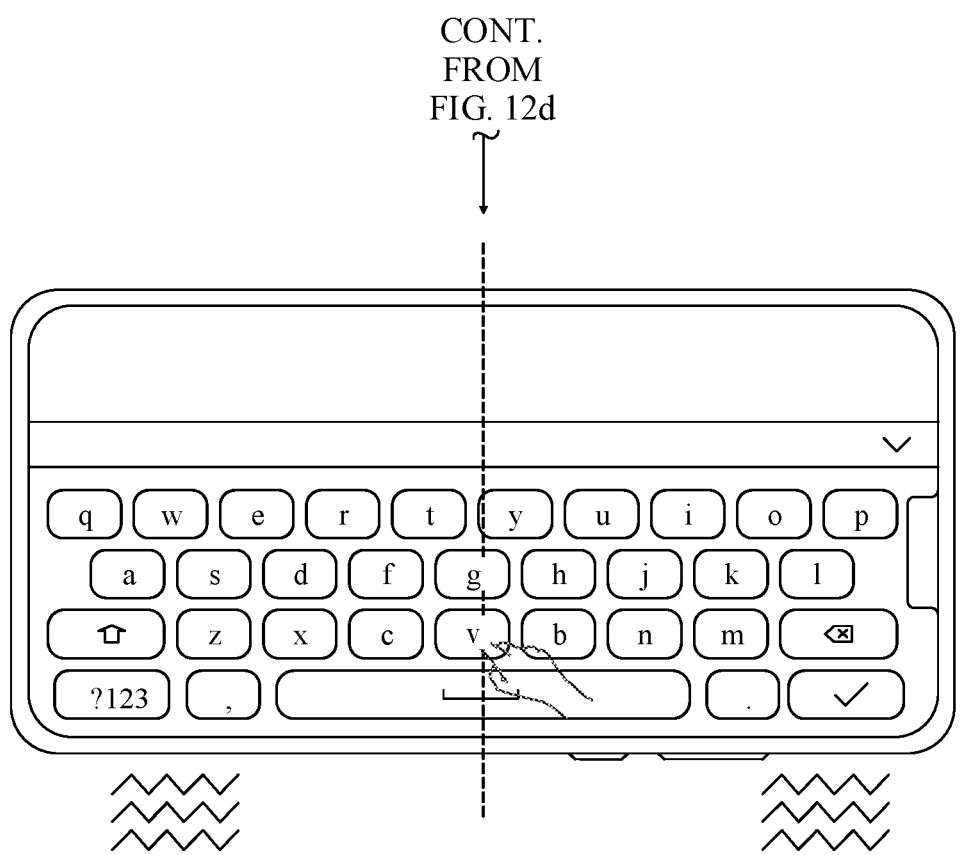

In an embodiment, if the screen direction is switched from the third direction to the second direction, see FIG. 12c. The application layer may determine the second vibration mode based on the position of the control tapped by the user on the keypad of the input method. For example, as shown in FIG. 12c, when the user taps a control to the left of the dashed line, the operation position of the user is close to the left motor. Therefore, the second vibration mode is that the left motor (motor 2) vibrates, and the <NAME> line in the second target configuration file is "haptic shurufa_rtol_OnlyL". As shown in FIG. 12d, when the taps a control to the right of the dashed line, the operation position of the user is close to the right motor. Therefore, the second vibration mode is that the right motor (motor 1) vibrates and the <NAME> line in the second target configuration file is "haptic.shurufa_rtol_OnlyR". As shown in FIG. 12e, when the user taps a control covered by the position of the dashed line, the target second vibration mode is that dual motors (motor 1 and motor 2) vibrate, and the <NAME> line in the second target configuration file is "haptic.shurufa_rtol_dual".

Scenario 3: The first application scene of the electronic device may be vibration with music.

Figure 13A:
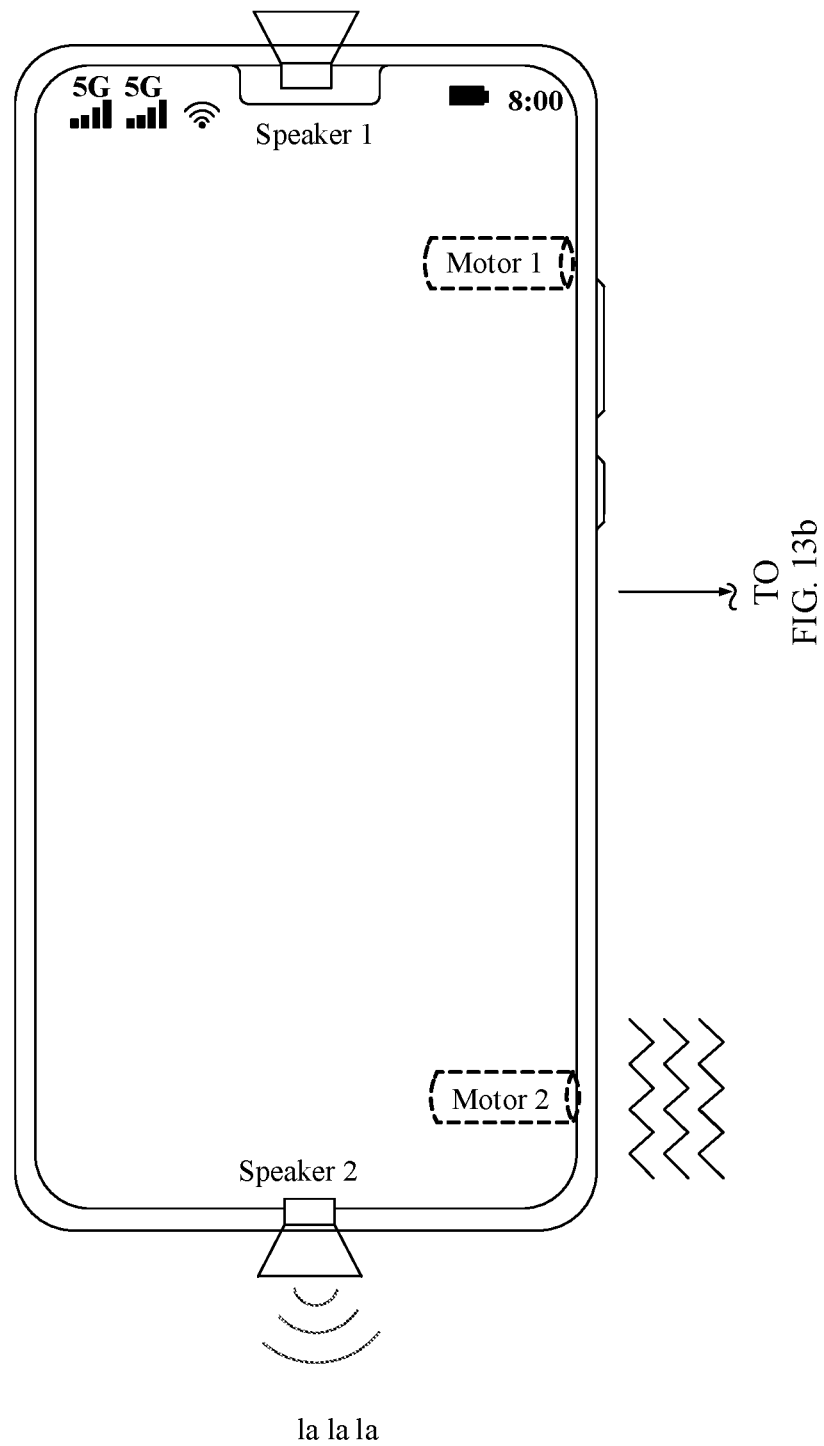
FIG. 13*a*-FIG. 13*c* are another schematic diagram of vibration according to an embodiment of this application.

In this embodiment of this application, an example in which the electronic device includes two speakers disposed at two ends of the electronic device is used for description, as shown in FIG. 13a. For example, when audio on a left channel, a speaker 1 outputs the audio. When the sound channel of the audio is the right channel, a speaker 2 outputs the audio. When the sound channel of the audio is dual-channel, the speaker 1 and the speaker 2 output the audio. It may be understood that the sound channel of the audio may be multi-channel, and the electronic device may include at least three speakers. When the sound channel of the audio is multi-channel, at least three speakers can output the audio.

The following describes scenario 3 with reference to the foregoing vibration method. The vibration method may include:

S1701. The application layer determines a target vibration mode based on a sound channel of audio.

For a manner of obtaining a sound channel of the audio by the application layer, refer to related descriptions in the foregoing embodiments. In this embodiment of this application, when the audio on a right channel, a speaker 1 outputs the audio, and the target vibration mode is that the motor 1 near the speaker 1 vibrates. When the sound channel of the audio is the left channel, a speaker 2 outputs the audio, and the target vibration mode is that the motor 2 near the speaker 2 vibrates. When the sound channel of the audio is dual-channel, the speaker 1 and the speaker 2 output the audio, and the target vibration mode is that the motor 1 and the motor 2 vibrate simultaneously.

The following uses an example in which the screen direction is the first direction, the sound channel of the audio is the right channel, and the speaker 1 outputs the audio for description.

S1702. The application layer determines, based on the mapping relationship between a target vibration mode and a vibration mode, the identifier of the target vibration mode or the first target configuration information "haptic.music1_ltor", and sends the identifier of the target vibration mode or the first target configuration information "haptic.music1_ltor" to the KIT layer.

S1703. If the KIT layer receives the first target configuration information "haptic.music1_ltor" from the application layer, the KIT layer sends the first target configuration information "haptic.music1_ltor" to the application framework layer; or if the KIT layer receives the identifier of the target vibration mode from the application layer, the KIT layer determines the initial configuration information "haptic.music1" based on the vibration mode mapping relationship, and sends the initial configuration information "haptic.music1" to the application framework layer.

S1704. If the application framework layer receives the first target configuration information "haptic.music1_ltor" from the KIT layer, the application framework layer sends the first target configuration information "haptic.music1_ltor" to the hardware abstraction layer; or if the application framework layer receives the initial configuration information "haptic.music1" from the KIT layer, the application framework layer obtains the first target configuration information "haptic.music1_ltor" based on the first screen direction and the initial configuration information of the electronic device, and sends the first target configuration information "haptic.music1_ltor" to the hardware abstraction layer.

S1705. The hardware abstraction layer obtains the first target configuration file based on the first target configuration information, and sends the first target configuration file to the kernel layer.

The hardware abstraction layer may determine, in the first configuration file and based on the first target configuration information, a first target configuration file that includes the first target configuration information "haptic.music1_ltor". The first target configuration file may be as follows:
<HAPTIC_EFFCT ID="4003">
<NAME>haptic.music1_ltor_OnlyR<NAME>
<VALUE>0,400<VALUE>

When the first target configuration file represents that the sound channel of the audio is the right channel, the right motor vibrates at 0 s with special effect 400.

S1706. The kernel layer generates, based on the first target configuration file, a first parameter corresponding to the target vibration mode, and drives, by using the first parameter, the motor to vibrate.

For example, as shown in FIG. 13a, when the sound channel of the audio is the right channel, the speaker 1 outputs the audio "la la la", and the motor 1 vibrates.

Figure 13B:
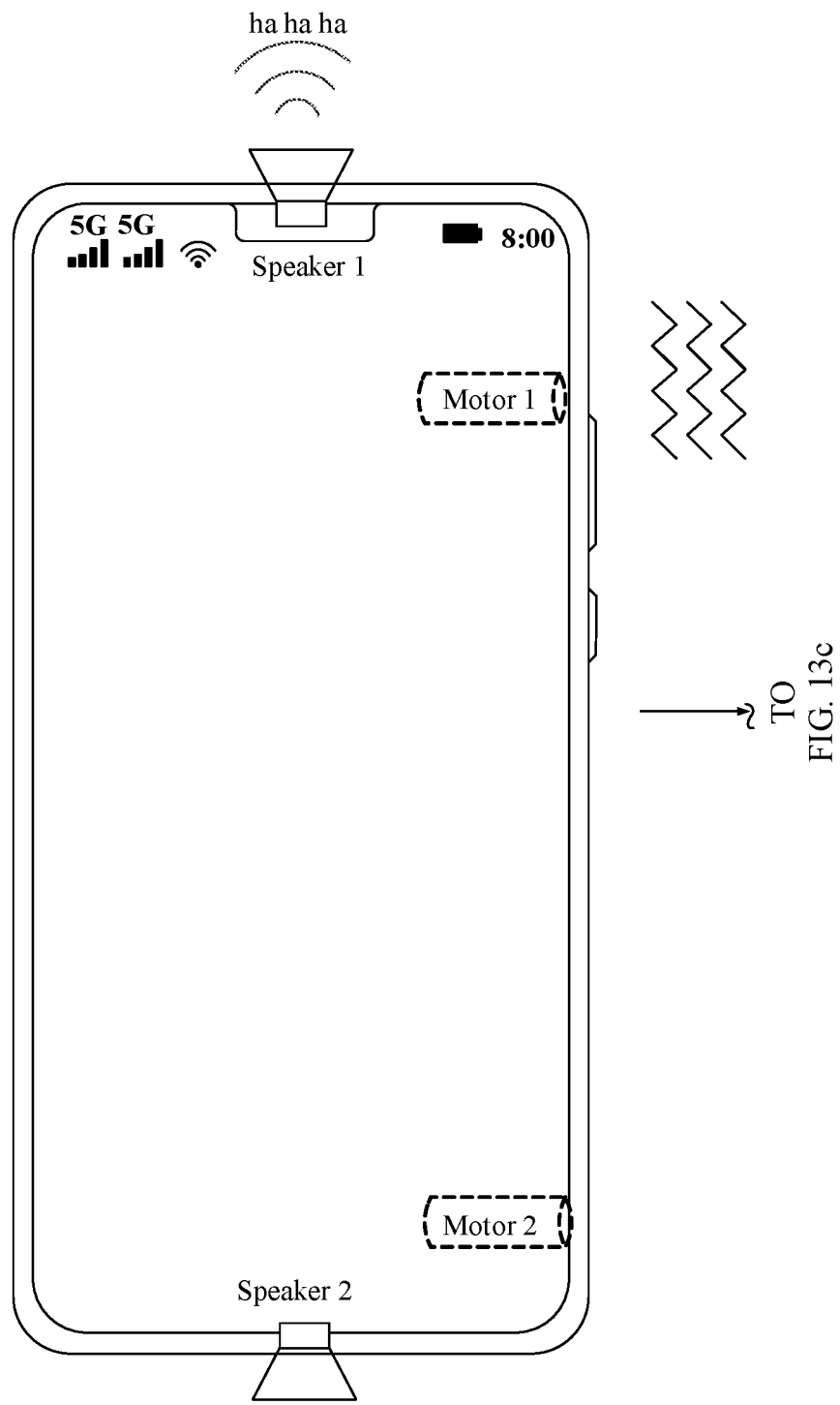

In this embodiment of this application, when the sound channel of the audio changes, the application layer may re-obtain the second target configuration information by performing the foregoing S1701-S1706. For example, when the audio channel changes from the right channel to the left channel, the first target configuration information may change from "haptic.music1_ltor" to "haptic.music2_ltor". "music2" represents the left channel, and "music1" represents the right channel. Correspondingly, the <NAME> line in the first target configuration file may be changed from "haptic.music1_ltor_OnlyR" to "haptic.music2_ltor_OnlyL" in the second target configuration file. As shown in FIG. 13b, when the sound channel of the audio is the left channel, the speaker 2 outputs the audio "ha ha ha", and the motor 2 vibrates.

Because the audio channel changes rapidly, to reduce a delay, in this embodiment of this application, the application framework layer may modify the first target configuration information "haptic.music1_ltor" to the second target configuration information "haptic.music2_ltor" based on the audio channel, and then the hardware abstraction layer may obtain the <NAME> line "haptic.music2_ltor_OnlyL" in the second target configuration file, so as to implement vibration shown in FIG. 13b. For a process of obtaining the audio channel by the application framework layer, refer to the foregoing related description of S701.

Figure 13C:
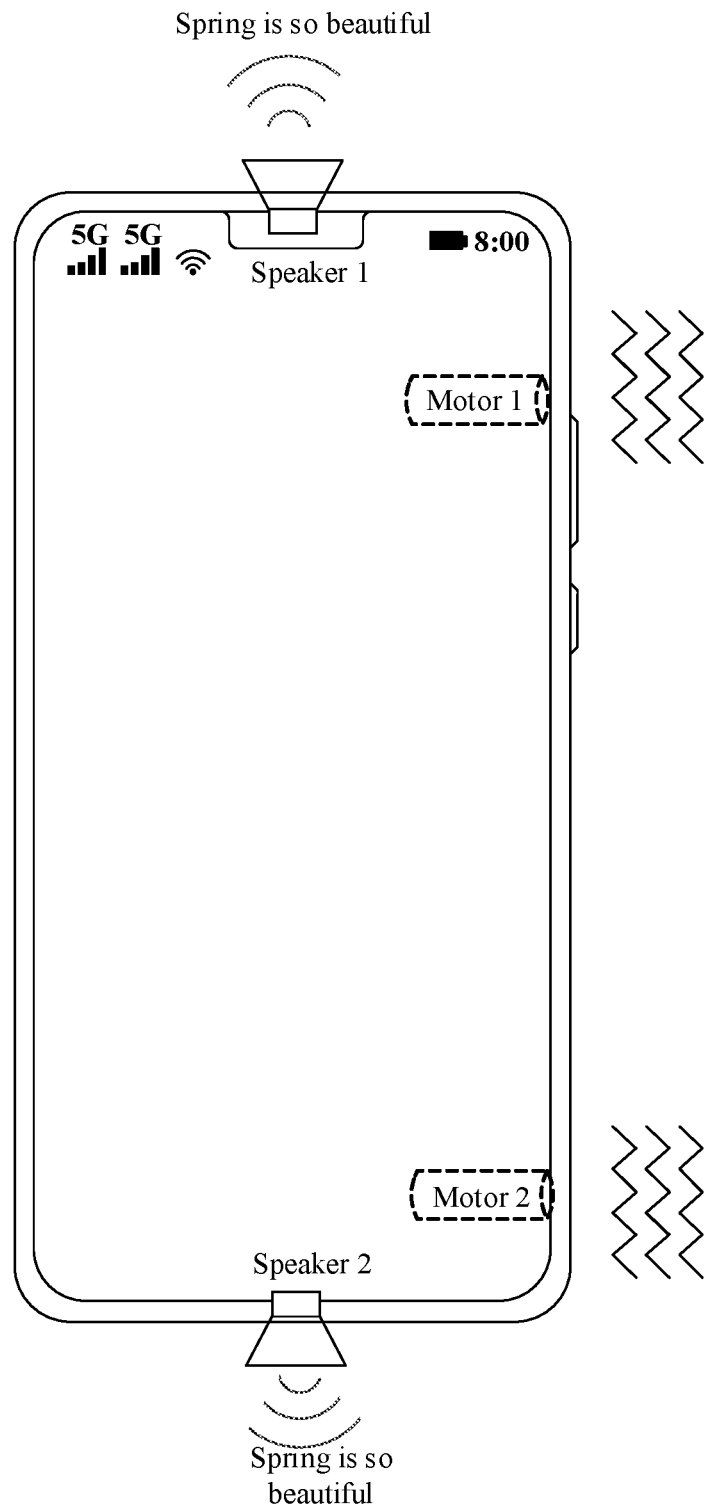

In a possible implementation, when the sound channel of the audio changes from the left channel to dual-channel, the <NAME> line in the first target configuration file may be changed from "haptic.music2_ltor_OnlyL" to "haptic.music12_ltor_dual", where "haptic.music12_ltor_dual" is used to indicate that the dual motors simultaneously vibrate, and "music12" represents dual-channel. As shown in FIG. 13c, when the sound channel of the audio is dual-channel, the speaker 1 and the speaker 2 output the audio "spring is so beautiful", and the motor 1 and the motor 2 vibrate.

In an embodiment, based on the embodiment shown in FIG. 13a-FIG. 13c, when detecting that the screen direction changes, the application layer or the application framework layer may modify the target configuration information, so that the electronic device may vibrate based on the change of the screen direction and the change of the sound channel of the audio. For modification of the target configuration information when the application layer or the application framework layer detects that the screen direction changes, refer to the foregoing related description.

In an embodiment, when the electronic device plays the audio, the interface of the electronic device may display a video corresponding to the audio. In this scene, the electronic device plays a music video (music video, MV), a concert, or the like. In this embodiment, the sound channel of the audio and the vibration of the motor may change as the screen direction of the electronic device changes. The following describes this embodiment with reference to FIG. 14a-FIG. 14f.

Figure 14A:
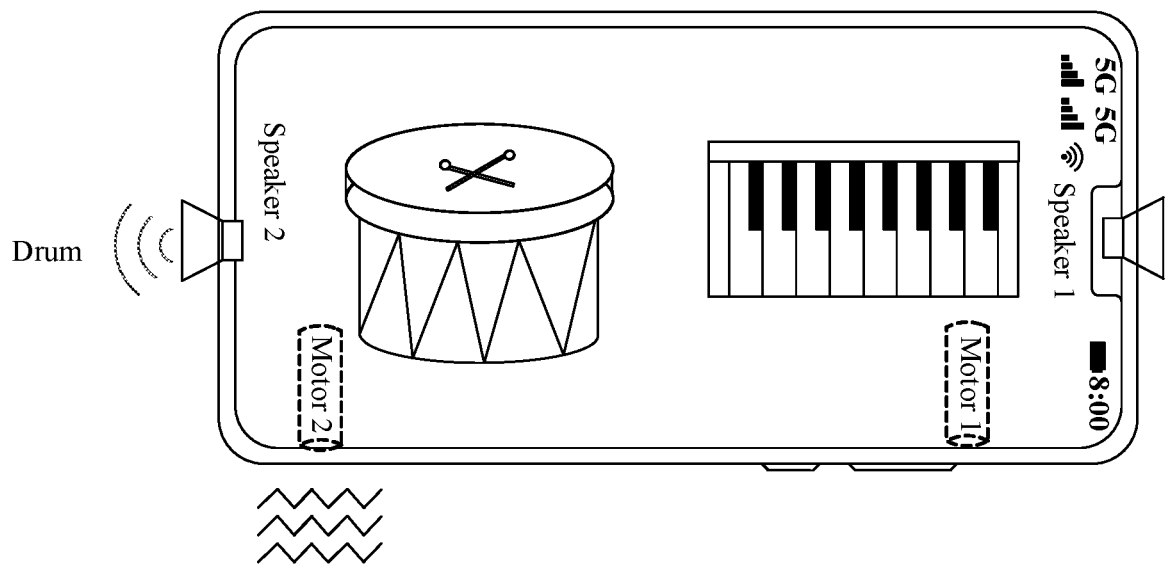
FIG. 14*a*-FIG. 14*f* are another schematic diagram of vibration according to an embodiment of this application.
Figure 14B:
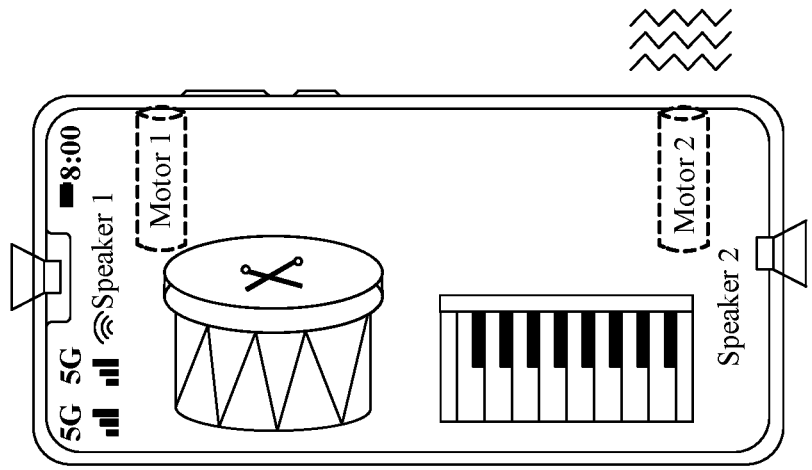
Figure 14C:
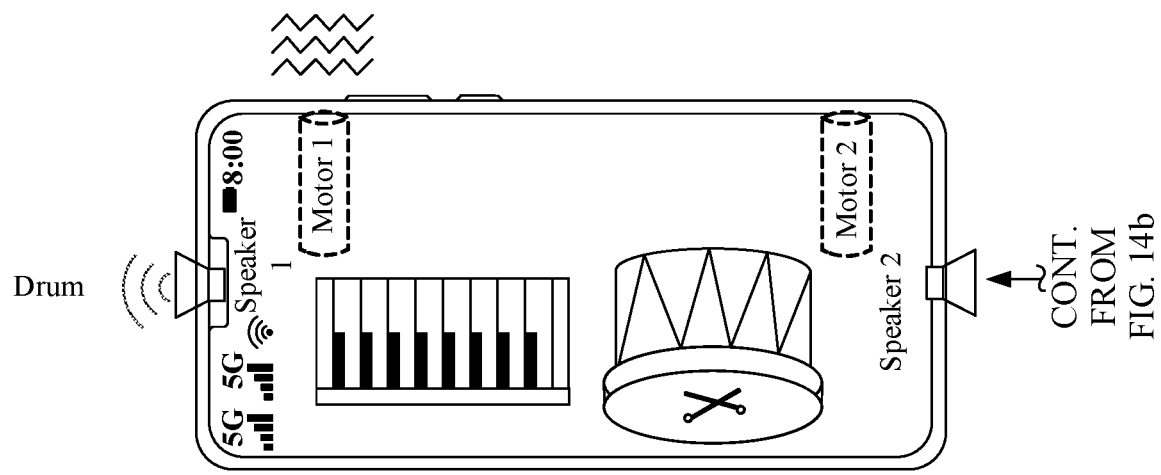

When the screen direction of the electronic device is the second direction, FIG. 14a shows a scene in which the electronic device plays a concert, a drum is on the left side of the interface of the electronic device, and an electronic organ is on the right side. The sound channel of the audio of the drum is a left channel, and the speaker 2 may output the audio of the drum; and the sound channel of the audio of the electronic organ is a right sound channel, and the speaker 1 may output the audio of the electronic organ. In this embodiment of this application, when the electronic device plays the audio of the drum, the speaker 2 outputs the audio of the drum, and the motor 2 vibrates, as shown in FIG. 14a. When the electronic device plays the audio of the electronic organ, the speaker 1 outputs the audio of the electronic organ, and the motor 1 vibrates, as shown in FIG. 14b. When the electronic device plays the audio of the electronic organ and the audio of the drum, the speaker 1 outputs the audio of the electronic organ, the speaker 2 outputs the audio of the drum, and the motor 1 and the motor 2 vibrate, as shown in FIG. 14c. It should be understood that for implementations in FIG. 14a, FIG. 14b, and FIG. 14c, reference may be made to the foregoing S1701-S1706, and details are not described herein again.

Figure 14D:
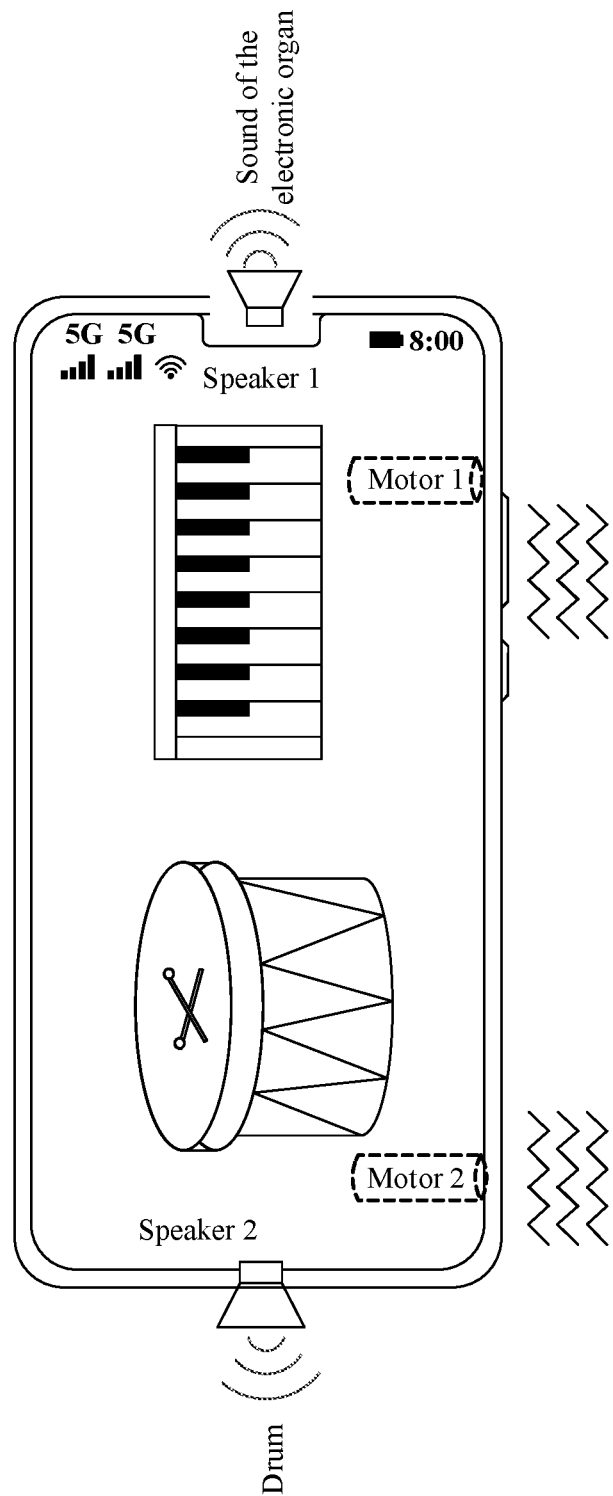
Figure 14E:
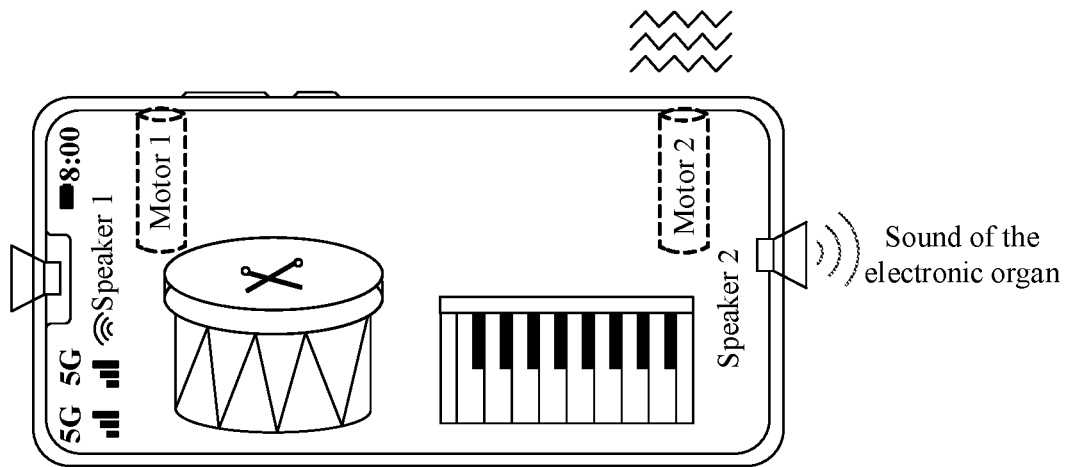
Figure 14F:
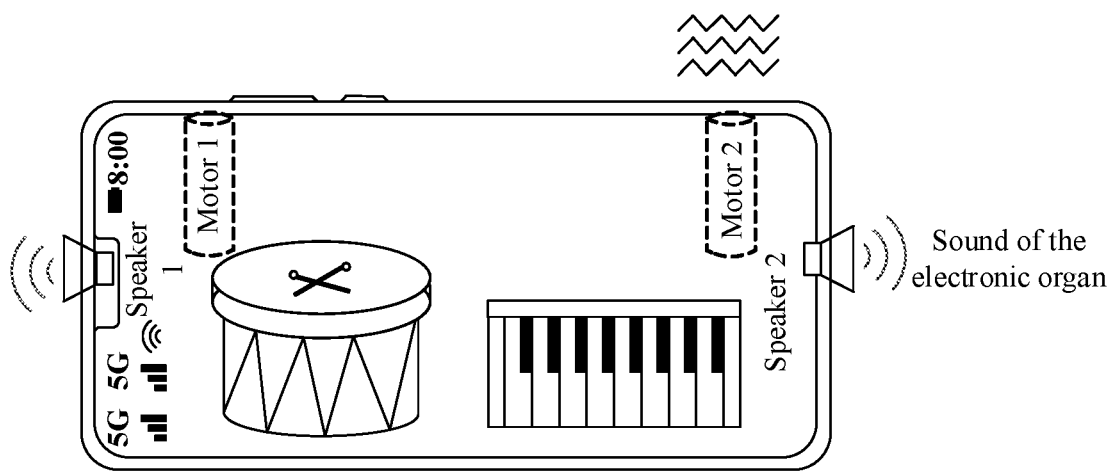

When the electronic device is switched from the first screen direction to the second screen direction, for example, the electronic device is switched from the second direction to the fourth direction, the drum is still on the left side of the interface of the electronic device, and the electronic organ is still on the right side. However, the position of the motor and the speaker in the electronic device respectively relative to the left side and the right side of the electronic device change. To make the user have the same vibration experience and audio experience as those in FIG. 14a, FIG. 14b, and FIG. 14c, in this embodiment of this application, when the electronic device outputs the audio of the drum, the audio of the drum may be changed from the left channel to the right channel, so that the speaker 1 outputs the audio of the drum, and the motor 1 vibrates, as shown in FIG. 14d. When the electronic device outputs the audio of the electronic organ, the audio of the electronic organ changes from the right channel to the left channel, so that the speaker 2 outputs the audio of the drum, and the motor 2 vibrates, as shown in FIG. 14e. Likewise, when the electronic device plays the audio of the electronic organ and the audio of the drum, the speaker 1 outputs the audio of the drum, the speaker 2 outputs the audio of the electronic organ, and the motor 1 and the motor 2 vibrate, as shown in FIG. 14f. In this embodiment, when the screen direction changes, the user can still have the same vibration experience and audio experience, thereby improving user experience.

In a possible implementation, the first application scene of the electronic device may be a scene of the interface, and the scene of the interface is the concert scene shown in FIG. 14a-FIG. 14f. In this embodiment of this application, a target vibration mode corresponding to the scene of the interface may be preset. For actions of the application layer, the KIT layer, the application framework layer, the hardware abstraction layer, and the kernel layer, reference may be made to the descriptions in the foregoing embodiments. Therefore, for the change of the vibration mode of the motor when the screen direction of the electronic device changes, reference may also be made to the example shown in FIG. 13a-FIG. 13c, and details are not described herein again.

In a possible implementation, when the screen direction changes, the electronic device changes the sound channel of the audio. Specifically, when detecting that the screen direction changes, the application layer or the application framework layer may modify the sound channel of the audio, so that the sound channel of the audio changes when the screen direction changes as shown in FIG. 14a-FIG. 14f.

In this embodiment of this application, the application layer or the application framework layer may detect a change of the screen direction, and then modify target configuration information, and modify a sound channel of an audio, so that the electronic device may change a vibration mode based on the change of the screen direction, and change an audio output based on the change of the sound channel of an audio, thereby improving user experience.

Scenario 4: The first application scene of the electronic device may be a screen direction of the electronic device. In this embodiment of this application, an input method application is used as an example for description. For example, when the user taps a control on the keypad of an input method, the electronic device may perform vibration feedback based on the screen direction.

The following describes scenario 4 with reference to the foregoing vibration method. The vibration method may include:

S1801. When detecting an operation action of the user, the application layer determines a target vibration mode based on a screen direction.

In an embodiment, for example, when the electronic device is a vertical screen, the target vibration mode may be master-motor vibration. When the electronic device is a horizontal screen, to enhance the sense of vibration, dual-motor vibration may be used. The following uses an example in which the electronic device is a vertical screen as an example for description.

S1802. The application layer determines, based on the mapping relationship between a target vibration mode and a vibration mode, the identifier "1B" of the target vibration mode or the first target configuration information "haptic.shurufa3_ltor", and sends the identifier "1B" of the target vibration mode or the first target configuration information "haptic.shurufa3_ltor" to the KIT layer.

S1803. If the KIT layer receives the first target configuration information "haptic.shurufa3_ltor" from the application layer, the KIT layer sends the first target configuration information "haptic.shurufa3_ltor" to the application framework layer; or if the KIT layer receives the identifier "1B" of the target vibration mode from the application layer, the KIT layer determines the initial configuration information "haptic.shurufa3" based on the vibration mode mapping relationship, and sends the initial configuration information "haptic.shurufa3" to the application framework layer.

S1804. If the application framework layer receives the first target configuration information "haptic.shurufa3_ltor" from the KIT layer, the application framework layer sends the first target configuration information "haptic.shurufa3_ltor" to the hardware abstraction layer; or if the application framework layer receives the initial configuration information "haptic.shurufa3" from the KIT layer, the application framework layer obtains the first target configuration information "haptic.shurufa3_ltor" based on the first screen direction and the initial configuration information of the electronic device, and sends the first target configuration information "haptic.shurufa3_ltor" to the hardware abstraction layer.

S1805. The hardware abstraction layer obtains the first target configuration file based on the first target configuration information, and sends the first target configuration file to the kernel layer.

The hardware abstraction layer may determine, in the first configuration file and based on the first target configuration information, a first target configuration file that includes the first target configuration information "haptic.shurufa3_ltor", as shown below.

<HAPTIC_EFFCT ID="205">
    <NAME>haptic.shurufa3_ltor_main<NAME>
    <VALUE>0,20<VALUE>

If the first target configuration file represents an input method application, when the electronic device is a vertical screen, the master motor (the motor 2) vibrates with special effect 20 at 0 s.

S1805. The kernel layer generates, based on the first target configuration file, a first parameter corresponding to the target vibration mode, and drives, by using the first parameter, the motor to vibrate.

Figure 15A:
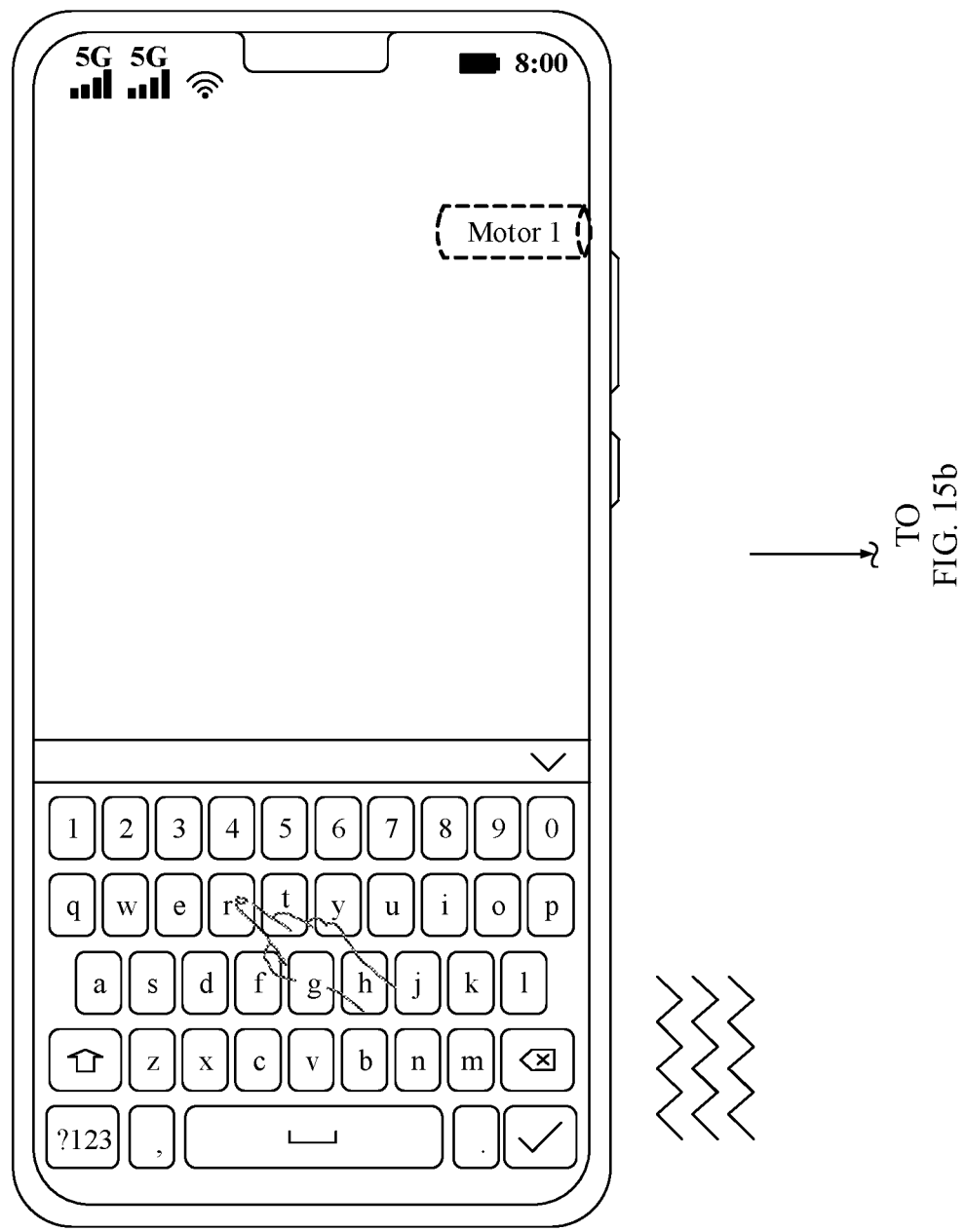
FIG. 15*a*-FIG. 15*b* are another schematic diagram of vibration according to an embodiment of this application.

For example, as shown in FIG. 15a, when the screen direction is the first direction, the user taps a control in the keypad, the target vibration mode is the first vibration mode, and the first vibration mode is that the motor 2 vibrates.

Figure 15B:
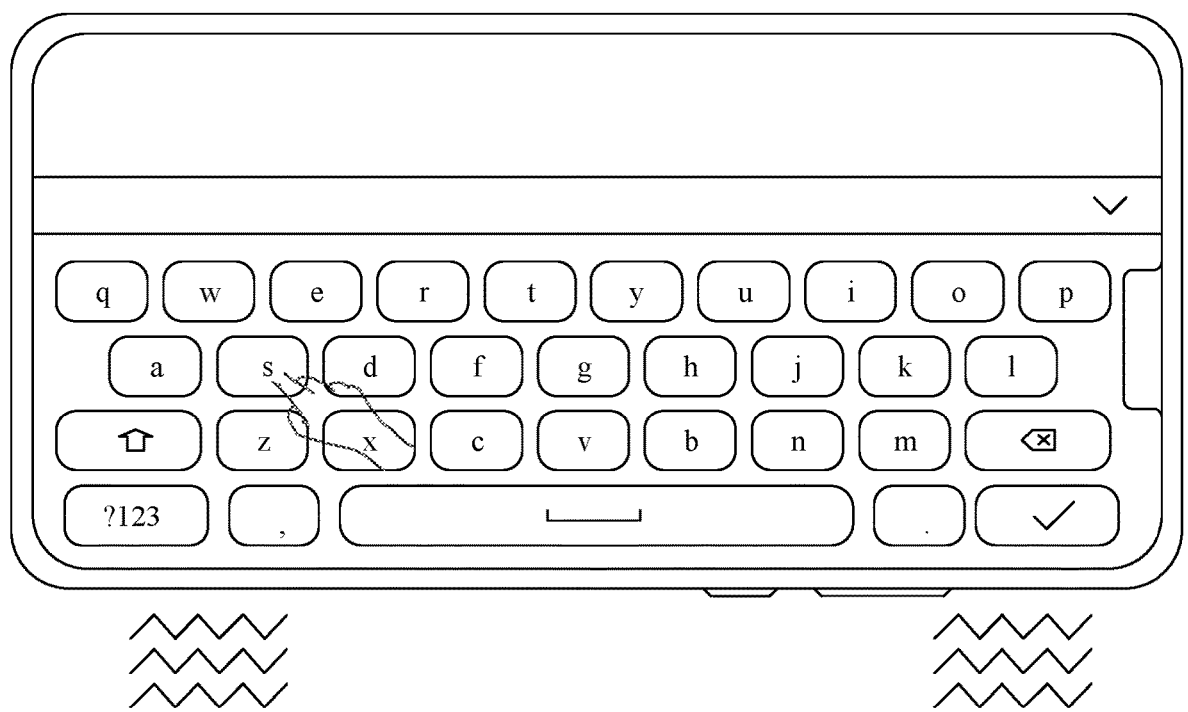

In this embodiment of this application, when the screen direction is switched from the first direction to the second direction, and the screen direction is a horizontal screen, the second vibration mode is that two motors vibrate together. As shown in FIG. 15b, when the user taps a control on the keypad, the dual motors vibrate, that is, the motor 1 and the motor 2 vibrate.

Scenario 5: The first application scene of the electronic device may be an audio playback scene.

In this scene, different audio may be corresponding to different target vibration modes, and different audio may be distinguished by an audio identifier. A configuration file corresponding to audio that includes different identifiers is preconfigured in the first configuration file. The electronic device may implement vibration of the motor during audio playback by performing the foregoing S701-S708. It should be understood that the first configuration information delivered by the application layer or the application framework layer to the hardware abstraction layer may include an audio identifier, so that the hardware abstraction layer obtains, based on the audio identifier, the first target configuration file corresponding to the audio.

For example, the target vibration mode of the audio A is "the left motor vibrates at 1 s, does not vibrate at 2 s, and vibrates at 3 s, and right motor does not vibrate at 1 s, vibrates at 2 s, and vibrates at 3 s". Correspondingly, a <VALUE> sequence of the vibration in the first target configuration file "haptic_music1_xxx_dualL" is (0, 1000, 2000, 1000), and a <VALUE> sequence of the vibration in the first target configuration file "haptic_music1_xxx_dualR" is (1000, 1000, 2000, 1000). Therefore, the kernel layer may implement the following vibration effect based on the first target configuration file: "the left motor vibrates at 1 s, does not vibrate at 2 s, and vibrates at 3 s, and right motor does not vibrate at 1 s, vibrates at 2 s, and vibrates at 3 s". It should be understood that in this scene, for actions of the application layer, the KIT layer, the application framework layer, the hardware abstraction layer, and the kernel layer in the electronic device, reference may be made to the descriptions in the foregoing embodiment.

Scenario 6: The first application scene of the electronic device is an external environment in which the electronic device is located.

Figure 16A:
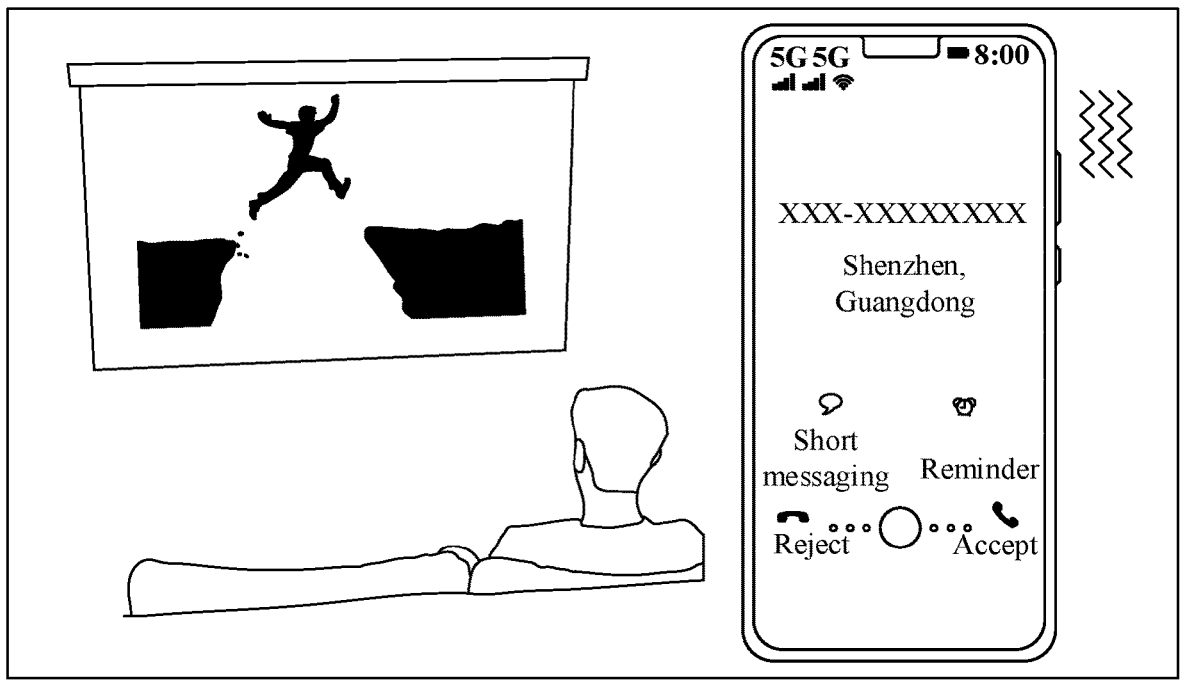
FIG. 16*a*-FIG. 16*b* are another schematic diagram of vibration according to an embodiment of this application.
Figure 16B:
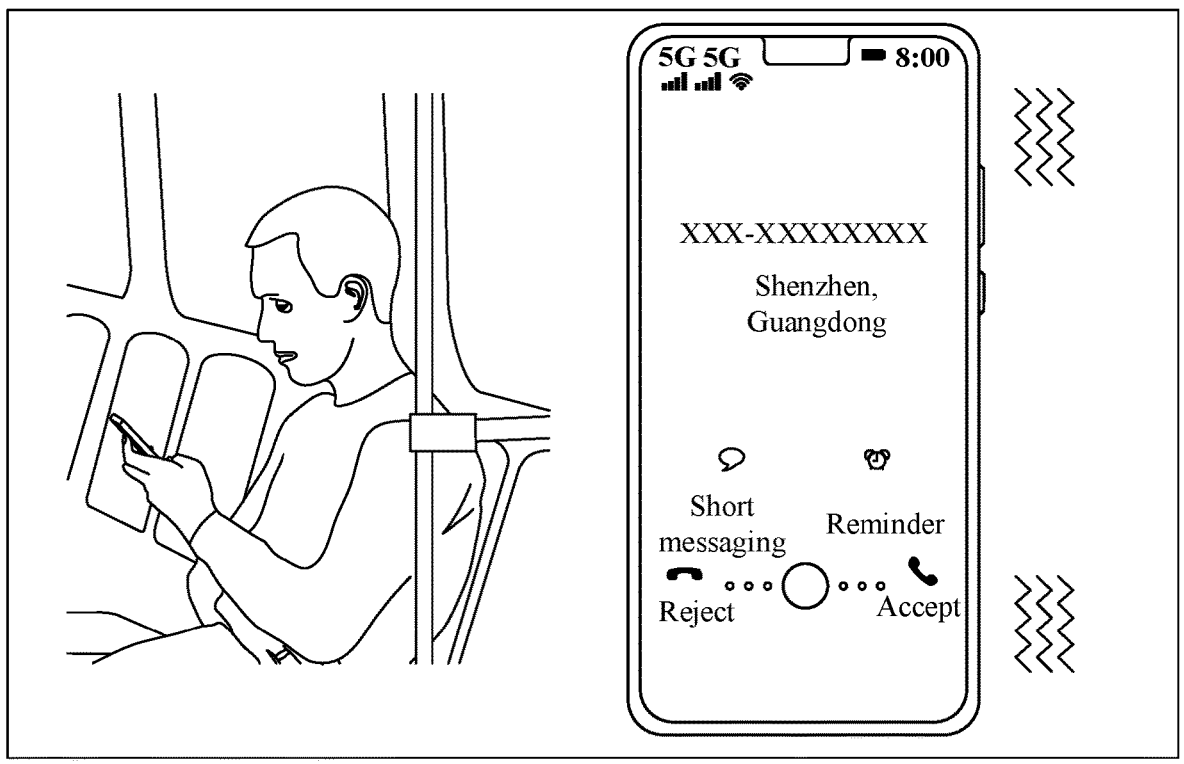

As shown in FIG. 16a, if the external environment in which the electronic device is located is a movie watching environment, and the quantity of decibels of noise is less than or equal to a preset quantity of decibels, the target vibration mode may be that the motor 1 vibrates. As shown in FIG. 16b, the external environment in which the electronic device is located changes from a movie watching environment to an environment in which the user rides a bus, and the quantity of decibels of noise is greater than the preset quantity of decibels, the target vibration mode may be that the motor 1 and the motor 2 vibrate. It should be understood that in this scene, for actions of the application layer, the KIT layer, the application framework layer, the hardware abstraction layer, and the kernel layer in the electronic device, reference may be made to the descriptions in the foregoing embodiment.

The following describes a first application scene (including an application) applicable to this embodiment of this application by using Table 5 as an example.

TABLE 5

| First application scene | | Example | Vibration mode |
|---|---|---|---|
| System application | Notification class | Incoming call ringtone/message/alarm clock | Vibration with music, or vibration based on the external environment in which the electronic device is located |
| | Interaction class | Important event notification | Dual-motor vibration |
| | | Physical simulation | Single-motor vibration with a X-axis motor |
| | | Message notification and feedback | Single-motor vibration with a Z-axis motor |
| | | Photographing | When the interface is enlarged, the single-motor vibrates with strong vibration strength; when the interface is reduced, the single-motor vibrates with weak vibration strength. |
| Game application | | Racing class | Vibration based on the scene of the interface |
| | | Music class | Vibration with music |
| | | Shooting/boxing | Vibration based on the scene of the interface |
| Audio/video application | | | Vibration with music, and/or vibration based on the scene of the interface |
| Charging (small bubbles rise) | | | Vibration based on the scene of the interface (for example, vibration of the left motor becomes weaker, and vibration of the right motor becomes stronger) |

The application layer may detect the first application scene of the electronic device, so that the motor vibrates in a corresponding vibration mode. For a specific implementation process, refer to related descriptions in the foregoing embodiment.

The following briefly describes a test process of the vibration method according to this embodiment of this application during a production line test.

In an embodiment, when a motor is disposed in the electronic device, a calibration test, a function test, and an aging test may be performed on the motor.

Figure 17A:
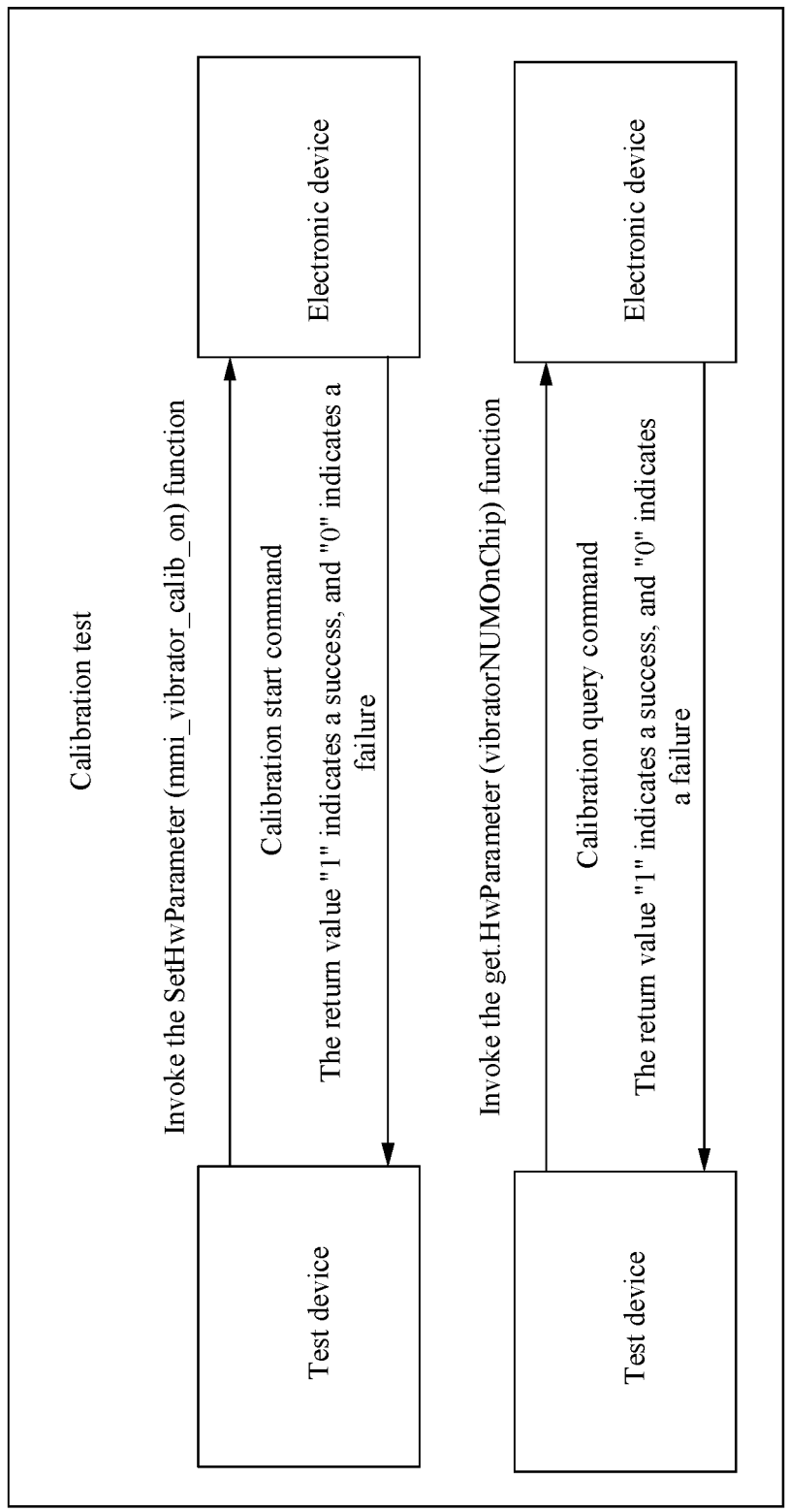
FIG. 17*a*-FIG. 17*b* are a schematic diagram of a test comparison according to an embodiment of this application.

I. Calibration test. The calibration test is used to test whether the motor can be started and whether the quantity of motors can be returned. Referring to FIG. 17a, in this embodiment of this application, the test device may send a calibration start command to the to-be-tested electronic device (hereinafter referred to as the electronic device), so as to start the motor. The electronic device receives the calibration start command, and may feed back a check return value to the test device. For example, the electronic device may enable FO sweep to obtain a check return value. The return value "1" indicates that the motor has started successfully, and the return value "0" indicates that the motor fails to start. In an embodiment, the test device may invoke a calibration EEC3 instruction, which is specifically to invoke the SetHwParameter (mmi_vibrator_calib_on) function to send a calibration start command to the electronic device. It should be understood that a preset procedure or code for FO sweep may be stored in a non-volatile memory (non-volatile memory, NVRAM), so that the electronic device can perform a calibration test on the motor.

Referring to FIG. 17a, the test device sends a calibration query command to the electronic device, so as to obtain the quantity of motors. The electronic device receives the calibration query command, and may feed back a check return value to the test device. The return value "1" indicates that the query succeeds, and the return value "0" indicates that the query fails. The query succeeds means that there is a motor in the electronic device. In an embodiment, the test device may invoke a calibration EEC3 instruction, which is specifically to invoke the get.HwParameter (vibratorNUMOnChip) function to send a calibration start command to the electronic device.

Figure 18A:
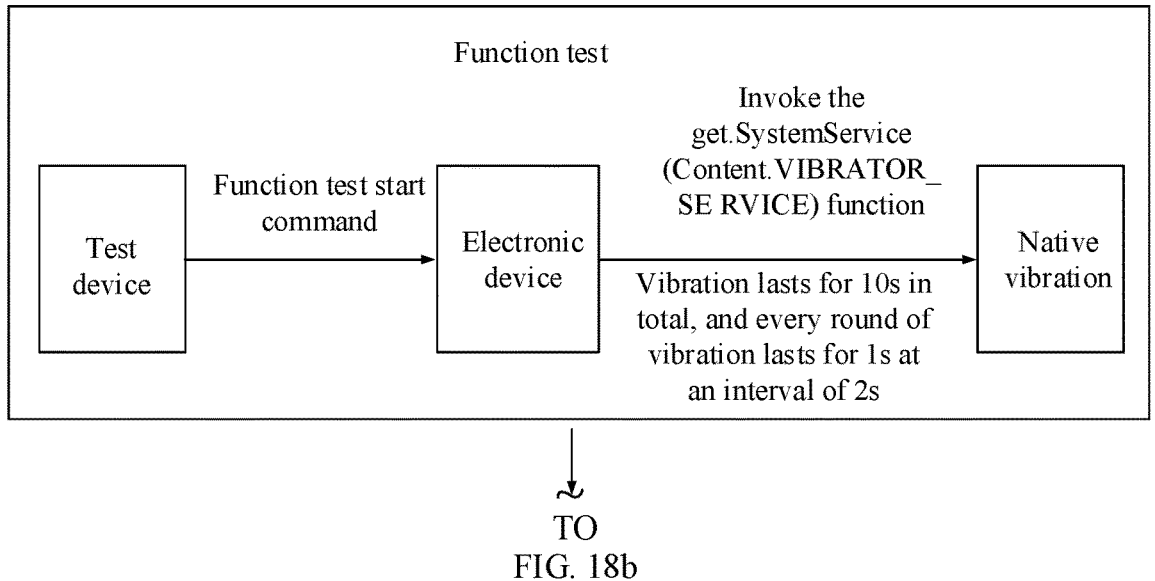
FIG. 18*a*-FIG. 18*b* are another schematic diagram of a test comparison according to an embodiment of this application.

II. Function test. The function test is used to test a vibration function of the motor to determine whether the motor can vibrate in a preset vibration mode. As shown in FIG. 18a, the test device sends a function test start command to the electronic device to test the vibration function of the motor. The electronic device receives the function test start command, and may drive the motor to vibrate in the preset vibration mode. In an embodiment, the test device sends an FF84 instruction to the electronic device to instruct the electronic device to start a vibration function test. The native vibration in the figure may be understood as follows: The electronic device may invoke the get.SystemService (Content.VIBRATOR_SERVICE) function to drive the motor to vibrate in the preset vibration mode. The preset vibration mode may be that vibration lasts for 10 s in total, and every round of vibration lasts for 1 s at an interval of 2 s.

In a possible implementation, a tester may also manually press a start button corresponding to the motor to drive the motor to vibrate in the preset vibration mode.

Figure 19A:
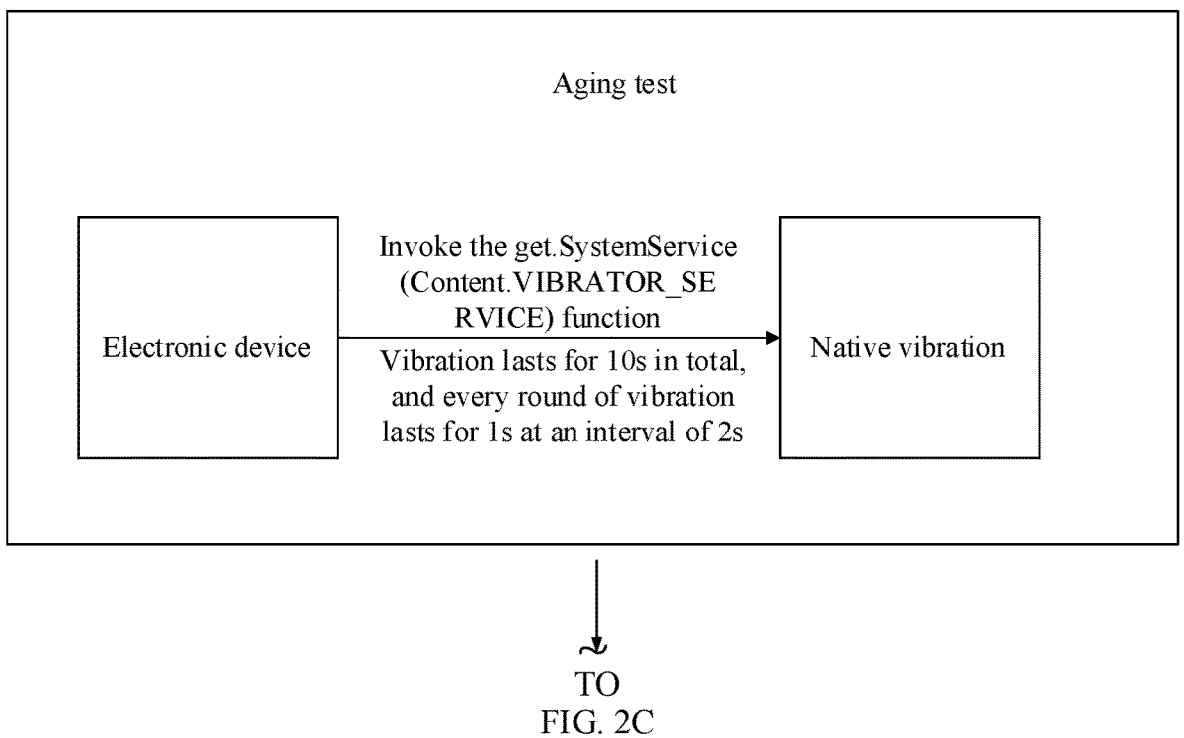
FIG. 19*a*-FIG. 19*b* are another schematic diagram of a test comparison according to an embodiment of this application.

III. Aging test. The aging test is used to test aging performance of the motor that is vibrating, for example, to obtain vibration duration of the motor, so as to determine available time of the motor. Referring to FIG. 19a, the electronic device may drive the motor to perform native vibration. For example, the electronic device may invoke the get.SystemService (Content.VIBRATOR_SERVICE) function to drive the motor to vibrate in the preset vibration mode, so as to obtain the vibration duration of the motor.

In an embodiment, when the electronic device includes at least two motors, a calibration test, a function test, and an aging test may be performed on the at least two motors. Different from the foregoing tests, because there is more than one motor in the electronic device, each motor may be pre-numbered. During the test, the test device may carry the motor number in the test command, so as to test the corresponding motor. For example, the motors may be numbered as ID=1, ID=2, and ID=3 . . . , and so on.

Figure 17B:
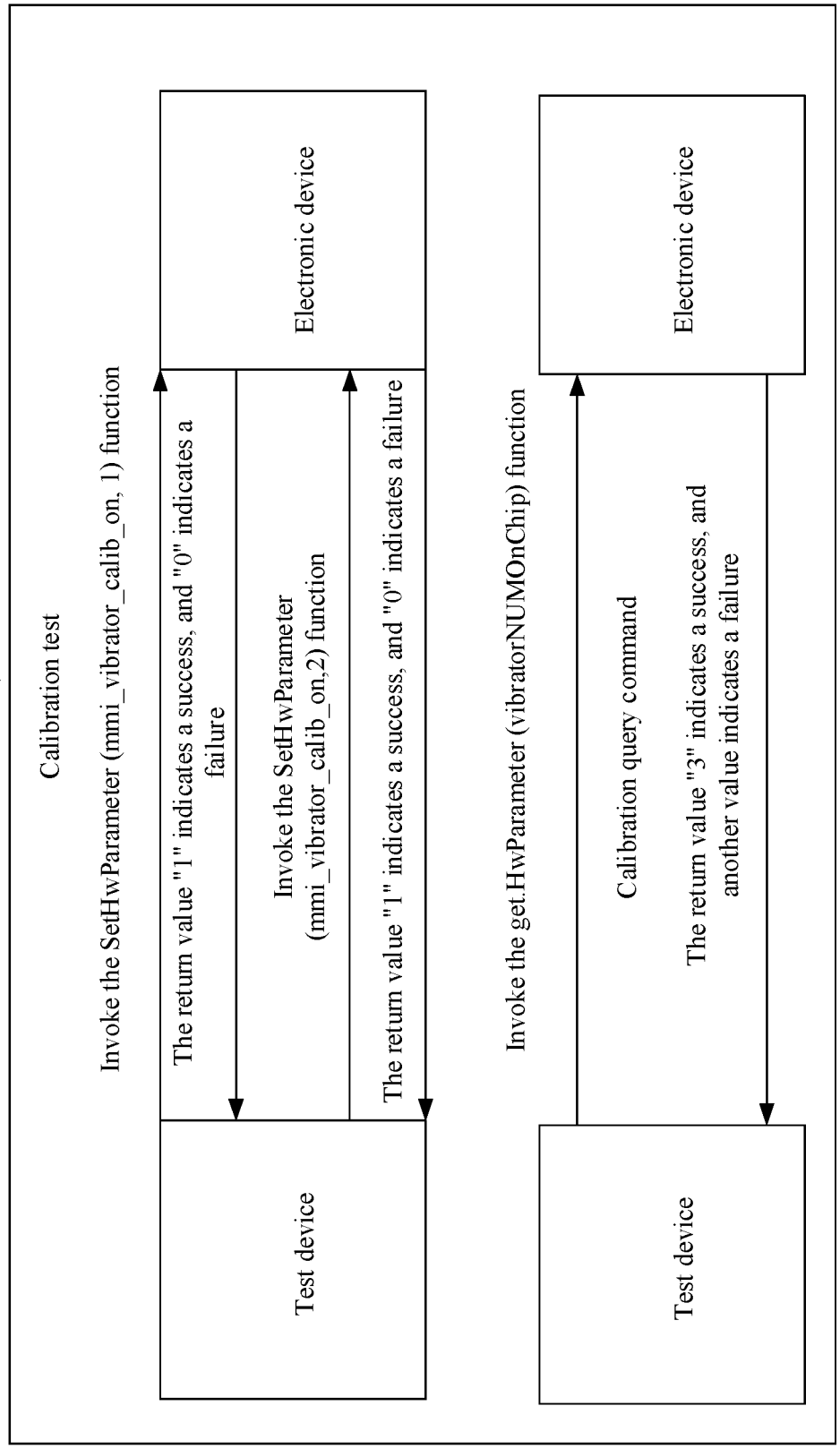

I. Calibration test. Referring to FIG. 17b, in this embodiment of this application, the test device sends a calibration start command to the electronic device to start the motor. A difference from FIG. 17a is that the test device may invoke a calibration EEC3 (ID) instruction, which is specifically to invoke the SetHwParameter (mmi_vibrator_calib_on, ID) function to send a calibration start command to the electronic device. It should be noted that the function includes the ID of the motor, so that the electronic device determines that the to-be-tested motor is the motor corresponding to the ID. In FIG. 17b, functions such as "SetHwParameter (mmi_vibrator_calib_on, 1)" and "SetHwParameter (mmi_vibrator_calib_on, 2)" are used as an example for description, which represent that the test device requests the electronic device to perform a calibration test on the motor whose ID is "1" and the motor whose ID is "2".

Likewise, referring to FIG. 17a-FIG. 17b, the test device sends a calibration query command to the electronic device, so as to obtain the quantity of motors. The test device may invoke a calibration EEC3 (ID) instruction, which is specifically to invoke the get.HwParameter (vibratorNUMOnChip) function to send a calibration start command to the electronic device. The return value "3" indicates that the query succeeds, and another return value indicates that the query fails. In this embodiment of this application, the return value "3" is used to avoid repetition with an ID of the motor. It may be figured out that the return value may alternatively be another customized value.

Figure 18B:
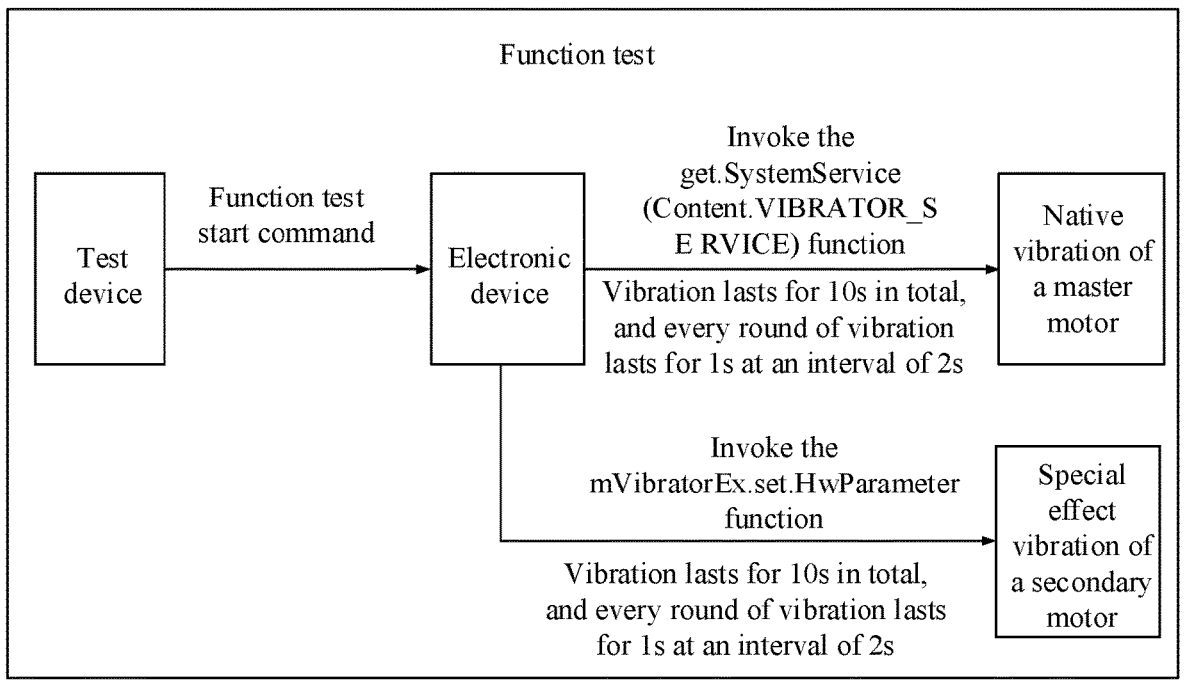

II. Function test. As shown in FIG. 18b, the test device sends a function test start command, such as an FF84 (ID) instruction, to the electronic device. The FF84 (ID) instruction may include an ID of the motor, so that the electronic device performs a vibration function test on the motor corresponding to the ID. The electronic device receives the FF84 (ID) instruction, and may drive the motor to vibrate in the preset vibration mode. In an embodiment, the electronic device may drive a master motor (for example, the motor 2) to perform a native vibration, and drive a secondary motor (the motor 1) to perform special effect vibration. The special effect vibration in the figure may be understood as follows: The electronic device may invoke the mVibratorEx.set.HwParameter function to drive the motor to vibrate in the preset vibration mode.

In a possible implementation, the tester may also manually press a start button corresponding to the motor to drive the master motor and/or the secondary motor to vibrate in the preset vibration mode.

Figure 19B:
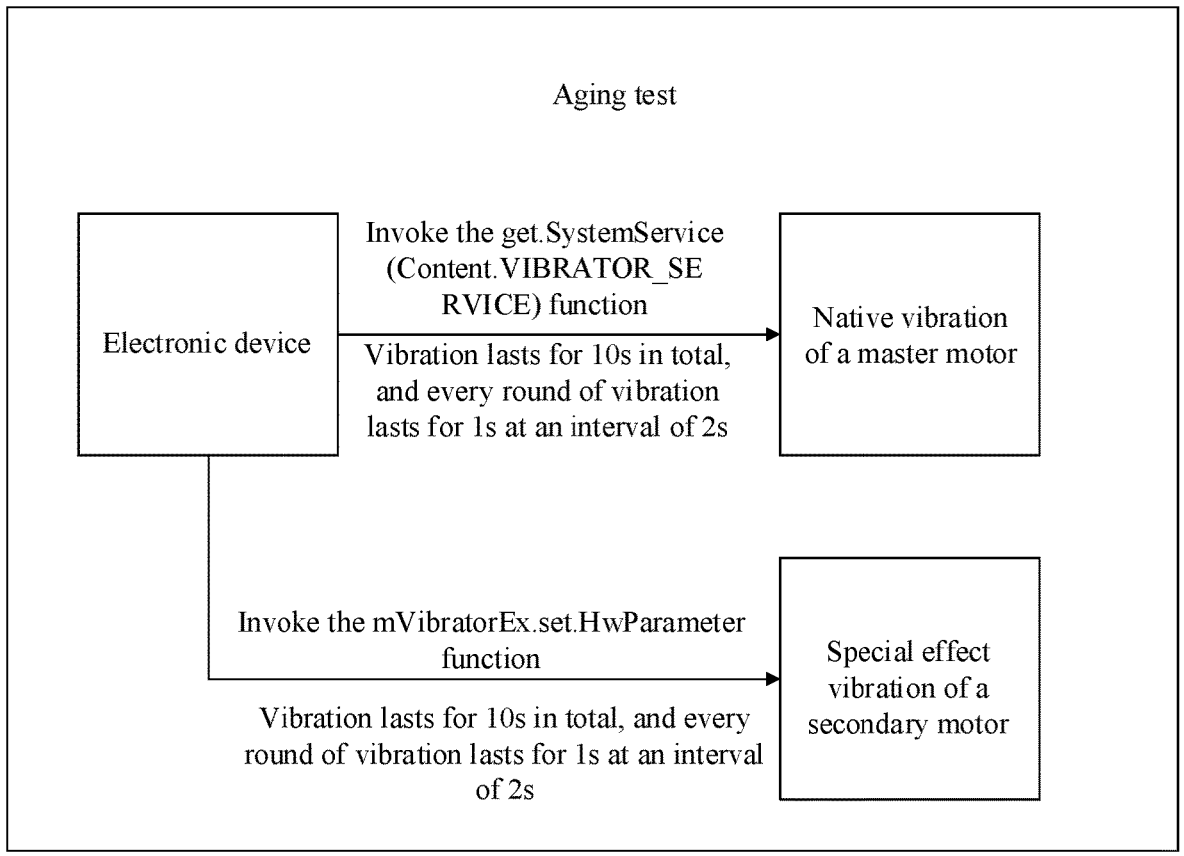

III. Aging test. Referring to FIG. 19b, the electronic device may drive the master motor to perform native vibration. For example, the electronic device may invoke the get.SystemService (Content.VIBRATOR_SERVICE) function to drive the master motor to vibrate in the preset vibration mode, so as to obtain available vibration duration of the master motor. The electronic device may drive the secondary motor to perform special effect vibration. For example, the electronic device may invoke the mVibratorEx.set.HwParameter function to drive the secondary motor to vibrate in the preset vibration mode, so as to obtain available vibration duration of the secondary motor.

In an embodiment, the electronic device according to this embodiment of this application may include a processor (for example, a CPU), a memory, and at least two motors. The memory may include a random-access memory (random-access memory, RAM), and may further include a non-volatile memory (non-volatile memory, NVM), for example, at least one disk memory. The memory may store various instructions, so as to perform various processing functions and implement the method steps of this application. The at least two motors are configured to perform the vibration action in the foregoing embodiment. Optionally, the electronic device used in this application may further include a power supply, a communications bus, and a communications port. The communications port is configured to implement connection and communication between the electronic device and another peripheral device. In this embodiment of this application, the memory is configured to store computer executable program code, where the program code includes an instruction. When the processor executes the instruction, the instruction enables the processor of the electronic device to perform an action other than a vibration action in the foregoing method embodiments. The implementation principles and technical effects of the program code are similar to those of the foregoing method embodiments, and details are not described herein again.

It should be noted that the foregoing modules may be one or more integrated circuits configured to implement the foregoing methods, such as one or more application specific integrated circuits (application specific integrated circuit, ASIC), one or more digital signal processors (digital signal processor, DSP), or one or more field programmable gate array (field programmable gate array, FPGA). For another example, when one of the foregoing module is implemented by a processing element by scheduling program code, the processing element may be a general-purpose processor, such as a central processing unit (central processing unit, CPU) or another processor that may invoke the program code. For another example, these modules may be integrated together, and implemented in a form of a system-on-a-chip (system-on-a-chip, SOC).

All or some of the foregoing embodiments may be implemented by software, hardware, or a combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are completely or partially generated. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The term "and/or" in the embodiments of this application is only used to describe an association relationship between associated objects, and indicates that three relationships may exist. For example, A and/or B may indicate the following: Only A exists, both A and B exist, and only B exists. In the specification and claims of this application, the terms "first", "second", "third", "fourth", and the like are intended to distinguish between different objects but do not indicate a particular order of the objects. For example, a first target object and a second target object are used to distinguish between different target objects, and are not used to describe a specific order of the target objects. In the embodiments of this application, the words such as "example" or "for example" are used to represent giving an example, an illustration, or a description. Any embodiment or design scheme described as "example" or "for example" in the embodiments of this application should not be interpreted as being more preferred or advantageous than other embodiments or design schemes. To be precise, the use of the word such as "example" or "for example" is intended to present a related concept in a specific manner. In the descriptions of the embodiments of this application, unless otherwise specified, "a plurality of" means two or more than two. For example, a plurality of processing units refer to two or more processing units. A plurality of systems refer to two or more systems; and a plurality of systems refer to two or more systems.

The embodiments of this application are described above with reference to the accompanying drawings. However, this application is not limited to the foregoing specific implementations. The foregoing specific implementations are merely examples, but are not limiting. A person of ordinary skill in the art may make many forms without departing from the objective and the protection scope of the claims of this application, and such forms shall fall within the protection scope of this application.

What is claimed is:

1. A vibration method, comprising:
   in response to a first operation, entering, by an electronic device, a first application scene, wherein the electronic device comprises at least two motors;
   when a screen direction representing a rotational posture of the electronic device is a first screen direction, vibrating, by the at least two motors, in accordance with a first vibration mode;
   detecting the screen direction of the electronic device switching from the first screen direction to a second screen direction; and
   vibrating, by the at least two motors, in accordance with a second vibration mode based on the screen direction being in the second screen direction during the first application scene, wherein the first vibration mode is different from the second vibration mode.

2. The method according to claim 1, wherein in response to detecting the switching of the screen direction of the electronic device from the first screen direction to the second screen direction, the method further comprises:
   adjusting an interface displayed by the electronic device based on the screen direction of the electronic device.

3. The method according to claim 1, wherein the at least two motors comprise a first motor and a second motor; and wherein the vibrating, by the at least two motors, in accordance with the first vibration mode comprises:
   vibrating, by the first motor, in a first waveform, and vibrating, by the second motor, in a second waveform; and
   wherein the vibrating, by the at least two motors, in accordance with the second vibration mode comprises:
   vibrating, by the first motor, in a third waveform, and vibrating, by the second motor, in a fourth waveform;
   wherein at least one of the third waveform and the fourth waveform is different from the first waveform; and at least one of the third waveform and the fourth waveform is different from the second waveform.

4. The method according to claim 3, wherein the first waveform and the fourth waveform are the same, and the second waveform and the third waveform are the same.

5. The method according to claim 4, wherein the first waveform is configured to represent that vibration strength of the first motor becomes weaker, and the second waveform is configured to represent that vibration strength of the second motor becomes stronger.

6. The method according to claim 3, wherein the first vibration mode
is associated with a first parameter that is configured to drive the first motor to vibrate in the first waveform and the second motor to vibrate in the second waveform; and
the second vibration mode is associated with a second parameter that is configured to drive the first motor to vibrate in the third waveform and the second motor to vibrate in the fourth waveform.

7. The method according to claim 6, wherein
a first target configuration file is used to indicate the first vibration mode; and
wherein a second target configuration file is configured to indicate the second vibration mode.

8. The method according to claim 7, wherein:
when at least one of the first application scene and the first screen direction is different, the first target configuration file is different; and
when at least one of the first application scene and the second screen direction is different, the second target configuration file is different.

9. The method according to claim 8, wherein generating the first target configuration file comprises:
obtaining first target configuration information based on the first application scene, the first screen direction, and a vibration mode mapping relationship;
using a first configuration file comprising the first target configuration information as the first target configuration file;
wherein the vibration mode mapping relationship is configured to represent a mapping relationship between an application scene of the electronic device and first configuration information; and
wherein the first target configuration information is configured to represent the first screen direction.

10. The method according to claim 9, wherein generating the second target configuration file comprises:
obtaining second target configuration information, wherein the second target configuration information is used to represent the second screen direction; and
using a first configuration file comprising the second target configuration information as the second target configuration file.

11. The method according to claim 10, wherein the obtaining second target configuration information comprises:
obtaining the second target configuration information based on the first application scene, the second screen direction, and the vibration mode mapping relationship.

12. The method according to claim 10, wherein the obtaining second target configuration information comprises:
modifying the first target configuration information to the second target configuration information based on the second screen direction.

13. The method according to claim 1, wherein the first application scene comprises at least one of the following scenes:
a scene of an interface displayed by the electronic device, a scene of vibration with music, a scene of playing audio, a scene of a user's operation on the interface of the electronic device, or an external environment in which the electronic device is located.

14. The method according to claim 9, wherein the electronic device comprises a first layer, a second layer, a third layer, and a fourth layer; and
wherein the obtaining first target configuration information based on the first application scene, the first screen direction, and a vibration mode mapping relationship comprises:
obtaining, by the first layer, the first target configuration information based on the first application scene, the first screen direction, and the vibration mode mapping relationship; and
wherein the using a first configuration file that comprises the first target configuration information as the first target configuration file comprises:
sending, by the first layer, the first target configuration information to the fourth layer by using the second layer and the third layer; and
using, by the fourth layer, the first configuration file comprising the first target configuration information as the first target configuration file.

15. The method according to claim 9, wherein:
when the first application scene is different, an identifier of a target vibration mode is different, wherein the target vibration mode is the first vibration mode or the second vibration mode; and
when the identifier of the target vibration mode is different, initial configuration information is different, wherein the initial configuration information is the first target configuration information to be determined.

16. The method according to claim 15, wherein the electronic device comprises a first layer, a second layer, a third layer, and a fourth layer; and
wherein the obtaining first target configuration information based on the first application scene, the first screen direction, and a vibration mode mapping relationship comprises:
obtaining, by the first layer, the identifier of the target vibration mode based on the first application scene and the vibration mode mapping relationship; wherein the vibration mode mapping relationship is further configured to represent a mapping relationship between an application scene of the electronic device and the identifier of the target vibration mode;
sending, by the first layer, the identifier of the target vibration mode to the second layer; and
obtaining, by the second layer, the initial configuration information based on the identifier of the target vibration mode and the vibration mode mapping relationship; wherein the initial configuration information is first configuration information mapped from the identifier of the target vibration mode in the vibration mode mapping relationship;
sending, by the second layer, the initial configuration information to the third layer; and
obtaining, by the third layer, the first target configuration information based on the first screen direction and the initial configuration information; and
wherein the using a first configuration file that comprises the first target configuration information as the first target configuration file comprises:
sending, by the third layer, the first target configuration information to the fourth layer; and using, by the fourth layer, the first configuration file comprising the first target configuration information as the first target configuration file.

17. An electronic device, comprising:
a processor;
a memory; and
at least two motors;
wherein the electronic device is configured to:
in response to a first operation, enter a first application scene;
when a screen direction representing a rotational posture of the electronic device is a first screen direction, vibrate, by the at least two motors, in accordance with a first vibration mode; and
detect the screen direction of the electronic device switching from the first screen direction to a second screen direction; and
vibrate, by the at least two motors, in accordance with a second vibration mode based on the screen direction being in the second screen direction during the first application scene, wherein the first vibration mode is different from the second vibration mode.

18. The electronic device according to claim 17, wherein the electronic device is further configured to adjust an interface displayed by the electronic device based on the screen direction of the electronic device.

19. The electronic device according to claim 17, wherein the electronic device is further configured to change a sound channel of audio played by the electronic device based on the screen direction of the electronic device.

20. The electronic device according to claim 17, wherein the first vibration mode comprises:
vibrating, by a first motor, in a first waveform, and vibrating, by a second motor, in a second waveform; and
wherein the second vibration mode comprises:
vibrating, by the first motor, in a third waveform, and vibrating, by the second motor, in a fourth waveform;
wherein at least one of the third waveform and the fourth waveform is different from the first waveform; and at least one of the third waveform and the fourth waveform is different from the second waveform.

* * * * *